United States Patent
Nishiura et al.

(10) Patent No.: US 9,556,290 B2
(45) Date of Patent: Jan. 31, 2017

(54) METHOD FOR PRODUCING COMPOUND HAVING COLORANT STRUCTURE AT MAIN CHAIN TERMINAL OF POLYMER, AND PIGMENT DISPERSANT, PIGMENT COMPOSITION, PIGMENT DISPERSION AND TONER CONTAINING COMPOUND OBTAINED BY THE PRODUCTION METHOD

(71) Applicant: CANON KABUSHIKI KAISHA, Tokyo (JP)

(72) Inventors: Chiaki Nishiura, Kawasaki (JP); Yuki Hasegawa, Yokohama (JP); Ayano Mashida, Kawasaki (JP); Takayuki Toyoda, Yokohama (JP); Masashi Hirose, Machida (JP); Waka Hasegawa, Tokyo (JP); Masanori Seki, Yokohama (JP); Yasuaki Murai, Kawasaki (JP); Kosuke Mukumoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 14/673,858

(22) Filed: Mar. 30, 2015

(65) Prior Publication Data

US 2015/0274853 A1 Oct. 1, 2015

(30) Foreign Application Priority Data

Apr. 1, 2014 (JP) .................................. 2014-075125

(51) Int. Cl.
*C08F 22/10* (2006.01)
*C08L 25/14* (2006.01)
(Continued)

(52) U.S. Cl.
CPC ................ *C08F 22/10* (2013.01); *C08L 25/14* (2013.01); *C09B 29/337* (2013.01);
(Continued)

(58) Field of Classification Search
CPC ....... C09B 29/337; C09B 69/106; C08L 25/14
See application file for complete search history.

(56) References Cited

U.S. PATENT DOCUMENTS 8,377,616 B2 2/2013 Tani et al.
8,628,899 B2 1/2014 Kawamura et al.
(Continued)

FOREIGN PATENT DOCUMENTS

EP 2 581 790 A1 4/2013
JP 3-113462 A 5/1991
(Continued)

OTHER PUBLICATIONS

Lacroix-Desmazes, et al., "Reverse Iodine Transfer Polymerization of Methyl Acrylate and n-Butyl Acrylate", Macromolecules, vol. 38, 2005, pp. 6299-6309.

(Continued)

*Primary Examiner* — Peter Vajda
(74) *Attorney, Agent, or Firm* — Fitzpatrick, Cella, Harper & Scinto

(57) ABSTRACT

To provide a method for producing a compound that enhances dispersibility of a pigment of respective colors in a water-insoluble solvent, as well as a pigment dispersant, and a pigment composition, a pigment dispersion and a toner having a good tinting power. A method for producing a compound, including the following:

(i): subjecting a polymerizable monomer forming a monomer unit represented by formula (1) to radical polymerization in the presence of a radical polymerization initiator and an iodine molecule to provide a polymer; and (Continued)

(ii): binding a colorant to a terminal of a main chain of the polymer:

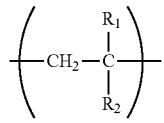

formula (1)

wherein $R_1$ represents a hydrogen atom and an alkyl group, and $R_2$ represents a phenyl group, a carboxyl group, an alkoxycarbonyl group or a carboxamide group.

10 Claims, 5 Drawing Sheets

(51) Int. Cl.
    *G03G 9/08*     (2006.01)
    *C09B 67/00*     (2006.01)
    *C09B 29/33*     (2006.01)
    *C09B 67/22*     (2006.01)
    *C09B 69/10*     (2006.01)
    *G03G 9/087*     (2006.01)
    *G03G 9/09*     (2006.01)

(52) U.S. Cl.
    CPC ...... *C09B 67/0041* (2013.01); *C09B 67/0046* (2013.01); *C09B 67/0051* (2013.01); *C09B 68/41* (2013.01); *C09B 69/106* (2013.01); *G03G 9/08* (2013.01); *G03G 9/08706* (2013.01); *G03G 9/08726* (2013.01); *G03G 9/08791* (2013.01); *G03G 9/08797* (2013.01); *G03G 9/091* (2013.01); *G03G 9/0924* (2013.01)

(56) References Cited

U.S. PATENT DOCUMENTS

| | | | |
|---|---|---|---|
| 2004/0006159 A1* | 1/2004 | Horie | C09D 11/30 523/160 |
| 2008/0299482 A1 | 12/2008 | Kato et al. | |
| 2013/0224645 A1 | 8/2013 | Toyoda et al. | |

FOREIGN PATENT DOCUMENTS

| | | |
|---|---|---|
| JP | 6-148927 A | 5/1994 |
| JP | 2006-30760 A | 2/2006 |
| JP | 2012-67285 A | 4/2012 |
| JP | 2012-77297 A | 4/2012 |
| WO | 2009/060886 A1 | 5/2009 |
| WO | 2013/129639 A1 | 9/2013 |
| WO | 2013/129695 A1 | 9/2013 |
| WO | 2013/129696 A1 | 9/2013 |

OTHER PUBLICATIONS

Sheehan, et al., "A Convenient Synthesis of Water-Soluble Carbodiimides", J. Org. Chem., vol. 26, No. 7, 1961, pp. 2525-2528.

Sonntag, "The Reactions of Aliphatic Acid Chlorides", Chem. Rev., vol. 52, No. 2, 1953, pp. 237-416.

Ponde, et al., "Selective Catalytic Transesterification, Transthiolesterification, and Protection of Carbonyl Compounds over Natural Kaolinitic Clay", J. Org. Chem., vol. 63, No. 4, 1998, pp. 1058-1063.

Kumar, et al., "Knorr Cyclizations and Distonic Superelectrophiles", J. Org. Chem., vol. 72, 2007, pp. 9761-9764.

Jikken Kagaku Koza (Experimental Chemistry Guide Book), Maruzen Co., Ltd., 1st edition, vol. 17-2, 1963, pp. 162-179.

Shin Jikken Kagaku Koza (New Experimental Chemistry Guide Book), Maruzen Co., Ltd., 1st edition, vol. 15, 1977, pp. 390-448.

Hashimoto, "Organic Pigments Handbook", 2006, pp. 510-577.

Peyser, "Glass Transition Temperatures of Polymers", Polymer Handbook, Brandrup, et al. (eds.), Third Edition, 1989, pp. VI 209-VI 277.

Niederl, et al., "Disproportionation in Aryloxymalonic Acid Syntheses", Journal of American Chemical Society, vol. 62, 1940, pp. 1154-1156.

European Search Report dated Aug. 11, 2015 in European Application No. 15161849.3.

U.S. Appl. No. 14/673,860, filed Mar. 30, 2015. Inventor: Mukumoto, et al.

* cited by examiner

METHOD FOR PRODUCING COMPOUND HAVING COLORANT STRUCTURE AT MAIN CHAIN TERMINAL OF POLYMER, AND PIGMENT DISPERSANT, PIGMENT COMPOSITION, PIGMENT DISPERSION AND TONER CONTAINING COMPOUND OBTAINED BY THE PRODUCTION METHOD

BACKGROUND OF THE INVENTION

Field of the Invention

The present invention relates to a method for producing a compound having a colorant structure, suitable as a pigment dispersant, a pigment dispersant containing the compound, a pigment composition containing the pigment dispersant, and a pigment dispersion and a toner containing the pigment composition.

Description of the Related Art

A pigment having a small particle size generally tends to be strong in the aggregation force between pigment particles, and therefore, dispersing thereof in a medium such as an organic solvent and a molten resin is easily insufficient. A pigment, if being insufficient in dispersibility, has a reduced tinting power.

As a dispersant having a high dispersibility, a dispersant has been heretofore used in which a compound having a high affinity with a pigment is bound to a terminal of a polymer that imparts dispersibility in a medium. For example, Japanese Patent Application Laid-Open No. 2012-077297 discloses, in order to enhance dispersibility of a pigment in a toner, an example of use of a dispersant in which a colorant compound having a high affinity with a pigment is bound to a terminal of a polymer obtained by radical polymerization using a thiol type chain transfer agent, as well as a method for producing such a dispersant.

Thus, in order to enhance dispersibility of a pigment in a toner particle, various polymer dispersants in toners of respective colors of yellow, magenta, cyan and black, and production methods thereof have been proposed.

Japanese Patent Application Laid-Open No. 2012-067285 discloses, in order to enhance dispersibility of an azo type pigment in a yellow toner, a dispersant having a compound having an azo backbone structure and a production method thereof.

In addition, Japanese Patent Application Laid-Open No. 2006-030760 discloses, in order to enhance dispersibility of a magenta pigment in a magenta toner, use of a specific polyester type dispersant.

In addition, Japanese Patent Application Laid-Open No. H03-113462 discloses, in order to enhance dispersibility of a phthalocyanine pigment in a cyan toner, use of a polymer containing sodium styrene sulfonate as a monomer unit, as a dispersant.

In addition, Japanese Patent Application Laid-Open No. H06-148927 discloses, in order to enhance dispersibility of carbon black in a black toner, use of a copolymer of a styrene type monomer and an acrylate type (or methacrylate type) monomer, as a dispersant.

SUMMARY OF THE INVENTION

The method involving using a compound having an azo backbone structure is bound to a terminal of a polymer as a dispersant, described in Japanese Patent Application Laid-Open No. 2012-077297, imparts a good pigment dispersibility for a yellow pigment. In view of the method for producing the compound disclosed, however, the following problem has occurred: a polymer into which no azo backbone structure is introduced is produced in a certain amount.

In addition, the method involving using as a dispersant the compound having an azo backbone structure, described in Japanese Patent Application Laid-Open No. 2012-067285, imparts a partially good pigment dispersibility in various pigments, but a pigment dispersant exerting a higher dispersive effect and a production method thereof are demanded in order that an image output is higher in image quality.

On the other hand, in the methods described in Japanese Patent Application Laid-Open No. 2006-030760, Japanese Patent Application Laid-Open No. H03-113462 and Japanese Patent Application Laid-Open No. H06-148927, it is necessary for imparting pigment dispersibility at a certain level to increase the amount of the dispersant added, and an excessive amount of the dispersant added may affect various characteristics demanded.

Accordingly, one embodiment of the present invention is directed to providing a method for producing a compound, and a pigment dispersant that enable to enhance dispersibility of pigments of respective colors of yellow, magenta, cyan and black. Another embodiment of the present invention is directed to providing a pigment composition, a pigment dispersion and a toner that have a good tinting power.

The above objects are achieved by the following present invention.

That is, a first aspect of the present invention relates to a method for producing a compound, including the following (i) to (ii):

(i): subjecting a polymerizable monomer forming a monomer unit represented by formula (A) to radical polymerization in the presence of a radical polymerization initiator and an iodine molecule, to provide a polymer; and (ii): binding a colorant to a terminal of a main chain of the polymer:

formula (A)

wherein $R_1$ represents a hydrogen atom or an alkyl group, and
$R_2$ represents a phenyl group, a phenyl group having a substituent, a carboxy group, an alkoxycarbonyl group or a carboxamide group.

In addition, a second aspect of the present invention relates to a pigment dispersant containing a compound obtained by the production method.

In addition, a third aspect of the present invention relates to a pigment composition including the pigment dispersant and a pigment.

In addition, a fourth aspect of the present invention relates to a pigment dispersion including the pigment composition and a water-insoluble solvent.

In addition, a fifth aspect of the present invention relates to a toner including a toner particle containing a binder resin and a colorant, in which the colorant is the pigment composition.

The production method of the present invention enables a colorant structure portion having a high affinity with a pigment to be introduced into a terminal of a main chain of a polymer at a high rate.

In addition, a compound obtained by the production method of the present invention, and the pigment dispersant of the present invention enable to enhance dispersibility of pigments of respective colors of yellow, magenta, cyan and black. In addition, the pigment composition, the pigment dispersion and the toner of the present invention can have a good tinting power.

Further features of the present invention will become apparent from the following description of exemplary embodiments with reference to the attached drawings.

DESCRIPTION OF THE EMBODIMENTS

Figure 1:
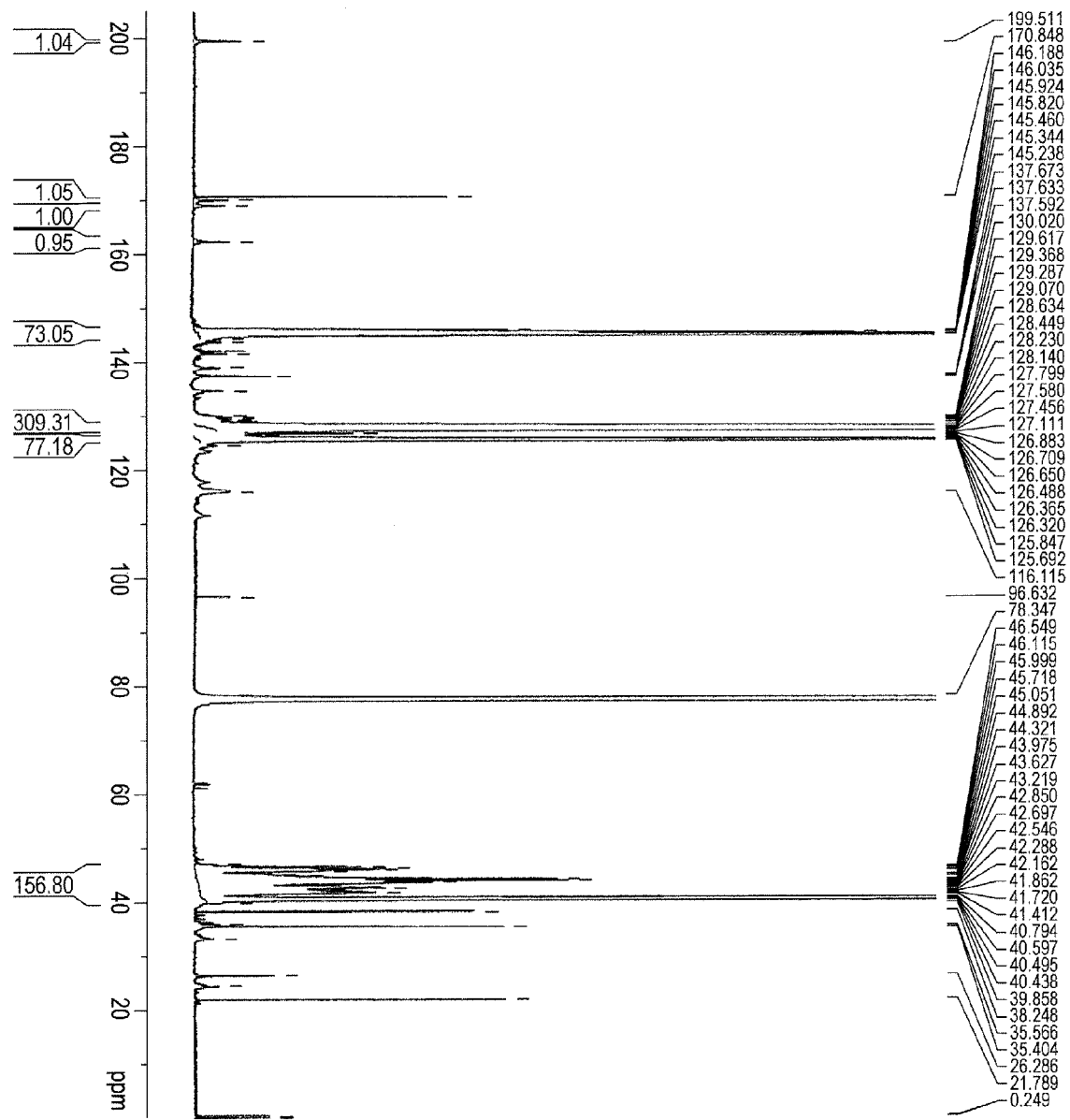
FIG. 1 is a chart illustrating a $^{13}$C NMR spectrum of compound (101) of the present invention in CDCl$_3$ at room temperature and at 150 MHz.

Preferred embodiments of the present invention will now be described in detail in accordance with the accompanying drawings.

First, the method for producing a compound of the present invention is described.

The method for producing a compound of the present invention includes the following steps (i) to (ii):
(i): subjecting a polymerizable monomer forming a monomer unit represented by formula (1) to radical polymerization in the presence of a radical polymerization initiator and an iodine molecule to provide a polymer; and
(ii): binding a colorant to a terminal of a main chain of the polymer:

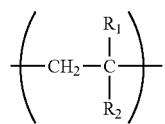

formula (1)

wherein
R$_1$ represents a hydrogen atom and an alkyl group, and
R$_2$ represents a phenyl group, a carboxyl group, a carboxylic acid ester group and a carboxylic acid amide group.

Hereinafter, when only a polymer having the monomer represented by formula (1) is indicated, the polymer is referred to as "polymer moiety". In addition, in the compound represented by formula (2) or formula (4), the structure portion after the removal of "polymer moiety" is referred to as "colorant structure portion". In addition, a compound in which the polymer moiety is linked to the colorant structure portion is referred to as "compound having a colorant structure portion". Furthermore, a linking group forming a binding portion of the polymer moiety and the colorant structure portion is referred to as "linking group".

First, step (i) is described in detail.

With respect to the method for producing the polymer moiety in the present invention, reverse iodine transfer polymerization (for example, Patrick Lacroix-Desmazes and two others, "Macromolecules", (USA), American Chemical Society, 2005, Vol. 38, No. 15, pp. 6299-6309) that is living radical polymerization using an iodine molecule is applied.

A polymerization reaction in reverse iodine transfer polymerization in step (i) has an elementary process of reaction, including an induction period induced in the initial period of the polymerization reaction and a growth period induced in the middle and late period of the polymerization reaction. In the induction period, a radical generated by cleavage of a radical polymerization initiator and an iodine molecule are reacted to produce an iodine compound. On the other hand, in the growth period, a polymerizable monomer to which the iodine compound and the radical polymerization initiator are added is subjected to a chain reaction to generate the polymer moiety.

In the polymerization reaction in step (i), iodine is bound to the ω-terminal of the polymer moiety to thereby control the growth reaction of the polymer moiety. Therefore, a re-binding or disproportional reaction between polymer radicals is hardly caused, and a polymer moiety having a radical polymerization initiator residue after radical generation can be produced at the α-terminal of the polymer moiety.

The radical polymerization initiator in step (i) may be any initiator as long as the initiator can generate a radical to start the polymerization reaction, and is selected from compounds that generate a radical by the action of heat, light, radiation or a redox reaction. Examples include an azo compound, an organic peroxide, an inorganic peroxide, an organic metal compound and a photopolymerization initiator. Such radical polymerization initiators may be used in combination of two or more, if necessary.

The amount of the radical polymerization initiator used here can be modulated within the range from 0.005 to 100 parts by weight based on 100 parts by weight of the polymerizable monomer so that a copolymer having a target molecular distribution is obtained.

In step (i), a radical polymerization initiator having a substituent that can form a carboxylic acid amide bond, a carboxylic acid ester bond, a sulfonic acid amide bond, a sulfonic acid ester bond and an ether bond can be used because a polymer moiety modified at the α-terminal thereof can be produced at a high yield.

Examples of the radical polymerization initiator that can form the above bonds include azo nitriles such as 2,2'-azobis(4-methoxy-2,4-dimethylvaleronitrile) and 4,4'-azobis(4-cyanopentanoic acid), azo esters such as dimethyl-2,2'-azobis(isobutyrate), azo amides such as 2,2'-azobis[2-methyl-N-(2-hydroxyethyl)propionamide], azo amidines such as 2,2'-azobis(2-amidinopropane) and 2,2'-azobis[N-(2-carboxyethyl)-2-methylpropionamide], azo imidazolines such as 2,2'-azobis[2-(2-imidazoline-2-yl)propane], and diacyl peroxides such as disuccinic acid peroxide.

The method involving inducing radical generation by cleavage of the radical polymerization initiator in step (i) can be performed by irradiation with radiation, laser light or the like, combination use of the photopolymerization initiator with light irradiation, and heating. In particular, heating can be adopted from the viewpoints of being excellent in workability and the controllability of the reaction.

When the reaction is induced by heating, such heating is preferably performed within the range of the ten-hour half-life temperature of the radical polymerization initiator or higher and the ten-hour half-life temperature or higher by 40° C. More preferably, such heating is performed within the range of the ten-hour half-life temperature or higher and a temperature higher than the ten-hour half-life temperature by 30° C. or lower. In the case where such heating is performed at a temperature higher than the ten-hour half-life temperature by 40° C., the controllability of the reaction may be remarkably impaired. In the case where such heating is performed at a temperature lower the ten-hour half-life temperature, a time taken for the production process is extremely longer and therefore such a case cannot be adopted from the viewpoints of the controllability of the reaction and production efficiency.

The method of inducing the radical generation reaction in step (i) may be applied in combination of a plurality of methods. The method in step (i) can also be performed in an atmosphere of an inert gas such as an argon gas or a nitrogen gas.

In step (i), the molar ratio of the radical polymerization initiator to the iodine molecule (radical polymerization initiator (mol))/(iodine molecule (mol)) can be more than 1 and 20 or less. If the molar ratio is 1 or less, the polymerization reaction is stopped and thus a good polymerization conversion is difficult to achieve. On the other hand, if the molar ratio is more than 20, a chain reaction of the polymerizable monomer via no iodine compound is caused as a side reaction, therefore re-binding or disproportion between polymer radicals is caused, and a polymer moiety having a substituent only at the α-terminal thereof is difficult to synthesize. The molar ratio of the polymerizable monomer to the iodine molecule (polymerizable monomer (mol))/(iodine molecule (mol)) can be arbitrarily changed.

In step (i), the molecular weight of a polymer moiety obtained from ideal reverse iodine transfer polymerization (in the case where the polymerization conversion is 100%) depends on the amount of the iodine molecule loaded, and is represented by the following expression.

(Molecular weight of polymer moiety)=((Mass of polymerizable monomer loaded)/{2×(Amount of substance of iodine molecule loaded)})+(Mass number of radical polymerization initiator)+ (Mass number of iodine atom)

The number average molecular weight of the polymer moiety obtained in step (i) is preferably 500 or more from the viewpoint of an enhancement in dispersibility of a pigment. Furthermore, the number average molecular weight of the polymer moiety is preferably 200000 or less for the purpose of an enhancement in affinity with a water-insoluble solvent. Furthermore, the number average molecular weight of the polymer moiety is more preferably 2000 to 50000 from the viewpoint of easiness of production.

The polymer moiety can be produced by any polymerization among solution polymerization, suspension polymerization, emulsion polymerization, dispersion polymerization, precipitation polymerization and bulk polymerization. In particular, solution polymerization, but not particularly limited, can be applied in a solvent that can dissolve the respective components for use in production. Specifically, as the solvent, a polar organic solvent including alcohols such as methanol, ethanol and 2-propanol, ketones such as acetone and methyl ethyl ketone, ethers such as tetrahydrofuran, 1,4-dioxane and diethyl ether, ethylene glycol monoalkyl ethers or acetates thereof, propylene glycol monoalkyl ethers or acetates thereof, and diethylene glycol monoalkyl ethers, or a non-polar solvent including anisole, toluene and xylene can be used singly or as a mixture. In particular, a solvent having a boiling point ranging from 70° C. to 180° C. can be used singly or as a mixture.

The polymer moiety obtained in step (i) is obtained by radical polymerization of a polymerizable monomer represented by the following formula (A). That is, the polymer moiety has a unit represented by the formula (1):

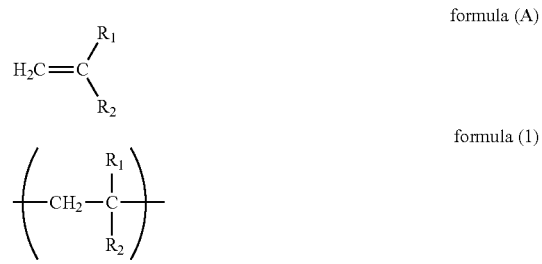

wherein
$R_1$ represents a hydrogen atom and an alkyl group, and
$R_2$ represents a phenyl group, a carboxy group, an alkoxycarbonyl group and a carboxamide group.

The alkyl group of $R_1$ in the formula (1) is not particularly limited, and examples thereof include linear, branched or cyclic alkyl groups such as a methyl group, an ethyl group, a n-propyl group, a n-butyl group, a n-pentyl group, a n-hexyl group, an isopropyl group, an isobutyl group, a sec-butyl group, a tert-butyl group and a cyclohexyl group.

$R_1$ in the formula (1) can represent a hydrogen atom or a methyl group among the above groups from the viewpoint of the polymerizability of the polymerizable monomer forming a monomer unit.

The alkoxycarbonyl group of $R_2$ in the formula (1) is not particularly limited, and examples thereof include linear or branched ester groups such as a methoxycarbonyl group, an ethoxycarbonyl group, a n-propoxycarbonyl group, an iso-propoxycarbonyl group, a n-butoxycarbonyl group, an isobutoxycarbonyl group, a sec-butoxycarbonyl group, a tert-butoxycarbonyl group, an octoxycarbonyl group, a nonoxycarbonyl group, a desoxycarbonyl group, an undesoxycarbonyl group, a dodesoxycarbonyl group, a hexadesoxycarbonyl group, an octadesoxycarbonyl group, an eicosoxycarbonyl group, a docosoxycarbonyl group, a 2-ethylhexyoxycarbonyl group, a phenoxycarbonyl group, a benzoxycarbonyl group and a 2-hydroxyethoxycarbonyl group.

The carboxamide group of $R_2$ in the formula (1) is not particularly limited, and examples thereof include a carboxamide group (—CONHR) in which one hydrogen atom bound to nitrogen is replaced with an alkyl group, or a carboxamide group (—CONRR) in which two hydrogen atoms bound to nitrogen are each replaced with an alkyl group. Examples of the carboxamide group (—CONHR) include an N-methylamide group, an N-ethylamide group, an N-isopropylamide group, an N-n-butylamide group, an N-isobutylamide group, an N-sec-butylamide group, an N-tert-butylamide group, an N-octylamide group, an N-nonylamide group, an N-decylamide group, an N-undecylamide group, an N-dodecylamide group, an N-hexadecylamide group, an N-octadecylamide group, an N-phenylamide group and an N-(2-ethylhexyl)amide group, and examples of the carboxamide group (—CONRR) include an N,N-dimethylamide group, an N,N-diethylamide group, an N,N- diisopropylamide group, an N,N-di-n-butylamide group, an N,N-diisobutylamide group, an N,N-di-sec-butylamide group, an N,N-dioctylamide group, an N,N-dinonylamide group, an N,N-didecylamide group, an N,N-diundecylamide group, an N,N-didodecylamide group and an N,N-di(2-ethylhexyl)amide group.

$R_2$ in the formula (1) may be further substituted with a substituent as long as the polymerizability of the polymerizable monomer forming a monomer unit is not impaired and solubility of a compound having a colorant structure portion obtained by the production method of the present invention, is not remarkably deteriorated. Examples of such a substituent include alkoxy groups such as a methoxy group and an ethoxy group, amino groups such as an N-methylamino group and an N,N-dimethylamino group, acyl groups such as an acetyl group, and halogen atoms such as a fluorine atom and a chlorine atom.

$R_2$ in the formula (1) can be a phenyl group or a carboxylic acid ester group among the above groups from the viewpoint of the dispersibility and the compatibility of the compound having a colorant structure portion obtained by the production method of the present invention in a medium.

The polymer moiety obtained in step (i) can control the affinity with a dispersion medium by changing the proportion of the monomer unit represented by the formula (1). When the dispersion medium is a non-polar solvent such as styrene, the proportion of a monomer unit in which $R_1$ in the formula (1) is a phenyl group can be higher from the viewpoint of the affinity with the dispersion medium. On the other hand, when the dispersion medium is a partially polar solvent such as an acrylate, the proportion of a monomer unit in which $R_2$ in the formula (1) is a carboxyl group, a carboxylic acid ester group or a carboxylic acid amide group can be higher from the viewpoint of the affinity with the dispersion medium.

Then, step (ii) is described in detail.

In step (ii), the radical polymerization initiator residue after radical cleavage in step (i), bound to the α-terminal of the polymer moiety, can be reacted with a substituent in a colorant structure portion to form a bond, thereby producing a compound having a colorant structure portion.

As the method for forming the bond in step (ii), a known method can be utilized. In particular, a method for forming a carboxylic acid ester bond, a carboxylic acid amide bond, a sulfonic acid ester bond, a sulfonic acid amide bond and an ether bond can be utilized from the viewpoints of easiness of production and the yield of the reaction.

Specific examples include a method involving using a dehydration-condensation agent such as 1-ethyl-3-(3-dimethylaminopropyl)carbodiimide hydrochloride (for example, Melvin S. Newman and another person, "The Journal of Organic Chemistry", (USA), American Chemical Society, 1961, Vol. 26, No. 7, pp. 2525-2528), the Schotten-Baumann method (for example, Norman O. V. Sonntag, "Chemical Reviews", (USA), American Chemical Society, 1953, Vol. 52, No. 2, pp. 237-416) and the Williamson method (for example, Joseph B. Niederl and another person, "Journal of American Chemical Society", (USA), American Chemical Society, 1940, No. 62, pp. 1154-1156).

While step (ii) can be conducted in the absence of a solvent, step (ii) can be conducted in the presence of a solvent in order to prevent the reaction from rapidly progressing. The solvent is not particularly limited as long as the solvent does not inhibit the reaction. Examples include ethers such as diethyl ether, tetrahydrofuran and dioxane, hydrocarbons such as benzene, toluene, xylene, hexane and heptane, halogen-containing hydrocarbons such as dichloromethane, dichloroethane and chloroform, amides such as N,N-dimethylformamide, N-methylpyrrolidone and N,N-dimethylimidazolidinone, and nitriles such as acetonitrile and propionitrile. Such solvents may be used as a mixture of two or more depending on the solubility of a solute, and the mixing ratio in use of such a mixture can be arbitrarily determined. The amount of the solvent used can be arbitrarily determined and can be within the range from 1.0 to 20 times the mass of the polymer moiety from the viewpoint of the reaction rate.

Step (ii) is usually conducted within the temperature range from 0° C. to 250° C., and usually completed within 24 hours.

As the colorant that can be applied to the production method of the present invention, any colorant obtained by a known method can be used. Specific examples include an anthracene colorant, an indigo colorant, an acridine colorant, an azine colorant, an oxazine colorant, a thiazine colorant, a quinoline colorant, a polymethine colorant, a cyanine colorant, a quinophthalone colorant, a hydrazone colorant, a triazene colorant, a porphyrin colorant, an azaporphyrin colorant, a quinacridone colorant, a formazan colorant, a tetrazolium colorant, a nitroso colorant, a quinoneimide colorant, an azomethine colorant, an azo colorant, a quinone colorant, a spiropyran colorant, a phthalone colorant, a phthalide colorant, an oxazole colorant, a thiadiazole colorant, an oxadiazole colorant, a triazole colorant, a thiophene colorant, a furan colorant, a stilbene colorant, a coumarin colorant, an isoindoline colorant, a naphtholactam colorant, a naphthalic acid imide colorant, a phthalic acid imide colorant, a perinone colorant, a benzoxanthene colorant and a benzothioxanthene colorant.

As the above colorant, an azo colorant can be adopted, among the colorants listed, from the viewpoints of the affinity with a pigment and easiness of production.

Examples of the azo colorant include acetoacetanilide, benzene, naphthalene, triazole, benzothiazole, pyrazole, imidazole, thiadiazole, pyrazole, pyrrole, pyrazole, thiophene, pyridone, and a compound in which barbituric acid is linked to an azo group.

The azo colorant can be a colorant having an acetoacetanilide structure, among the colorants listed, from the viewpoints of the affinity with a pigment and easiness of production.

The compound obtained by reacting the above colorant with the polymer can have a structure represented by the following formula (2):

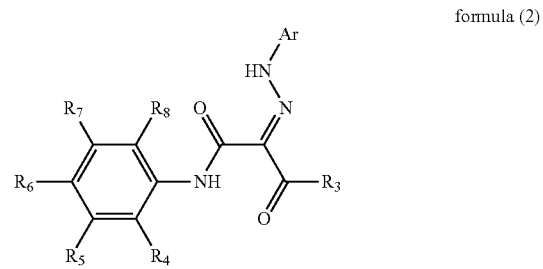

formula (2)

wherein
at least one of Ar and $R_3$ to $R_8$ is bound to the polymer via a linking group,
Ar, when not bound to the polymer, represents an aryl group, or an aryl group having a substituent, in the case of the aryl group having a substituent, the substituent is a functional group selected from the group consisting of an alkyl group, an alkoxy group, a hydroxyl group, a cyano group, a halogen atom, a trifluoromethyl group, an alkoxycarbonyl group, a carboxamide group, a sulfonamide group, an alkoxysulfonyl group, a sulfonic acid group, a urea group and a thiourea group, and the urea group optionally forms a 5-membered heterocyclic ring together with two adjacent carbon atoms of A that can be substituted, $R_3$, when not bound to the polymer, represents an alkyl group, an alkyl group having a substituent, a phenyl group, a phenyl group having a substituent, an alkoxy group or an amino group, $R_4$ to $R_8$, when not bound to the polymer, each independently represent a hydrogen atom, an alkyl group, an alkoxy group, a hydroxyl group, a cyano group, a halogen atom, a trifluoromethyl group, an alkoxycarbonyl group, a carboxamide group, a sulfonamide group, an alkoxysulfonyl group, a sulfonic acid group, a urea group, a thiourea group or the following formula (3), and the urea group optionally forms a 5-membered heterocyclic ring together with two adjacent carbon atoms of $R_4$ to $R_8$, Ar, when bound to the polymer, represents a group formed by leaving of a hydrogen atom from the functional group that can be represented by Ar not bound to the polymer, any of $R_3$ to $R_8$, when bound to the polymer, represents a group formed by leaving of a hydrogen atom from the functional group that can be represented by $R_3$ to $R_8$ not bound to the polymer;

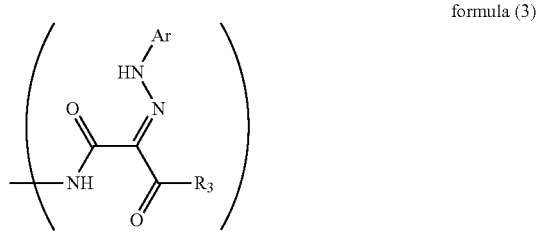

formula (3)

wherein
Ar and $R_3$ have the same meanings as Ar and $R_3$ in the formula (2).

Examples of the alkyl group of $R_3$ in each of the formula (2) and the formula (3) include linear, branched or cyclic alkyl groups such as a methyl group, an ethyl group, a n-propyl group, a n-butyl group, a n-pentyl group, a n-hexyl group, an isopropyl group, an isobutyl group, a sec-butyl group, a tert-butyl group and a cyclohexyl group.

Examples of the alkoxy group of $R_3$ in each of the formula (2) and the formula (3) include a methoxy group, an ethoxy group and a phenoxy group.

Examples of the amino group of $R_3$ in each of the formula (2) and the formula (3) include an unsubstituted amino group, an N-methylamino group and an N,N-dimethylamino group.

The alkyl group or the phenyl group of $R_3$ in each of the formula (2) and the formula (3) may be further substituted with a substituent as long as the affinity with a pigment is not remarkably impaired. In such a case, examples of the substituent that may be used include a halogen atom, a nitro group, an amino group, a hydroxyl group, a cyano group and a trifluoromethyl group.

$R_3$ in each of the formula (2) and the formula (3) can be a methyl group, among the above groups, from the viewpoint of the affinity with a pigment.

Examples of the alkyl group of each of $R_4$ to $R_8$ in the formula (2) include linear, branched or cyclic alkyl groups such as a methyl group, an ethyl group, a n-propyl group, a n-butyl group, a n-pentyl group, a n-hexyl group, an isopropyl group, an isobutyl group, a sec-butyl group, a tert-butyl group and a cyclohexyl group.

Examples of the alkoxy group of each of $R_4$ to $R_8$ in the formula (2) include a methoxy group, an ethoxy group and a phenoxy group.

Examples of the halogen atom of each of $R_4$ to $R_8$ in the formula (2) include a fluorine atom, a chlorine atom, a bromine atom and an iodine atom.

Examples of the alkoxycarbonyl group of each of $R_4$ to $R_8$ in the formula (2) include linear or branched ester groups such as a methoxycarbonyl group, an ethoxycarbonyl group, a n-propoxycarbonyl group, an isopropoxycarbonyl group, a n-butoxycarbonyl group, an isobutoxycarbonyl group, a sec-butoxycarbonyl group, a tert-butoxycarbonyl group, an octoxycarbonyl group, a nonoxycarbonyl group, a desoxycarbonyl group, an undesoxycarbonyl group, a dodesoxycarbonyl group, a hexadesoxycarbonyl group, an octadesoxycarbonyl group, an eicosoxycarbonyl group, a docosoxycarbonyl group, a 2-ethylhexyoxycarbonyl group, a phenoxycarbonyl group, a benzoxycarbonyl group and a 2-hydroxyethoxycarbonyl group. Examples of the alkoxysulfonyl group include a group in which carbonyl of each of such alkoxycarbonyl groups is changed to sulfonyl.

Examples of the amide group of each of the carboxamide group and the sulfonic acid amide group of each of $R_4$ to $R_8$ in the formula (2) include linear or branched amide groups such as an N-methylamide group, an N,N-dimethylamide group, an N-ethylamide group, an N,N-diethylamide group, an N-isopropylamide group, an N,N-diisopropylamide group, an N-n-butylamide group, an N,N-di-n-butylamide group, an N-isobutylamide group, an N,N-diisobutylamide group, an N-sec-butylamide group, an N,N-di-sec-butylamide group, an N-tert-butylamide group, an N-octylamide group, an N,N-dioctylamide group, an N-nonylamide group, an N,N-dinonylamide group, an N-decylamide group, an N,N-didecylamide group, an N-undecylamide group, an N,N-diundecylamide group, an N-dodecylamide group, an N,N-didodecylamide group, an N-hexadecylamide group, an N-octadecylamide group, an N-phenylamide group, an N-(2-ethylhexyl)amide group and an N,N-di(2-ethylhexyl) amide group.

The sulfonic acid group of each of $R_4$ to $R_8$ in the formula (2) may be in the form of a free acid ($SO_3H$), or may form an ion pair with a positive ion. Examples of the positive ion that can be used for such formation include alkali metal ions such as a lithium ion, a sodium ion and a potassium ion, and ammonium ions such as an ammonium ion, a methylammonium ion, a dimethylammonium ion, a trimethylammonium ion, a tetramethylammonium ion, an ethylammonium ion, a diethylammonium ion, a triethylammonium ion, a tetraethylammonium ion, a n-propylammonium ion, an isopropylammonium ion, a diisopropylammonium ion, a n-butylammonium ion, a tetra n-butylammonium ion, an isobutylammonium ion, a monoethanolammonium ion, a diethanolammonium ion and a triethanolammonium ion.

The urea group and the thiourea group of each of $R_4$ to $R_8$ in the formula (2) may have a substituent. In such a case, examples of the substituent that may be used include an alkyl group, an alkyloxycarbonyl group and a phenyl group.

The urea group and the thiourea group of each of $R_4$ to $R_8$ in the formula (2) can form a ring together with two adjacent moieties of $R_4$ to $R_8$. The 5-membered heterocyclic ring formed here is an imidazolone ring in the case of the urea group, and is an imidazolidinethione ring in the case of the thiourea group.

At least one of $R_4$ to $R_8$ in the formula (2) and the formula (3) is preferably the linking group from the viewpoint of the affinity with a pigment. Furthermore, more preferably, at least one of $R_4$ to $R_8$ is the linking group from the viewpoint of easiness of production, and $R_4$ to $R_8$ not having the linking group are each a hydrogen atom.

Examples of the aryl group of Ar in each of the formula (2) and the formula (3) include a phenyl group and a naphthyl group.

Ar in each of the formula (2) and the formula (3) may have further a substituent other than the linking group as long as the affinity with a pigment is not remarkably impaired. In such a case, the substituent that may be used include an alkyl group, an alkoxy group, a hydroxyl group, a cyano group, a halogen atom, a trifluoromethyl group, an alkoxycarbonyl group, a carboxamide group, a sulfonamide group, an alkoxysulfonyl group, a sulfonic acid group, a urea group and a thiourea group.

The urea group and the thiourea group listed as the substituent of Ar in each of the formula (2) and the formula (3) can form a ring together with two adjacent moieties of the aryl group. The 5-membered heterocyclic ring formed here is an imidazolone ring in the case of the urea group, and is an imidazolidinethione ring in the case of the thiourea group.

When Ar in each of the formula (2) and the formula (3) has the linking group, other moieties of Ar, which can be substituted, can be each a hydrogen atom.

The substituent of Ar in each of the formula (2) and the formula (3) preferably has an alkoxycarbonyl group, a carboxamide group, a sulfonamide group and a urea group from the viewpoint of the affinity with a pigment. Furthermore, more preferably, at least one substituent of Ar is the above substituent and other substituents thereof are each a hydrogen atom from the viewpoint of easiness of production.

Ar in each of the formula (2) and the formula (3) can be a phenyl group, among the above groups, from the viewpoints of the affinity with a pigment and easiness of production. That is, the compound represented by the formula (2) can be a compound represented by the following formula (4):

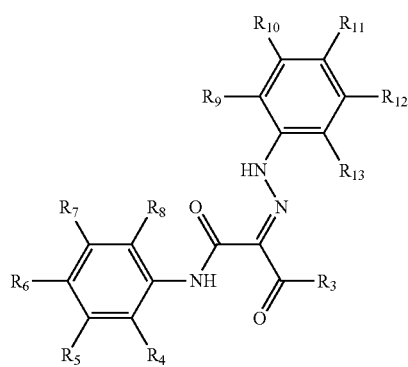

formula (4)

wherein
at least one $R_3$ to $R_{13}$ is bound to the polymer via a linking group, $R_3$ to $R_8$ have the same meanings as $R_3$ to $R_8$ in the formula (2), $R_9$ to $R_{13}$, when not bound to the polymer, represent a hydrogen atom, an alkyl group, an alkoxy group, a hydroxyl group, a cyano group, a halogen atom, a trifluoromethyl group, an alkoxycarbonyl group, a carboxamide group, a sulfonamide group, an alkoxysulfonyl group, a sulfonic acid group, a urea group, a thiourea group and the following formula (5), the urea group optionally forms a 5-membered heterocyclic ring together with two adjacent carbon atoms of $R_9$ to $R_{13}$, and any of $R_9$ to $R_{13}$, when bound to the polymer, represents a group formed by leaving of a hydrogen atom from the functional group that can be represented by $R_9$ to $R_{13}$ not bound to the polymer;

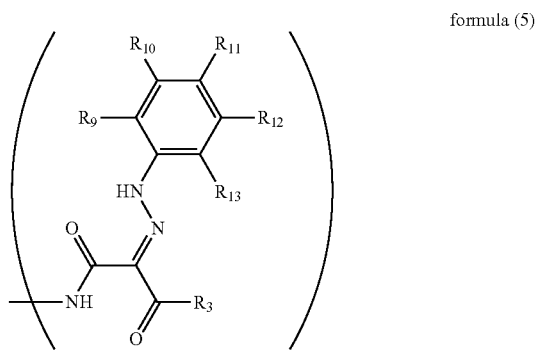

formula (5)

wherein $R_3$ has the same meanings as $R_3$ in the formula (2), and
$R_9$ to $R_{13}$ have the same meanings as $R_9$ to $R_{13}$ in the formula (4).

Examples of the alkyl group of each of $R_9$ to $R_{13}$ in each of the formula (4) and the formula (5) include linear, branched or cyclic alkyl groups such as a methyl group, an ethyl group, a n-propyl group, a n-butyl group, a n-pentyl group, a n-hexyl group, an isopropyl group, an isobutyl group, a sec-butyl group, a tert-butyl group and a cyclohexyl group.

Examples of the alkoxy group of each of $R_9$ to $R_{13}$ in each of the formula (4) and the formula (5) include a methoxy group, an ethoxy group and a phenoxy group.

Examples of the halogen atom of each of $R_9$ to $R_{13}$ in each of the formula (4) and the formula (5) include a fluorine atom, a chlorine atom, a bromine atom and an iodine atom.

Examples of the alkoxycarbonyl group of each of $R_9$ to $R_{13}$ in each of the formula (4) and the formula (5) include linear or branched ester groups such as a methoxycarbonyl group, an ethoxycarbonyl group, a n-propoxycarbonyl group, an isopropoxycarbonyl group, a n-butoxycarbonyl group, isobutoxycarbonyl, a sec-butoxycarbonyl group, a tert-butoxycarbonyl group, an octoxycarbonyl group, a nonoxycarbonyl group, a desoxycarbonyl group, an undesoxycarbonyl group, a dodesoxycarbonyl group, a hexadesoxycarbonyl group, octadesoxycarbonyl, an eicosoxycarbonyl group, a docosoxycarbonyl group, 2-ethylhexyoxycarbonyl, a phenoxy group, a benzoxycarbonyl group and a 2-hydroxyethoxycarbonyl group. Examples of the alkoxysulfonyl group include a group in which carbonyl of each of such alkoxycarbonyl groups is changed to sulfonyl.

Examples of the amide group of each of the carboxamide group and the sulfonic acid amide group of each of $R_9$ to $R_{13}$ in each of the formula (4) and the formula (5) include linear or branched amide groups such as an N-methylamide group, an N,N-dimethylamide group, an N-ethylamide group, an N,N-diethylamide group, an N-isopropylamide group, an N,N-diisopropylamide group, an N-n-butylamide group, an N,N-di-n-butylamide group, an N-isobutylamide group, an N,N-diisobutylamide group, an N-sec-butylamide group, an N,N-di-sec-butylamide group, an N-tert-butylamide group, an N-octylamide group, an N,N-dioctylamide group, an N-nonylamide group, an N,N-dinonylamide group, an N-decylamide group, an N,N-didecylamide group, an N-undecylamide group, an N,N-diundecylamide group, an N-dodecylamide group, an N,N-didodecylamide group, an N-hexadecylamide group, an N-octadecylamide group, an N-phenylamide group, an N-(2-ethylhexyl)amide group and an N,N-di(2-ethylhexyl)amide group.

The sulfonic acid group of each of $R_9$ to $R_{13}$ in each of the formula (4) and the formula (5) may be in the form of a free acid ($SO_3H$), or may form an ion pair with a positive ion. Examples of the positive ion that can be used for such formation include alkali metal ions such as a lithium ion, a sodium ion and a potassium ion, and ammonium ions such as an ammonium ion, a methylammonium ion, a dimethylammonium ion, a trimethylammonium ion, a tetramethylammonium ion, an ethylammonium ion, a diethylammonium ion, a triethylammonium ion, a tetraethylammonium ion, a n-propylammonium ion, an isopropylammonium ion, a diisopropylammonium ion, a n-butylammonium ion, a tetra n-butylammonium ion, an isobutylammonium ion, a monoethanolammonium ion, a diethanolammonium ion and a triethanolammonium ion.

The urea group and the thiourea group of each of $R_9$ to $R_{13}$ in each of the formula (4) and the formula (5) may have a substituent. In such a case, examples of the substituent that may be used include an alkyl group, an alkyloxycarbonyl group and a phenyl group.

The urea group and the thiourea group of each of $R_9$ to $R_{13}$ in each of the formula (4) and the formula (5) can form a ring together with two adjacent moieties of $R_9$ to $R_{13}$. The 5-membered heterocyclic ring formed here is an imidazolone ring in the case of the urea group, and is an imidazolidinethione ring in the case of the thiourea group.

When some of $R_9$ to $R_{13}$ in each of the formula (4) and the formula (5) has the linking group, $R_9$ to $R_{13}$ not having the linking group can be each a hydrogen atom from the viewpoint of easiness of production.

The substituent of each of $R_9$ to $R_{13}$ in each of the formula (4) and the formula (5) preferably has an alkoxycarbonyl group, a carboxamide group, a sulfonamide group and a urea group from the viewpoint of the affinity with a pigment. Furthermore, more preferably, at least one substituent of $R_9$ to $R_{13}$ is the above substituent and other substituents thereof are each a hydrogen atom, from the viewpoint of easiness of production.

The number of substitutions of the polymer bound to the partial structure represented by each of the formulae (4) and (5) is not particularly limited, and can be 1 or 2 from the viewpoint of easiness of production.

Then, the linking group of the polymer moiety and the colorant, formed in the production method of the present invention, is described in detail.

The linking group of the polymer moiety and the colorant, formed in the production method of the present invention, is formed by binding the radical polymerization initiator residue after radical generation at the α-terminal of the polymer moiety produced in step (i) to the substituent in the colorant in step (ii), as described above. Specific examples of the linking group includes partial structures represented by the following formulae (6) to (10):

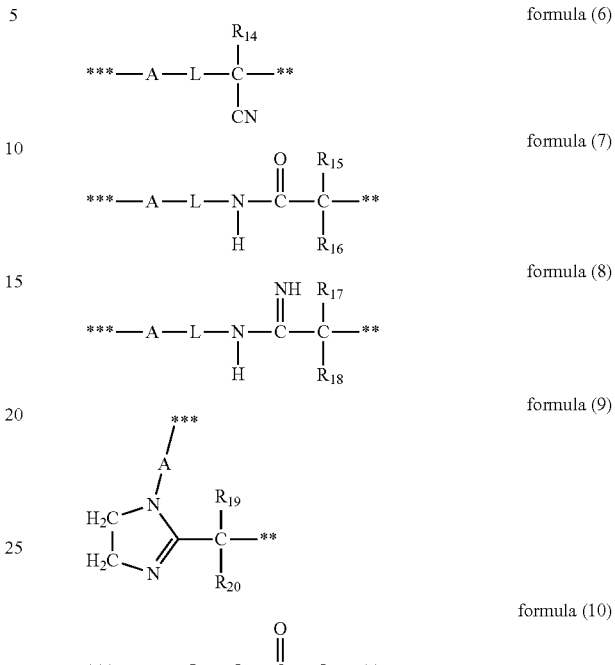

wherein

"**" represents a binding position to the polymer,

"***" represents a binding position to the colorant structure portion,

"A" represents a carboxylic acid amide bond, a carboxylic acid ester bond, a sulfonic acid amide bond, a sulfonic acid ester bond or an ether bond, "L" represents a single bond or an alkylene group, and $R_{14}$ to $R_{20}$ represent a hydrogen atom or an alkyl group.

Examples of the alkyl group of each of $R_{14}$ to $R_{20}$ in the formulae (6) to (10) include linear, branched or cyclic alkyl groups such as a methyl group, an ethyl group, a n-propyl group, a n-butyl group, a n-pentyl group, a n-hexyl group, an isopropyl group, an isobutyl group, a sec-butyl group, a tert-butyl group and a cyclohexyl group.

Examples of the alkylene group of each L in the formulae (6) to (10) include linear, branched or cyclic alkylene groups such as a methylene group, an ethylene group, a n-propylene group, a n-butylene group, a n-pentylene group, a n-hexylene group, an isopropylene group, an isobutylene group, a sec-butylene group, a tert-butylene group and a cyclohexylene group.

Each "A" in the formulae (6) to (10) can be a carboxylic acid amide bond, among the above bonds, from the viewpoints of the affinity with a pigment and easiness of production. Furthermore, the formula (6) can be adopted from the viewpoint of easiness of production.

Herein, with respect to the compound having a colorant structure portion represented by each of the formulae (2) and (4), which can be suitably used in the production method of the present invention, tautomers represented by the following formulae (11) and (12) are present as shown in the following scheme, and such tautomers are also within the scope of the present invention:

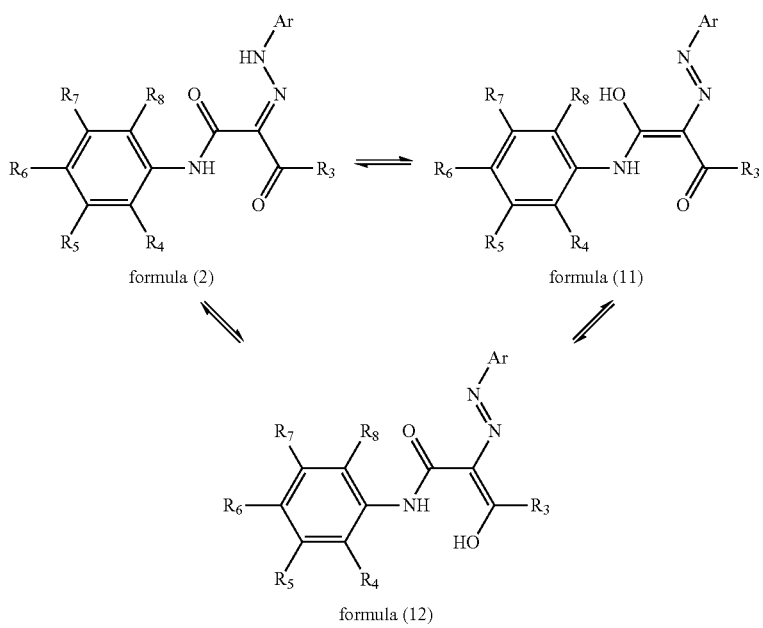

formula (2)   formula (11)

formula (12)

wherein $R_3$ to $R_8$ and Ar each in the formulae (11) to (12) have the same meanings as $R_3$ to $R_8$ and Ar in the formula (2).

Then, specific examples of the method for producing the colorant structure portion are described in detail with reference to the following scheme:

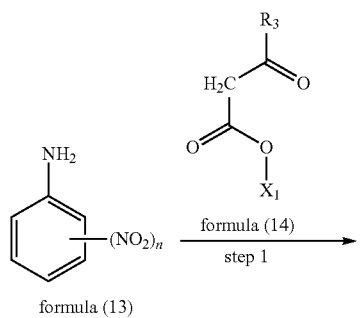

formula (13)

formula (15)

formula (17)

formula (18)

wherein $R_3$ and Ar in the formulae (13) to (18) each have the same meanings as $R_3$ and Ar in the formula (2), $X_1$ in the formula (14) represents a leaving group, and each n in the formula (13), the formula (15), the formula (17) and the formula (18) denotes an integer of 1 or 2.

In the scheme exemplified above, the colorant structure portion can be synthesized through the following steps 1 to 3. In step 1, an aniline derivative represented by the formula (13) and an acetoacetic acid analog represented by the formula (14) are amidated to synthesize an intermediate (15) being an acyl acetanilide analog. In step 2, the intermediate (15) and an aniline derivative (16) are subjected to diazo coupling to synthesize a colorant compound (17). In step 3, the nitro group in the colorant compound (17) is reduced to synthesize a colorant compound (18).

First, step 1 is described.

A known method can be utilized in step 1. For example, see Datta E. Ponde and other four persons, "The Journal of Organic Chemistry", (USA), American Chemical Society, 1998, No. 63, Vol. 4, pp. 1058-1063. When $R_3$ in the formula (15) represents a methyl group, the intermediate can also be synthesized by a method using diketene instead of a raw material (14). For example, see Kiran Kumar Solingapuram Sai and other two persons, "The Journal of Organic Chemistry", (USA), American Chemical Society, 2007, Vol. 72, No. 25, pp. 9761-9764.

The nitroaniline derivative (13) and the acetoacetic acid analog (14) each are variously commercially supplied and are easily available, or can be easily synthesized by a known method.

While step 1 can also be conducted in the absence of a solvent, step 1 can be conducted in the presence of a solvent in order to prevent the reaction from rapidly progressing. The solvent is not particularly limited as long as the solvent does not inhibit the reaction, and examples thereof include alcohols such as methanol, ethanol and propanol, esters such as methyl acetate, ethyl acetate and propyl acetate, ethers such as diethyl ether, tetrahydrofuran and dioxane, hydrocarbons such as benzene, toluene, xylene, hexane and heptane, halogen-containing hydrocarbons such as dichloromethane, dichloroethane and chloroform, amides such as N,N-dimethylformamide, N-methylpyrrolidone and N,N-dimethylimidazolidinone, nitriles such as acetonitrile and propionitrile, acids such as formic acid, acetic acid and propionic acid, and water. Such solvents may also be if necessary used as a mixture of two or more, and the mixing ratio in use of such a mixture can be arbitrarily determined depending on the solubility of a solute. The amount of the solvent used can be arbitrarily determined and can be within the range from 1.0 to 20 times the mass of the compound represented by the formula (13) from the viewpoint of the reaction rate.

Step 1 is usually conducted within the temperature range from 0 to 250° C., and usually completed within 24 hours.

Then, step 2 is described.

A known method can be utilized in step 2. Specific examples include a method described below. First, an aniline derivative (15) is reacted with a diazotizing agent such as sodium nitrite or nitrosyl sulfuric acid in a methanol solvent in the presence of an inorganic acid such as hydrochloric acid or sulfuric acid to synthesize a corresponding diazonium salt. Furthermore, the diazonium salt is coupled with an intermediate (16) to synthesize a colorant compound (17).

The aniline derivative (16) is variously commercially supplied and is easily available, or can be easily synthesized by a known method.

While step 2 can also be conducted in the absence of a solvent, step 2 can be conducted in the presence of a solvent in order to prevent the reaction from rapidly progressing. The solvent is not particularly limited as long as the solvent does not inhibit the reaction, and examples thereof include alcohols such as methanol, ethanol and propanol, esters such as methyl acetate, ethyl acetate and propyl acetate, ethers such as diethyl ether, tetrahydrofuran and dioxane, hydrocarbons such as benzene, toluene, xylene, hexane and heptane, halogen-containing hydrocarbons such as dichloromethane, dichloroethane and chloroform, amides such as N,N-dimethylformamide, N-methylpyrrolidone and N,N-dimethylimidazolidinone, nitriles such as acetonitrile and propionitrile, acids such as formic acid, acetic acid and propionic acid, and water. Such solvents may also be if necessary used as a mixture of two or more, and the mixing ratio in use of such a mixture can be arbitrarily determined depending on the solubility of a solute. The amount of the solvent used can be arbitrarily determined and can be within the range from 1.0 to 20 times the mass of the compound represented by the formula (15) from the viewpoint of the reaction rate.

Step 2 is usually conducted within the temperature range from −50 to 100° C., and usually completed within 24 hours.

Then, step 3 is described.

A known method can be utilized in step 3. Specifically, a method described in, for example, "Experimental Chemical Lecture", Maruzen, 2nd edition, Vol. 17-2, pp. 162-179 can be utilized as a method using a metal compound or the like. A method described in, for example, "New Experimental Chemical Lecture", Maruzen, 1st edition, Vol. 15, pp. 390-448 or International Publication No. WO 2009/060886 can be utilized as a catalytic hydrogenation method.

While step 3 can also be conducted in the absence of a solvent, step 3 can be conducted in the presence of a solvent in order to prevent the reaction from rapidly progressing. The solvent is not particularly limited as long as the solvent does not inhibit the reaction, and examples thereof include alcohols such as methanol, ethanol and propanol, esters such as methyl acetate, ethyl acetate and propyl acetate, ethers such as diethyl ether, tetrahydrofuran and dioxane, hydrocarbons such as benzene, toluene, xylene, hexane and heptane, and amides such as N,N-dimethylformamide, N-methylpyrrolidone and N,N-dimethylimidazolidinone. Such solvents may also be if necessary used as a mixture of two or more, and the mixing ratio in use of such a mixture can be arbitrarily determined depending on the solubility of a solute. The amount of the solvent used can be arbitrarily determined depending on the solubility of a solute and can be within the range from 1.0 to 20 times the mass of the compound represented by the formula (17) from the viewpoint of the reaction rate.

Step 3 is usually conducted within the temperature range from 0 to 250° C., and usually completed within 24 hours.

The colorant structure portion is required to have a substituent forming a carboxylic acid ester bond, a carboxylic acid amide bond, a sulfonic acid ester bond, a sulfonic acid amide bond and an ether bond in step (ii) of the production method of the present invention. While the compound having a nitro group, represented by the formula (13), is used as an example in the above scheme, a compound having a substituent that can form the above bonds may also be used.

For example, the compound represented by the formula (13) as a starting material may be changed to a hydroxyl group-containing compound having a protective group and subjected to a deprotection reaction in step 3, to be converted into a compound having a hydroxyl group. Alternatively, the compound represented by the formula (13) may be changed to a compound having a carbamate group and subjected to a decarbamation reaction in step 3, to be converted into a compound having an amino group. Furthermore, the compound represented by the formula (13) may be changed to a compound having a carboxylic acid ester group and subjected to hydrolysis of an ester in step 3, to be converted into a carboxylic acid.

The compound having a colorant structure portion obtained by the above-exemplified method, and the compounds represented by the formulae (15), (17) and (18) can be purified using a common isolation and purification method of an organic compound. Examples of the isolation and purification method include a recrystallization method or a re-precipitation method using an organic solvent, and column chromatography using silica gel. Such methods can be conducted singly or in combination of two or more for purification, thereby providing a compound having a high purity.

The compounds represented by the formulae (15), (17) and (18) are subjected to identification and purity measurement by nuclear magnetic resonance spectroscopic analysis (ECA-400, manufactured by JEOL Ltd.), ESI-TOF MS (LC/MSD TOF, manufactured by Agilent Technologies) and HPLC analysis (LC-20A, manufactured by Shimadzu Corporation).

The compound having a colorant structure portion is subjected to identification and molecular weight measurement by size exclusion chromatography (SEC) (HLC8220GPC, manufactured by Tosoh Corporation), nuclear magnetic resonance spectroscopic analysis (ECA-400 manufactured by JEOL Ltd., or FT-NMR AVANCE-600 manufactured by Bruker BIOSPIN), and acid value measurement based on JIS K-0070 (automatic titration measuring apparatus COM-2500, manufactured by Hiranuma Sangyo Co., Ltd.).

Then, the pigment dispersant and the pigment composition of the present invention are described.

The pigment dispersant of the present invention contains the compound having a colorant structure portion because the compound having a colorant structure portion compound is high in affinity with various pigments and also high in affinity with a water-insoluble solvent. The compound having a colorant structure portion here can be used as a pigment dispersant singly or in combination of two or more.

The pigment dispersant of the present invention may contain the compound having a colorant structure portion of the present invention.

The pigment composition of the present invention has the pigment dispersant and a pigment. The pigment composition can be used for a paint, an ink, a toner and a resin molded article.

As a yellow pigment contained in the pigment composition of the present invention, a yellow pigment described in, for example, "Organic Pigments Handbook" published in 2006 (author/publisher; Isao HASHIMOTO) can be appropriately selected and used. Specific examples include a monoazo type pigment, a bisazo type pigment, a polyazo type pigment, an isoindoline type pigment, a condensed azo type pigment, an azomethine type pigment, an anthraquinone type pigment or a quinoxaline type pigment. In particular, a monoazo type pigment, a bisazo type pigment, a polyazo type pigment and an isoindoline type pigment can be suitably used. Specifically, acetoacetanilide type pigments such as C.I. Pigment Yellow 74, 83, 93, 128, 155, 175 and 180, and isoindoline type pigments such as C.I. Pigment Yellow 139 and 185 are preferable because being high in affinity with the compound having a colorant structure portion obtained by the production method of the present invention. In particular, C.I. Pigment Yellow 155, 180 and 185 are more preferable because of being high in dispersive effect by the compound having a colorant structure portion obtained by the production method of the present invention.

The above yellow pigment may be used singly or in combination of two or more.

As a yellow colorant contained in the pigment composition of the present invention, the above yellow pigment and a known yellow colorant can be used in combination as long as the dispersibility of the pigment is not impaired.

The colorant that can be used in combination includes compounds typified by a condensed azo compound, an isoindolinone compound, an anthraquinone compound, an azo metal complex, a methine compound, a quinophthalone compound and an allylamide compound.

Specifically, C.I. Pigment Yellow 12, 13, 14, 15, 17, 62, 94, 95, 97, 109, 110, 111, 120, 127, 129, 139, 147, 151, 154, 168, 174, 176, 181, 191, 194, 213 and 214, C.I.Vat yellow 1, 3 and 20, Mineral Fast yellow, Nable yellow, Naphthol yellow S, Hansa yellow G, Permanent yellow NCG, and C.I. Solvent Yellow 9, 17, 24, 31, 35, 58, 93, 100, 102, 103, 105, 112, 162 and 163 can be used.

A magenta pigment contained in the pigment composition of the present invention can be appropriately selected from magenta pigments (quinacridone type pigment, monoazo naphthol type pigment, disazonaphthol type pigment, perylene type pigment, thioindigo type pigment, diketopyrrolopyrrole type pigment, naphthol AS type pigment, BONA lake type pigment and the like) described in, for example, "Organic Pigments Handbook" published in 2006 (author/publisher; Isao HASHIMOTO), and used. In particular, a quinacridone type pigment, a diketopyrrolopyrrole type pigment, a naphthol AS type pigment and a BONA lake type pigment are preferable.

Furthermore, in particular, a quinacridone type pigment represented by the following formula (19), a diketopyrrolopyrrole type pigment represented by the following formula (20), a naphthol AS type pigment represented by the following formula (21) and a BONA lake type pigment are more preferable because of being high in affinity with the compound having a colorant structure portion obtained by the production method of the present invention:

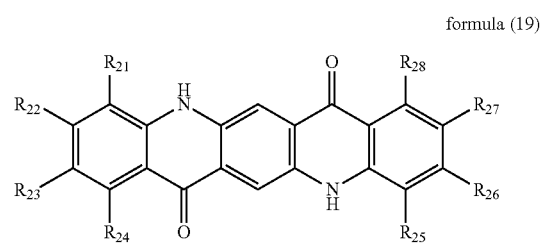

formula (19)

wherein $R_{21}$ to $R_{28}$ each independently represent a hydrogen atom, a chlorine atom or a methyl group;

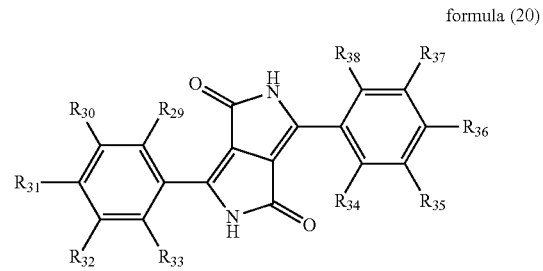

formula (20)

wherein $R_{29}$ to $R_{38}$ each independently represent a hydrogen atom, a chlorine atom, a tert-butyl group, a cyano group or a phenyl group;

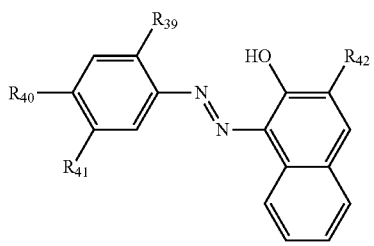

formula (21)

wherein $R_{39}$ to $R_{41}$ each independently represent a hydrogen atom, a methoxy group, a methyl group, a nitro group, a chlorine atom, an N,N-diethylaminosulfonyl group, a sulfonic acid group, a sulfonic acid salt group or a $CONHR_{43}$ group, $R_{42}$ represents an amino group, a carboxylic acid group, a carboxylate group or a $CONHR_{44}$ group, and $R_{43}$ and $R_{44}$ each independently represent a hydrogen atom or a phenyl group.

Examples of the quinacridone type pigment represented by the formula (19) include C.I. Pigment Red 122, 192, 202 and 209.

In the formula (19), $R_{21}$, $R_{22}$, $R_{24}$ to $R_{26}$ and $R_{28}$ can be each a hydrogen atom, and $R_{23}$ and $R_{27}$ can be each a hydrogen atom, a chlorine atom or a methyl group, from the viewpoint of the affinity with the compound having a colorant structure portion obtained by the production method of the present invention.

Examples of the diketopyrrolopyrrole type pigment represented by the formula (20) include C.I. Pigment Red 254, 255 and 264.

In the formula (20), $R_{29}$, $R_{30}$, $R_{32}$ to $R_{35}$, $R_{37}$ and $R_{38}$ can be each a hydrogen atom, and $R_{21}$ and $R_{36}$ can be each a hydrogen atom or a phenyl group, from the viewpoint of the affinity with the compound having a colorant structure portion obtained by the production method of the present invention.

Examples of the naphthol AS type pigment represented by the formula (21) include C.I. Pigment Red 2, 3, 5, 6, 7, 23, 146, 150, 184 and 269.

Examples of the BONA lake type pigment represented by the formula (21) include C.I. Pigment Red 48:2, 48:3, 48:4 and 57:1.

With respect to $R_{39}$ to $R_{44}$ in the formula (21), in particular, at least one of $R_{39}$ to $R_{41}$ can be a $CONHR_{43}$ group and $R_{42}$ can be a $CONHR_{44}$ group from the viewpoint of the affinity with the compound having a colorant structure portion obtained by the production method of the present invention. Furthermore, $R_{44}$ can be a hydrogen atom from the viewpoint of the affinity with the compound having a colorant structure portion obtained by the production method of the present invention.

In the present invention, in particular, quinacridone type pigments such as C.I. Pigment Red 122 and 202, and naphthol AS type pigments such as C.I. Pigment Red 150, 255 and 264 can be adopted from the viewpoint of the affinity with the compound having a colorant structure portion obtained by the production method of the present invention.

The above magenta pigment may be used singly or as a mixture of two or more.

As a magenta colorant contained in the pigment composition of the present invention, the above magenta pigment and a known magenta colorant can be used in combination as long as the dispersibility of the pigment is not impaired.

The magenta colorant that can be used in combination includes a condensed azo compound, anthraquinone, a base dye lake compound, a benzimidazolone compound, a thioindigo compound and a perylene compound.

Specific examples include C.I. Pigment Red 81:1, 144, 166, 169, 177, 185, 220, 221 and 238.

As a cyan pigment contained in the pigment composition of the present invention, a phthalocyanine pigment represented by each of the following formulae (22) and formula (B) can be suitably used:

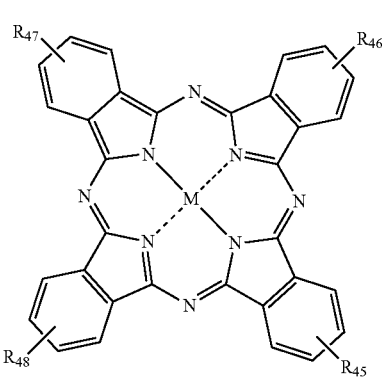

formula (22)

wherein $R_{45}$ to $R_{48}$ each independently represent hydrogen, an alkyl group, a sulfonic acid group or a sulfonic acid salt group, and M denotes a metal atom;

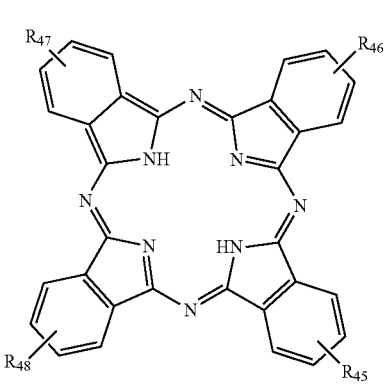

formula (B)

wherein $R_{45}$ to $R_{48}$ each independently represent hydrogen, an alkyl group, a sulfonic acid group or a sulfonic acid salt group.

Examples of the phthalocyanine pigment represented by each of the following formulae (22) and formula (B) include C.I. Pigment Blue 15, 15:1, 15:2, 15:3, 15:4, 15:5, 15:6, 16, 17, 17:1, 68, 70, 75, 76 and 79.

In particular, C.I. Pigment Blue 15, 15:1, 15:2, 15:3, 15:4, 15:5 and 15:6 can be adopted from the viewpoint of the affinity with the compound having a colorant structure portion obtained by the production method of the present invention.

The cyan pigment may be used singly or as a mixture of two or more.

As a cyan colorant contained in the pigment composition of the present invention, the cyan pigment and a known cyan colorant can be used in combination as long as the dispersibility of the pigment is not impaired.

Examples of the cyan colorant that can be used in combination include C.I. Pigment Blue 1, 1:2, 1:3, 2, 2:1, 2:2, 3, 4, 5, 6, 7, 8, 9, 9:1, 10, 10:1, 11, 12, 13, 14, 18, 19, 20, 21, 22, 23, 24, 24:1, 25, 26, 27, 28, 29, 30, 31, 32, 33, 34, 35, 36, 36:1, 52, 53, 56, 56:1, 57, 58, 59, 60, 61, 61:1, 62, 63, 64, 65, 66, 67, 69, 71, 72, 73, 74, 77, 78, 80, 81, 82, 83 and 84.

In order to match color tone, a colorant other than the cyan colorant can be used. For example, C.I. Pigment Blue 15:3 can be mixed with C.I. Pigment Green 7 and used to thereby enhance the color purity of cyan.

As a black colorant contained in the pigment composition of the present invention, carbon black can be suitably used.

Carbon black for use in the present invention is not particularly limited, and for example, carbon black obtained by a production method such as a thermal method, an acetylene method, a channel method, a furnace method and a lamp black method can be used.

The number average primary particle size of the carbon black for use in the present invention is not particularly limited, and is preferably 14 to 80 nm, more preferably 25 to 50 nm from the viewpoint of color tone.

Herein, the number primary particle size of the carbon black can be measured by taking a photograph magnified by a scanning electron microscope.

The amount of DBP oil absorption of the carbon black for use in the present invention is not particularly limited, and is preferably 30 to 200 ml/100 g, more preferably 40 to 150 ml/100 g. The amount of DBP oil absorption of the carbon black can be within the above range to thereby further enhance the tinting power of an image printed.

Herein, the amount of DBP oil absorption of the carbon black means the amount of DBP (dibutyl phthalate) absorbed by 100 g of the carbon black, and can be measured according to "JIS K6217".

The pH of the carbon black is not particularly limited as long as the dispersibility of the carbon black in the compound having a colorant structure portion is not remarkably impaired. Herein, the pH of the carbon black can be obtained by subjecting a mixed liquid of the carbon black with distilled water to measurement by a pH electrode.

The specific surface area of the carbon black is not particularly limited and is preferably 300 $m^2$/g or less, more preferably 100 $m^2$/g or less. The specific surface area of the carbon black can be within the above range to thereby further reduce the amount of the compound having a colorant structure portion.

Herein, the specific surface area of the carbon black means the BET specific surface area, and can be measured according to "JIS K4652".

The carbon black may be used singly or as a mixture of two or more.

As a black colorant for use in the present invention, the carbon black and a known black colorant can be used in combination as long as the dispersibility of the carbon black is not impaired.

Examples of the black colorant that can be used in combination include C.I. Pigment Black 1, 10 and 31, C.I. Natural Black 1, 2, 3, 4, 5 and 6, and activated carbon.

Furthermore, a black colorant contained in the pigment composition of the present invention may be used in combination with a known magenta colorant, cyan colorant or yellow colorant for color toning.

Herein, the pigment that can be used in the present invention is not limited to the above pigments because even a pigment other than the yellow pigment, the cyan pigment, the magenta pigment or the carbon black can be used as long as the pigment has the affinity with the pigment dispersant of the present invention.

Such pigments may be each a crude pigment (pigment that is produced from a raw material corresponding to each of the above pigments, and that is not prepared by purification, control of the crystal form and the particle size, and a surface treatment). A pigment composition prepared may also be adopted as long as the effect of the compound having a colorant structure portion is not remarkably impaired.

The compositional ratio of the pigment to the compound having a colorant structure portion in the pigment composition of the present invention on a mass basis ((mass of pigment):(mass of compound having a colorant structure portion)) is preferably within the range from 100:0.1 to 100:100 from the viewpoint of pigment dispersibility. The compositional ratio is more preferably 100:0.5 to 100:20.

The pigment composition can be produced in a dry or wet manner. The compound having a colorant structure portion obtained by the production method of the present invention has a high affinity with a water-insoluble solvent, and thus can be produced in a wet manner in which a uniform pigment composition can be simply produced. Specifically, the pigment composition can be made as follows.

The pigment dispersant and if necessary a resin are molten into a dispersing medium, and a pigment powder is gradually added thereto with stirring and sufficiently dispersed in the dispersing medium. A mechanical shear force can be applied by a dispersing machine to allow the pigment dispersant to adsorb on the surface of the pigment, stably finely dispersing the pigment in the form of a uniform fine particle. Examples of the dispersing machine include a kneader, a roll mill, a ball mill, a paint shaker, a dissolver, an attritor, a sand mill and a high speed mill.

An aid may also be further added to the pigment composition of the present invention in production. Examples of the aid include a surfactant, a dispersant, a filler, a standardizing agent, a resin, wax, an antifoamer, an antistatic agent, an anti-dust agent, an extender, a shading colorant, a preservative, a drying inhibitor, a rheology control additive, a wetting agent, an antioxidant, an UV absorber and a light stabilizer. Such aids may be used in combination. The pigment dispersant of the present invention may be added in advance in production of the crude pigment.

Then, the pigment dispersion of the present invention is described.

The pigment dispersion of the present invention has the pigment composition, and a water-insoluble solvent as a dispersing medium. The pigment dispersion may be one in which the pigment composition is dispersed in a water-insoluble solvent, or may be one in which the respective components of the pigment composition are dispersed in a water-insoluble solvent. For example, the pigment dispersion can be made as follows.

The pigment dispersant and a resin are if necessary molten into a dispersing medium, and a pigment or a pigment composition powder is gradually added thereto with stirring and sufficiently dispersed in the dispersing medium. A mechanical shear force can be applied by a dispersing machine such as a ball mill, a paint shaker, a dissolver, an attritor, a sand mill and a high speed mill to allow the pigment to be stably finely dispersed in the form of a uniform fine particle.

The water-insoluble solvent as the dispersing medium in the pigment dispersion of the present invention is determined depending on the intended use of the pigment dispersion, and is not particularly limited. Examples include esters such as methyl acetate, ethyl acetate and propyl acetate, hydrocarbons such as hexane, octane, petroleum ether, cyclohexane, benzene, toluene and xylene, and halogenated hydrocarbons such as carbon tetrachloride, trichloroethylene and tetrabromoethane.

The water-insoluble solvent as the dispersing medium in the pigment dispersion of the present invention may be a polymerizable monomer. The polymerizable monomer includes the following.

Examples include styrene, α-methylstyrene, α-ethylstyrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, ethylene, propylene, butylene, isobutylene, vinyl chloride, vinylidene chloride, vinyl bromide, vinyl iodide, vinyl acetate, vinyl propionate, vinyl benzoate, methyl methacrylate, ethyl methacrylate, propyl methacrylate, butyl methacrylate, n-octyl methacrylate, dodecyl methacrylate, 2-ethylhexyl methacrylate, stearyl methacrylate, behenyl methacrylate, phenyl methacrylate, dimethylaminoethyl methacrylate, diethylaminoethyl methacrylate, methyl acrylate, ethyl acrylate, n-butyl acrylate, isobutyl acrylate, propyl acrylate, n-octyl acrylate, dodecyl acrylate, 2-ethylhexyl acrylate, stearyl acrylate, behenyl acrylate, 2-chloroethyl acrylate, phenyl acrylate, vinyl methyl ether, vinyl ethyl ether, vinyl isobutyl ether, vinyl methyl ketone, vinyl hexyl ketone, methyl isopropenyl ketone, vinyl naphthaline, acrylonitrile, methacrylonitrile and acrylamide. In particular, the water-insoluble solvent can be styrene from the viewpoint of the affinity with the compound having a colorant structure portion obtained by the production method of the present invention.

The resin that can be molten into the water-insoluble solvent is determined depending on the intended use of the pigment composition, and is not particularly limited. Examples include a polystyrene resin, a styrene copolymer, a polyacrylic resin, a polymethacrylic resin, a polyacrylate resin, a polymethacrylate resin, an acrylate copolymer, a methacrylate copolymer, a polyester resin, a polyvinyl ether resin, a polyvinyl alcohol resin, a polyvinyl butyral resin, a polyurethane resin and a polypeptide resin. Such resins may be used as a mixture of two or more.

Then, the toner of the present invention is described.

The toner of the present invention includes a toner particle containing a binder resin and a colorant. The pigment composition is here used as the colorant to thereby keep good the dispersibility of the pigment in the toner particle, and therefore a toner having a high tinting power can be obtained.

As the binder resin, a known resin commonly used can be used.

Specific examples include a styrene-methacrylic acid copolymer, a styrene-acrylic acid copolymer, a polyester resin, an epoxy resin and a styrene-butadiene copolymer.

The toner particle may be obtained directly by polymerization of a polymerizable monomer by a polymerization method, and the polymerizable monomer used here includes the following.

Examples include styrene type monomers such as styrene, α-methylstyrene, α-ethylstyrene, o-methylstyrene, m-methylstyrene, p-methylstyrene, o-ethylstyrene, m-ethylstyrene and p-ethylstyrene, methacrylate type monomers such as methyl methacrylate, ethyl methacrylate, propyl methacrylate, butyl methacrylate, octyl methacrylate, decyl methacrylate, stearyl methacrylate, behenyl methacrylate, 2-ethylhexyl methacrylate, dimethylaminoethyl methacrylate, diethylaminoethyl methacrylate, methacrylonitrile and methacrylic amide, acrylate type monomers such as methyl acrylate, ethyl acrylate, propyl acrylate, butyl acrylate, octyl acrylate, decyl acrylate, stearyl acrylate, behenyl acrylate, 2-ethylhexyl acrylate, dimethylaminoethyl acrylate, diethylaminoethyl acrylate, acrylonitrile and acrylic amide, and olefin type monomers such as butadiene, isoprene and cyclohexene.

Such monomers are used singly or as an appropriate mixture of monomers so that the theoretical glass transition temperature (Tg) is within the range from to 75° C. (edited by J. Brandrup and E. H. Immergut, "Polymer Handbook", (USA), $3^{rd}$ edition, John Wiley & Sons, 1989, pp. 209-277). The theoretical glass transition temperature can be within the above range to result in further enhancements in storage stability and duration stability of the toner, and clarity of a full color image.

A polar resin such as a polyester resin or a polycarbonate resin and a non-polar resin such as polystyrene can be used in combination as the binder resin, to thereby control distribution of additives such as a colorant, a charge control agent and wax in the toner particle. For example, when the toner particle is directly produced by a suspension polymerization method, the polar resin is added in a polymerization reaction including from a dispersing step to a polymerization step. The polar resin is added depending on the balance in polarity between a polymerizable monomer composition forming the toner particle, and an aqueous medium. As a result, the concentration of the polar resin can be controlled so as to be continuously changed from the surface to the center of the toner particle, for example, the polar resin forms a thin film on the surface of the toner particle. A polar resin that interacts with the compound having a colorant structure portion, the colorant and the charge control agent can be here used to thereby allow the colorant to be present in the toner particle in a desirable form.

In the present invention, in order to not only increase the mechanical strength of the toner particle, but also control the molecular weight of the binder resin, a crosslinking agent can also be further used in synthesis of the binder resin.

As such a crosslinking agent, a bifunctional crosslinking agent and a tri- or higher functional crosslinking agent can be used.

The bifunctional crosslinking agent includes divinyl benzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, respective diacrylates of polyethyleneglycol #200, #400 and #600, dipropylene glycol diacrylate, polypropylene glycol diacrylate, polyester type diacrylate, and crosslinking agents in which each of such diacrylates is replaced with dimethacrylate.

The tri- or higher functional crosslinking agent includes pentaerythritol triacrylate, trimethylolethane triacrylate, trimethylolpropane triacrylate, tetramethylolmethane tetraacrylate, oligoester acrylate and methacrylates thereof, 2,2-bis(4-methacryloxyphenyl)propane, diallyl phthalate, triallyl cyanurate, triallyl isocyanurate and triallyl trimellitate.

The amount of such a crosslinking agent added is preferably 0.05 to 10 parts by weight, more preferably 0.1 to 5 parts by weight based on 100 parts by weight of the polymerizable monomer from the viewpoints of the fixability and the offset resistance of the toner.

In the present invention, wax can also be used in synthesis of the binder resin for preventing adhesion to a fixing member.

Examples of the wax include petroleum waxes such as paraffin wax, microcrystalline wax and petroleum, and derivatives thereof, montan wax and derivatives thereof, hydrocarbon wax by the Fischer-Tropsch process and derivatives thereof, polyolefin wax typified by polyethylene and derivatives thereof, and natural waxes such as carnauba wax and candelilla wax, and derivatives thereof. Such derivatives each include oxide, a block copolymerization product with a vinyl monomer, and a graft-modified product. Examples of the wax further include alcohols such as a higher aliphatic alcohol, fatty acids such as stearic acid and palmitic acid, fatty acid amide, fatty acid ester, hydrogenated castor oil and derivatives thereof, and vegetable wax and animal wax. Such waxes can be used singly or in combination.

The amount of the wax added is preferably 2.5 to 15.0 parts by weight, more preferably 3.0 to 10.0 parts by weight based on 100 parts by weight of the binder resin. The amount of the wax added can be within the above range to thereby further improve fixability and chargeability. In order to control an optimal amount of triboelectric charging of the toner depending on a development system, the toner particle may contain if necessary the charge control agent.

As the charge control agent, a known charge control agent can be used. In particular, a charge control agent can be used which has a high charging speed and which can stably maintain a certain amount of charging. When the toner particle is directly produced from the polymerizable monomer by a polymerization method such as a suspension polymerization method, a charge control agent low in polymerization inhibition property and having substantially no solubilizing substance in an aqueous medium can be particularly adopted.

As the charge control agent, a negatively chargeable charge control agent and a positively chargeable charge control agent can be used.

The negatively chargeable charge control agent includes a polymer or a copolymer having a sulfonic acid group, a sulfonic acid salt group or a sulfonic acid ester group, a salicylic acid derivative, and metal complexes thereof, a monoazo metal compound, an acetylacetone metal compound, an aromatic oxycarboxylic acid, an aromatic mono or polycarboxylic acid, and metal salts, anhydrides and esters thereof, phenol derivatives such as bisphenol, a urea derivative, a metal-containing naphthoic acid type compound, a boron compound, a quaternary ammonium salt, calixarene and a resin type charge control agent.

The positively chargeable charge control agent includes nigrosine and a nigrosin-modified product by a fatty acid metal salt, a guanidine compound, an imidazole compound, tributylbenzylammonium-1-hydroxy-4-naphthosulfonate, a quaternary ammonium salt such as tetrabutylammonium tetrafluoroborate, and onium salts as analogs thereof, such as a phosphonium salt, and lake pigments thereof, a triphenylmethane dye and a lake pigment thereof (laking agent including phosphotungstic acid, phosphomolybdic acid, phosphotungstomolybdic acid, tannic acid, lauric acid, gallic acid, ferricyanide and ferrocyanide), a higher fatty acid metal salt, diorganotin oxides such as dibutyltin oxide, dioctyltin oxide and dicyclohexyltin oxide, diorganotin borates such as dibutyltin borate, dioctyltin borate and dicyclohexyltin borate, and a resin type charge control agent.

Such charge control agents can be used singly or in combination of two or more.

In the toner of the present invention, an inorganic fine powder as a fluidizer may be added to the toner particle. As the inorganic fine powder, silica, titanium oxide, alumina and composite oxides thereof, and such powders subjected to a surface treatment can be used.

The method for producing the toner particle of the present invention includes a grinding method, a suspension polymerization method, a suspension granulation method and an emulsion polymerization method conventionally used. In particular, the toner particle can be produced by a suspension polymerization method or a suspension granulation method, among the above methods, from the viewpoints of environmental load in production and the controllability of the particle size.

The toner particle produced by a suspension polymerization method is produced as follows, for example.

First, the colorant containing the pigment composition of the present invention, the polymerizable monomer, the wax, the polymerization initiator and the like are mixed to prepare a polymerizable monomer composition. Then, the polymerizable monomer composition is dispersed in an aqueous medium to form a particle of the polymerizable monomer composition. Then, the polymerizable monomer in the particle of the polymerizable monomer composition is polymerized in the aqueous medium to provide the toner particle.

The polymerizable monomer composition can be prepared by, first, dispersing the colorant in a first polymerizable monomer to provide a dispersion liquid, and mixing the dispersion liquid with a second polymerizable monomer. That is, the pigment composition can be sufficiently dispersed in the first polymerizable monomer and thereafter mixed with the second polymerizable monomer together with other toner materials, thereby allowing the pigment to be present in the toner particle in a better dispersion state.

As the polymerization initiator for use in the suspension polymerization method, a known polymerization initiator can be used. Examples include an azo compound, an organic peroxide, an inorganic peroxide, an organic metal compound and a photopolymerization initiator. Specific examples include azo type polymerization initiators such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile) and dimethyl 2,2'-azobis(isobutyrate), organic peroxide type polymerization initiators such as benzoyl peroxide, di-tert-butyl peroxide, tert-butylperoxy isopropyl monocarbonate, tert-hexylperoxy benzoate and tert-butylperoxy benzoate, inorganic peroxide type polymerization initiators such as potassium persulfate and ammonium persulfate, and a hydrogen peroxide-ferrous type polymerization initiator, a BPO-dimethylaniline type polymerization initiator and a cerium (IV) salt-alcohol type polymerization initiator. The photopolymerization initiator includes acetophenones, benzoin ethers and ketals. Such polymerization initiators can be used singly or in combination of two or more.

The amount of the polymerization initiator added is preferably 0.1 to 20 parts by weight, more preferably 0.1 to 10 parts by weight based on 100 parts by weight of the polymerizable monomer.

The aqueous medium for use in the suspension polymerization method can contain a dispersion stabilizer. As the dispersion stabilizer, known inorganic and organic dispersion stabilizers can be used.

Examples of the inorganic dispersion stabilizer include calcium phosphate, magnesium phosphate, aluminum phosphate, zinc phosphate, magnesium carbonate, calcium carbonate, calcium hydroxide, magnesium hydroxide, aluminum hydroxide, calcium metasilicate, calcium sulfate, barium sulfate, bentonite, silica and alumina.

Examples of the organic dispersion stabilizer include polyvinyl alcohol, gelatin, methyl cellulose, methylhydroxypropyl cellulose, ethyl cellulose, sodium carboxymethyl cellulose and starch.

Nonionic, anionic and cationic surfactants can also be utilized. Examples include sodium dodecyl sulfate, sodium tetradecyl sulfate, sodium pentadecyl sulfate, sodium octyl sulfate, sodium oleate, sodium laurate, potassium stearate and calcium oleate.

As the dispersion stabilizer, a hardly water-soluble inorganic dispersion stabilizer that is soluble in an acid can be used in the present invention. In the present invention, when the hardly water-soluble inorganic dispersion stabilizer is used to prepare an aqueous medium, the amount of such a dispersion stabilizer added can be 0.2 to 2.0 parts by weight based on 100 parts by weight of the polymerizable monomer. When the amount is within the above range, the droplet stability of the polymerizable monomer composition in the aqueous medium is enhanced. In the present invention, water can be used within the range from 300 to 3000 parts by weight based on 100 parts by weight of the polymerizable monomer composition to prepare the aqueous medium.

In the present invention, when the aqueous medium in which the hardly water-soluble inorganic dispersion stabilizer is dispersed is prepared, a commercially available dispersion stabilizer may be used as it is, and dispersed. Furthermore, the hardly water-soluble inorganic dispersion stabilizer can be generated in water with stirring at a high speed to provide a particle of the dispersion stabilizer, having a fine uniform particle size. For example, when calcium phosphate is used as the dispersion stabilizer, an aqueous sodium phosphate solution and an aqueous calcium chloride solution can be mixed with stirring at a high speed to form a fine particle of calcium phosphate, thereby providing a favorable dispersion stabilizer.

With respect to the toner particle of the present invention, a suitable toner particle can be obtained also when being produced by a suspension granulation method. Since a production process in the suspension granulation method does not have a heating step, compatibilization between a resin and wax, which caused in the case of using low melting wax, can be suppressed to prevent a decrease in the glass transition temperature of the toner due to such compatibilization. The suspension granulation method has a wide range of choices with respect to a toner material serving as the binder resin, and a polyester resin that is advantageous in terms of fixability is easily used as a main component. Therefore, the suspension granulation method is an advantageous production method in the case of producing a toner particle having resin composition in which the suspension polymerization method cannot be applied.

The toner particle produced by the suspension granulation method is produced as follows, for example. First, the colorant containing the pigment composition of the present invention, the binder resin, the wax and the like are mixed in a solvent to prepare a solvent composition. Then, the solvent composition is dispersed in an aqueous medium to form a particle of the solvent composition, providing a toner particle suspension. Then, the resulting suspension is subjected to removal of the solvent by heating or under reduced pressure to provide the toner particle.

The solvent composition in the step can be prepared by mixing a dispersion liquid, in which the colorant is dispersed in a first solvent, with a second solvent. That is, the colorant can be sufficiently dispersed in the first solvent and thereafter mixed with the second solvent together with other toner materials, thereby allowing the pigment to be present in the toner particle in a better dispersion state.

Examples of the solvent that can be used in the suspension granulation method include hydrocarbons such as toluene, xylene and hexane, halogen-containing hydrocarbons such as methylene chloride, chloroform, dichloroethane, trichloroethane and carbon tetrachloride, alcohols such as methanol, ethanol, butanol and isopropyl alcohol, polyhydric alcohols such as ethylene glycol, propylene glycol, diethylene glycol and triethylene glycol, cellosolves such as methyl cellosolve and ethyl cellosolve, ketones such as acetone, methyl ethyl ketone and methylisobutyl ketone, ethers such as benzyl alcohol ethyl ether, benzyl alcohol isopropyl ether and tetrahydrofuran, and esters such as methyl acetate, ethyl acetate and butyl acetate. Such solvents can be used singly or as a mixture of two or more. In particular, a solvent that has a low boiling point and that can sufficiently dissolve the binder resin can be used in order to easily remove the solvent in the toner particle suspension.

The amount of the solvent used is preferably within 50 to 5000 parts by weight, more preferably 120 to 1000 parts by weight based on 100 parts by weight of the binder resin.

The aqueous medium for use in the suspension granulation method can contain a dispersion stabilizer. As the dispersion stabilizer, known inorganic and organic dispersion stabilizers can be used. Examples of the inorganic dispersion stabilizer include calcium phosphate, calcium carbonate, aluminum hydroxide, calcium sulfate and barium carbonate. Examples of the organic dispersion stabilizer include water-soluble polymers such as sodium salts of polyvinyl alcohol, methyl cellulose, hydroxyethyl cellulose, ethyl cellulose and carboxymethyl cellulose, as well as sodium polyacrylate and sodium polymethacrylate, anionic surfactants such as sodium dodecylbenzene sulfinate, sodium octadecyl sulfinate, sodium oleate, sodium laurate and potassium stearate, cationic surfactants such as lauryl amine acetate, stearyl amine acetate and lauryl trimethyl ammonium chloride, zwitterionic surfactants such as lauryl dimethylamine oxide, and nonionic surfactants such as polyoxyethylene alkyl ether, polyoxyethylene alkyl phenyl ether and polyoxyethylene alkylamine.

The amount of the dispersion stabilizer used can be within the range from 0.01 to 20 parts by weight based on 100 parts by weight of the binder resin in terms of the droplet stability of the solvent composition in the aqueous medium.

The weight average particle size of the toner (hereinafter, also designated as D4) is preferably 3.0 to 15.0 μm, more preferably 4.0 to 12.0 μm. When the weight average particle size of the toner is within the above range, charge stability is improved, and fogging or toner scattering can be suppressed in continuous development for a large number of sheets. Furthermore, reproducibility of a halftone area is also enhanced to easily reduce surface irregularities of an image obtained.

The ratio of the weight average particle size D4 to the number average particle size (hereinafter, also designated as D1) of the toner (hereinafter, also designated as D4/D1) is preferably 1.35 or less, more preferably 1.30 or less. When the ratio D4/D1 is within the above range, the occurrence of fogging and a reduction in transfer efficiency can be suppressed, and an image having a high resolution is easily obtained.

Herein, D4 and D1 of the toner can be adjusted by the method for producing the toner particle. For example, in the case of the suspension polymerization method, D4 and D1 can be adjusted by controlling, for example, the concentration of the dispersion stabilizer for use in preparation of the aqueous medium, the reaction stirring speed or the reaction stirring time.

The toner of the present invention may be either of a magnetic toner or a non-magnetic toner. In the case of use as a magnetic toner, the toner particle forming the toner of the present invention may be used with being mixed with a magnetic material. Such a magnetic material includes iron oxides such as magnetite, maghemite and ferrite, or iron oxides including other metal oxides, metals such as Fe, Co and Ni, or alloys of such a metal with a metal such as Al, Co, Cu, Pb, Mg, Ni, Sn, Zn, Sb, Be, Bi, Cd, Ca, Mn, Se, Ti, W and V, and mixtures thereof. A magnetic material particularly suitable for the objects of the present invention is a fine powder of ferrosoferric oxide or γ-iron sesquioxide.

Such a magnetic substance preferably has an average particle size of 0.1 to 2 μm, more preferably 0.1 to 0.3 μm. In addition, magnetic characteristics in application of 795.8 kA/m can be, from the viewpoint of the developability of the toner, as follows: coercive force: 1.6 to 12 kA/m, saturated magnetization: 5 to 200 $Am^2/kg$ (preferably 50 to 100 $Am^2/kg$), and remanent magnetization: 2 to 20 $Am^2/kg$.

The amount of such a magnetic material added is preferably 10 to 200 parts by weight, more preferably 20 to 150 parts by weight in terms of the magnetic substance based on 100 parts by weight of the binder resin.

EXAMPLES

Hereinafter, the present invention is described in more detail with reference to Examples and Comparative Examples, but the present invention is not limited to the following Examples. Hereinafter, "part(s)" and "%" are expressed on a mass basis, unless otherwise indicated.

Hereinafter, measurement methods for use in the present Production Examples are shown.

(1) Molecular Weight Measurement

The molecular weight of the compound having a colorant structure portion was calculated in terms of polystyrene by size exclusion chromatography (SEC). The molecular weight by SEC was measured as follows.

A sample was added to the following eluent so that the sample concentration was 1.0%, and left to still stand at room temperature for 24 hours, to provide a solution. The solution was filtrated through a solvent-resistant membrane filter having a pore diameter of 0.2 μm to provide a sample solution, and the sample solution was subjected to the measurement under the following conditions.
Apparatus: high-speed GPC apparatus "HLC-8220GPC" (manufactured by Tosoh Corporation)
Column: LF-804, two columns in series
Eluent: THF
Flow rate: 1.0 ml/min
Oven temperature: 40° C.
Amount of specimen injected: 0.025 ml In calculation of the molecular weight of the specimen, the molecular weight calibration curve created using standard polystyrene resins (manufactured by Tosoh Corporation TSK, Standard polystyrenes F-850, F-450, F-288, F-128, F-80, F-40, F-20, F-10, F-4, F-2, F-1, A-5000, A-2500, A-1000 and A-500) was used.

(2) Acid Value Measurement

The acid value of the compound having a colorant structure portion was measured by the following method. The basic operation was according to JIS K-0070.

1) A specimen (0.5 to 2.0 g) was precisely weighed. The mass here was designated as M(g).
2) The specimen was loaded to a 50 ml beaker, and 25 ml of a mixed liquid of tetrahydrofuran/ethanol (2/1) was added thereto to dissolve the specimen in the liquid.
3) A solution of 0.1 mol/l KOH in ethanol was used for titration using a potential difference titration measurement apparatus (for example, automatic titration measuring apparatus "COM-2500" manufactured by Hiranuma Sangyo Co., Ltd. could be used.).
4) The amount of the KOH solution used here was designated as S(ml). The blank was simultaneously subjected to the measurement and the amount of KOH used here was designated as B(ml).
5) The acid value was calculated by the following expression, f representing a factor of the KOH solution.

Acid value (mgKOH/g)=$(S-B) \times f \times 5.61/M$ (3) Composition Analysis

The polymer and the compound having a colorant-structure was determined using the following apparatuses.
$^1$H NMR:
ECA-400 manufactured by JEOL Ltd. (solvent used: deuterated chloroform)
$^{13}$C NMR:
FT-NMR AVANCE-600 manufactured by Bruker BIOSPIN (solvent used: deuterated chloroform)

In $^{13}$C NMR, the composition analysis was conducted by quantification with the inverse-gated decoupling method in which chromium (III) acetylacetonate was used as a shiftless relaxation reagent.

(4) Number of Colorant Structure Units

The number of colorant structure units per molecule was calculated by the number average molecular weight determined by (1) Molecular weight measurement, and the ratio of the numbers of carbon atoms forming the copolymer, due to respective peaks, based on the date analysis results of $^{13}$C NMR obtained by (3) Composition analysis.

(5) Rate of Introduction of Colorant Structure

The rate of introduction of a colorant structure into the compound having a colorant structure portion synthesized was calculated using the following expression. Herein, it was assumed that at most one colorant structure was introduced into one molecule.

Rate of introduction (%)=(Number of colorant structure units)×100

Example 1

A compound having a colorant structure portion was obtained by the following method.
<Production Example of Compound (101)>
Colorant compound (101) represented by the following structure was produced according to the following scheme.

formula (51)

$$\underset{\text{formula (51)}}{\text{Ph}} \quad \xrightarrow[\text{2-propanol anisole}]{\underset{\text{formula (53)}}{\text{HO}-\overset{\text{O}}{\overset{\|}{\text{C}}}-\text{CH}_2-\text{CH}_2-\underset{\underset{\text{CN}}{|}}{\overset{\overset{\text{CH}_3}{|}}{\text{C}}}-\text{N}=\text{N}-\underset{\underset{\text{CN}}{|}}{\overset{\overset{\text{CH}_3}{|}}{\text{C}}}-\text{CH}_2-\text{CH}_2-\overset{\text{O}}{\overset{\|}{\text{C}}}-\text{OH}}}^{\text{I}_2 \text{ formula (52)}}$$

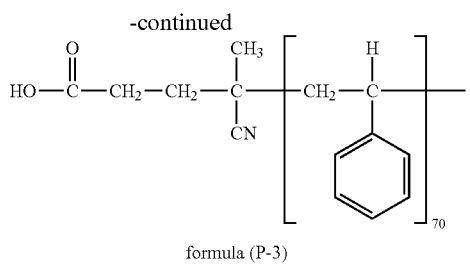

formula (P-3)

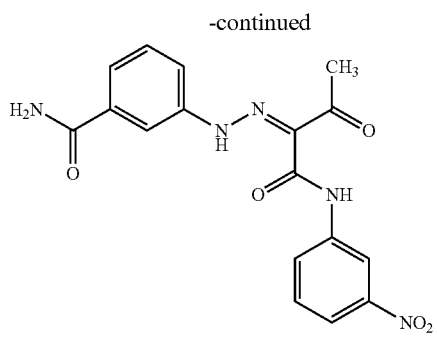

formula (58)

First, 50.0 parts of isopropyl alcohol, 50.0 parts of anisole and 9.07 parts of iodine were heated under purging with nitrogen so that the liquid temperature reached 80° C. A suspension mixture of 500 parts of styrene and 30.0 parts of 4,4'-azobis(4-cyanopentanoic acid) (azo nitrile type polymerization initiator, produced by Wako Pure Chemical Industries, Ltd., product name: V-501) was dropped thereto over 2 hours. Thereafter, the solution was heated and stirred for 10 hours. After completion of the reaction, 200 parts of tetrahydrofuran was added to the heated mixture to re-precipitate the mixture in methanol. A solid precipitated was separated by filtration to provide compound (P-3).

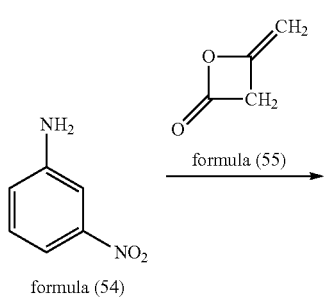

formula (54) / formula (55)

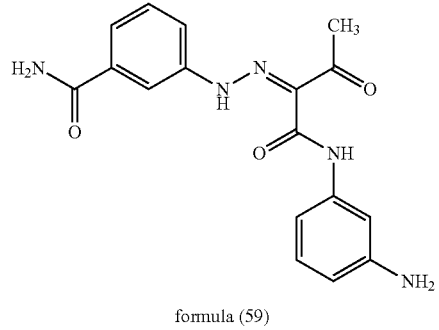

formula (59)

Next, 25.0 parts of compound (54), 15.4 parts of compound (55) and 15.0 parts of acetone were added to 140 parts of acetic acid and stirred at 65° C. for 3 hours. After completion of the reaction, the resultant was discharged in 1200 parts of water and subjected to filtration to provide 38.4 parts of compound (56) (yield: 96.0%).

Next, 25.0 parts of methanol and 6.00 parts of concentrated hydrochloric acid were added to 2.45 parts of compound (57) and cooled in ice to 10° C. or lower. A solution of 1.37 parts of sodium nitrite in 5.50 parts of water was added to the resulting solution and reacted at the same temperature for 1 hour (diazonium salt solution). Subsequently, 4.00 parts of compound (56) was added to 40.0 parts of methanol and cooled in ice to 10° C. or lower, and the diazonium salt solution was added thereto. Thereafter, a solution of 8.86 parts of sodium acetate in 35.0 parts of water was added and reacted at 10° C. or lower for 2 hours. After completion of the reaction, 300 parts of water was added and stirred for 30 minutes, and thereafter a solid was separated by filtration and purified by a recrystallization method in N,N-dimethylformamide to provide 6.37 parts of compound (58) (yield: 95.8%).

Next, 6.00 parts of compound (58) and 0.3 parts of palladium-activated carbon (palladium: 5%) were added to 150 parts of N,N-dimethylformamide, and stirred under a hydrogen gas atmosphere (reaction pressure: 0.1 to 0.4 MPa) at 40° C. for 3 hours. After completion of the reaction, the solution was subjected to separation by filtration, and concentrated to provide 4.84 parts of compound (59) (yield: 87.9%).

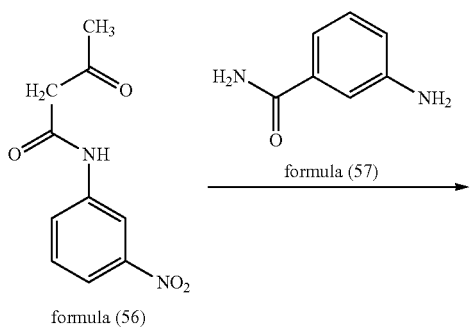

formula (56) / formula (57)

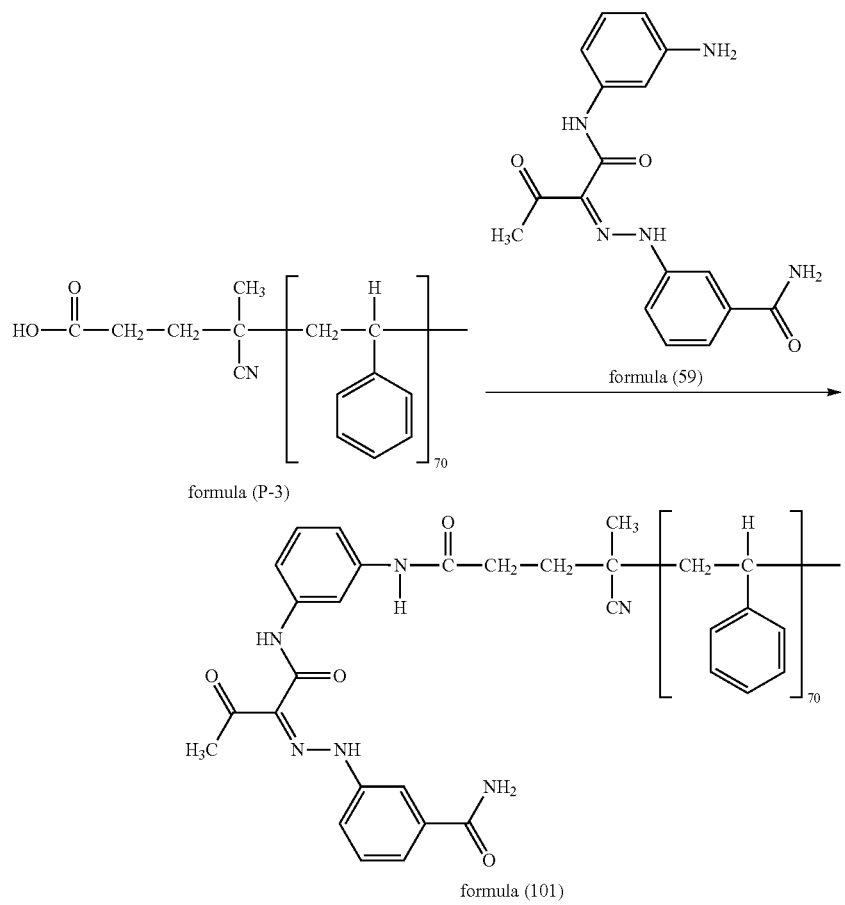

formula (P-3)

formula (101)

Next, 0.697 parts of compound (59) was added to 500 parts of tetrahydrofuran, and heated to 65° C. to be dissolved therein. After dissolution, the temperature was decreased to 50° C., 15 parts of compound (P-3) was added and dissolved, 1.18 parts of 1-ethyl-3-(3-dimethylaminopropyl)carbodiimide.hydrochloride (EDC.HCl) was added and stirred at 50° C. for 5 hours, and thereafter 5 parts of methanol was added thereto and stirred at 65° C. for hour. The liquid temperature was gradually turned to room temperature, and the resultant was stirred overnight to complete the reaction. After completion of the reaction, the solution was filtrated and concentrated, and subjected to re-precipitation in methanol for purification, to provide 15.3 parts of colorant compound (101).

(Analysis Results of Colorant Compound (101))

(1) Result of molecular weight measurement (GPC): number average molecular weight (Mn)=7300

(2) Result of acid value measurement: 0.0 mgKOH/g (3) Results of $^{13}C$ NMR (150 MHz, $CDCl_3$, room temperature) (see FIG. 1): δ [ppm]=198.5 (1C), 170.1 (1C), 169.1 (1C), 162.5 (1C), 147.4-143.2 (73C), 129.0-127.3 (309C), 126.3-125.5 (77C), 47.0-39.7 (157C)

The number of carbon atoms forming the copolymer, due to respective peaks, was quantitatively determined by the data analysis results of $^{13}C$ NMR. The number of monomer units forming colorant compound (101) was calculated from such measurement results, and the number of styrene units was 70, the number of colorant structure units was 0.95 and the rate of introduction of a colorant structure was 95%.

Example 2

A compound having a colorant structure portion was obtained by the following method.

<Production Example of Compound (111)>

Colorant compound (111) represented by the following structure was produced according to the following scheme.

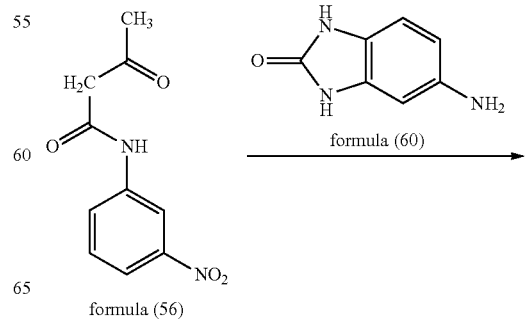

formula (56)　　formula (60)

formula (61)

formula (62)

N,N-dimethylformamide (142 parts) and 30.8 parts of concentrated hydrochloric acid were added to 15.0 parts of compound (60), and cooled in ice to 5° C. or lower. A solution of 7.25 parts of sodium nitrite in 50.0 parts of water was added to the resulting solution, and stirred at the same temperature for 1 hour (diazonium salt solution). Compound (56) (21.9 parts) and 68.4 parts of calcium carbonate were added to 142 parts of N,N-dimethylformamide and cooled in ice to 5° C. or lower, and the diazonium salt solution was added thereto for reaction at 5° C. or lower for 3 hours. After completion of the reaction, the reaction liquid was filtrated, and the solvent was distilled off under reduced pressure. A precipitate obtained was washed with dilute hydrochloric acid, water and methanol to provide 36.0 parts of compound (61) (yield: 94.3%).

Compound (61) obtained was added to 203 parts of 1,4-dioxane, and a solution of 12.4 parts of sodium hydrosulfide in 80 parts of water was dropped thereinto at room temperature. After dropping, the solution was warmed and stirred at 50° C. for 26 hours. After completion of the reaction, the reaction liquid was poured into water, and a precipitate obtained was separated by filtration and washed with dilute hydrochloric acid, water and methanol to provide 10.0 parts of compound (62) (yield: 50.6%).

formula (P-3)

formula (63)

Next, 15.0 parts of compound (P-3) was dissolved in 100 parts of chloroform, and 1.22 parts of thionyl chloride was dropped therein and stirred at room temperature for 24 hours. Thereafter, the reaction liquid was concentrated to remove chloroform and excessive thionyl chloride, and the resulting resin solid was recovered to provide compound (63).

formula (63)

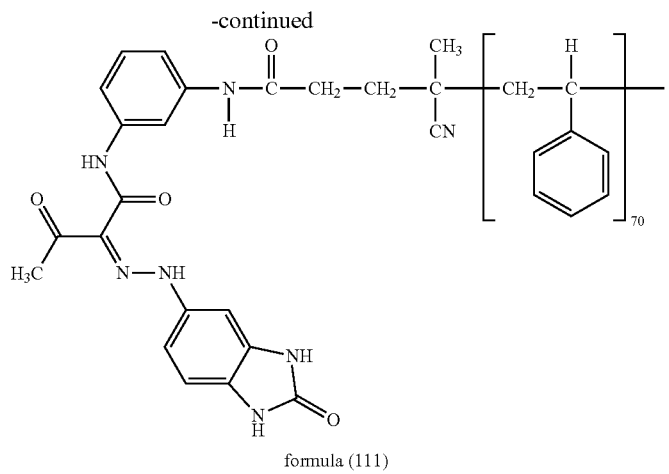

formula (111)

Next, compound (63) was dissolved in 100 parts of N,N-dimethylacetamide again, and 0.724 parts of compound (62) was added thereto and stirred under a nitrogen atmosphere at 65° C. for 8 hours. After completion of the reaction, the reaction liquid was concentrated and thereafter subjected to re-precipitation in methanol, a precipitate obtained was separated by filtration, and the precipitate was dispersed in and washed with methanol to provide 15.1 parts of colorant compound (111).

(Analysis Results of Colorant Compound (111))

(1) Result of molecular weight measurement (GPC): number average molecular weight (Mn)=7450

Figure 2:
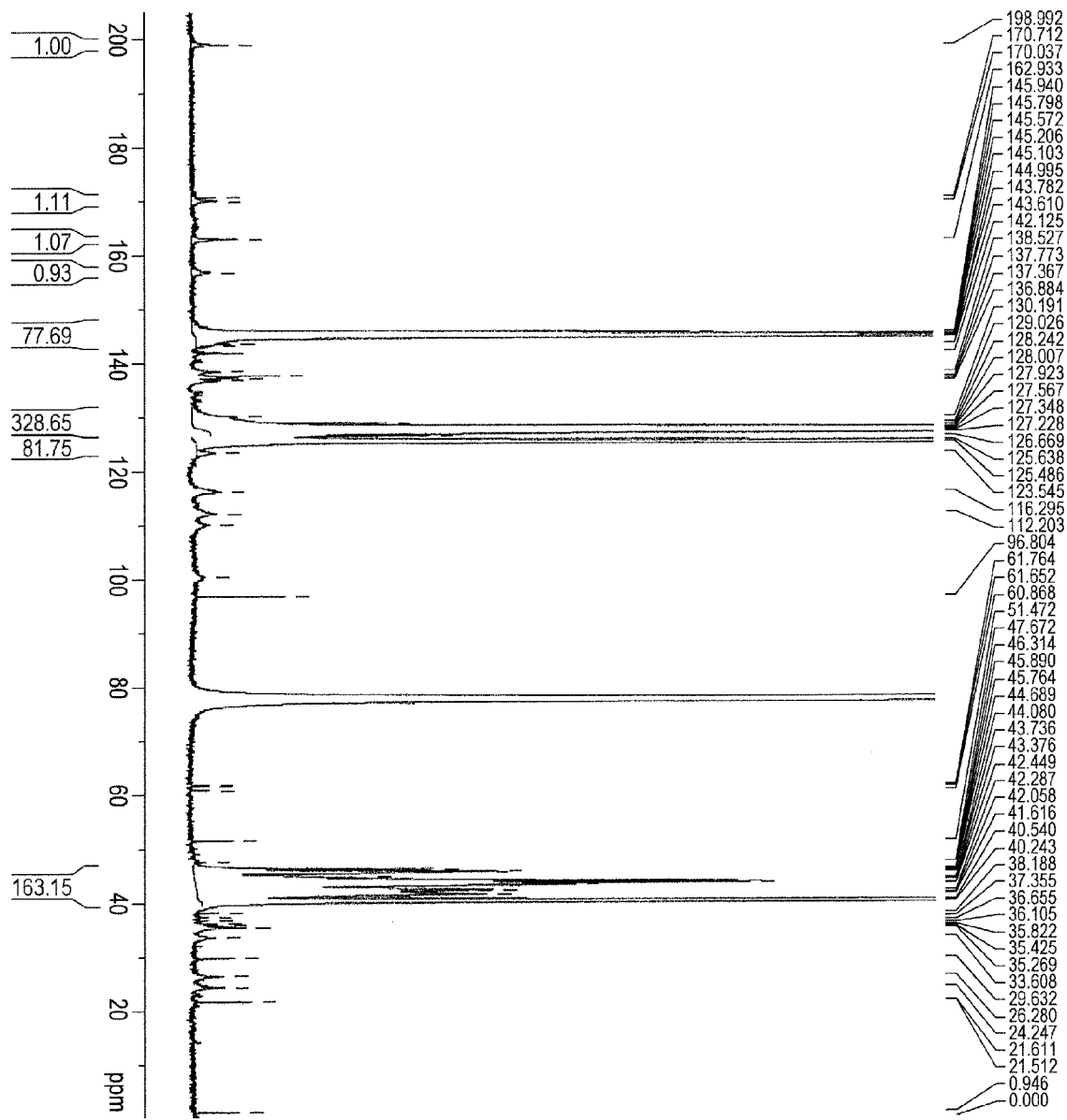
FIG. 2 is a chart illustrating a $^{13}$C NMR spectrum of compound (111) of the present invention in CDCl$_3$ at room temperature and at 150 MHz.

(2) Result of acid value measurement: 0.0 mgKOH/g (3) Results of $^{13}$C NMR (150 MHz, CDCl$_3$, room temperature), (see FIG. 2): δ [ppm]=199.0 (1C), 170.0 (1C), 163.0 (1C), 156.9 (1C), 146.4-144.4 (78C), 129.0-126.6 (329C), 126.4-124.7 (82C), 46.8-39.2 (163C)

The number of carbon atoms forming the copolymer, due to respective peaks, was quantitatively determined by the data analysis results of $^{13}$C NMR. The number of monomer units forming colorant compound (111) was calculated from such measurement results, and the number of styrene units was 71, the number of colorant structure units was 0.92 and the rate of introduction of a colorant structure was 92%.

Example 3

A compound having a colorant structure portion was obtained by the following method.

<Production Example of Compound (123)>

Colorant compound (123) represented by the following structure was produced according to the following scheme.

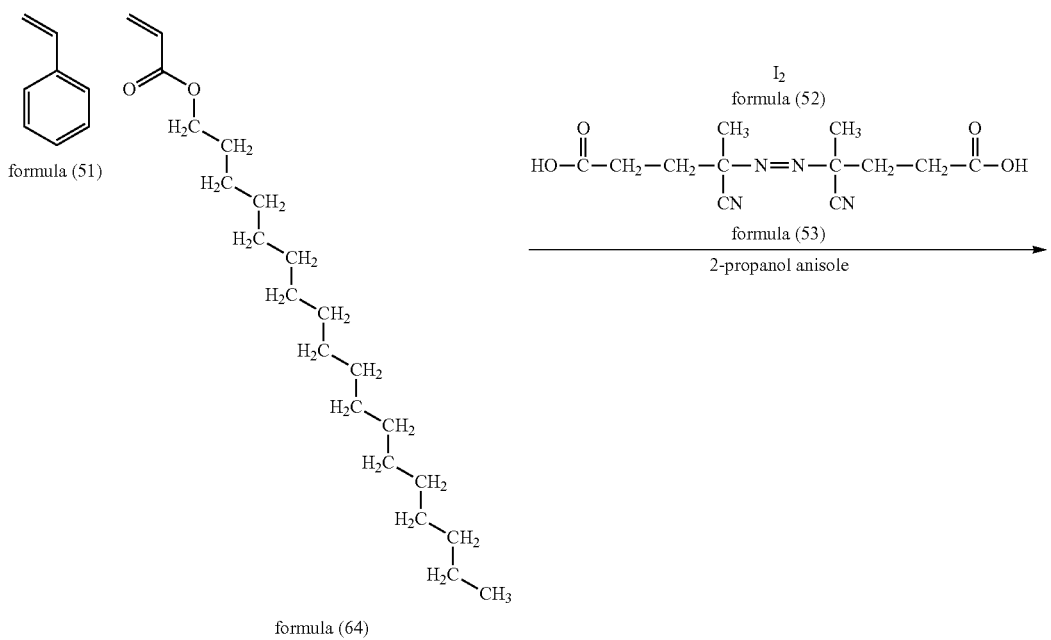

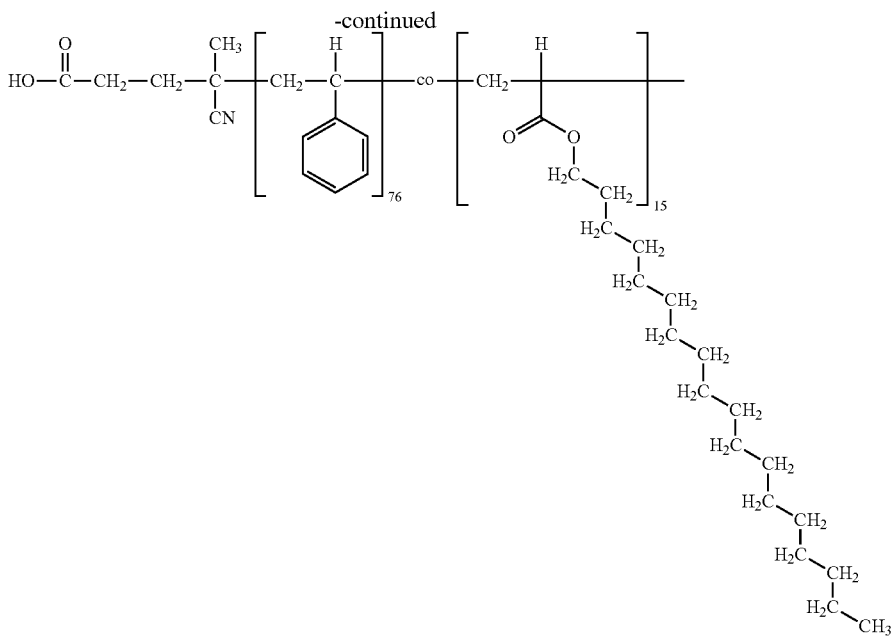

formula (P-11)

First, 50.0 parts of isopropyl alcohol, 50.0 parts of anisole and 5.61 parts of iodine were heated under purging with nitrogen so that the liquid temperature reached 80° C. A suspension mixture of 350 parts of styrene, 219 parts of stearyl acrylate and 18.6 parts of 4,4'-azobis(4-cyanopentanoic acid) (azo nitrile type polymerization initiator, produced by Wako Pure Chemical Industries, Ltd., product name: V-501) was dropped thereto over 2 hours. Thereafter, the solution was heated and stirred for 10 hours. After completion of the reaction, 250 parts of tetrahydrofuran was added to the heated mixture to re-precipitate the mixture in methanol. A solid precipitated was separated by filtration to provide compound (P-11).

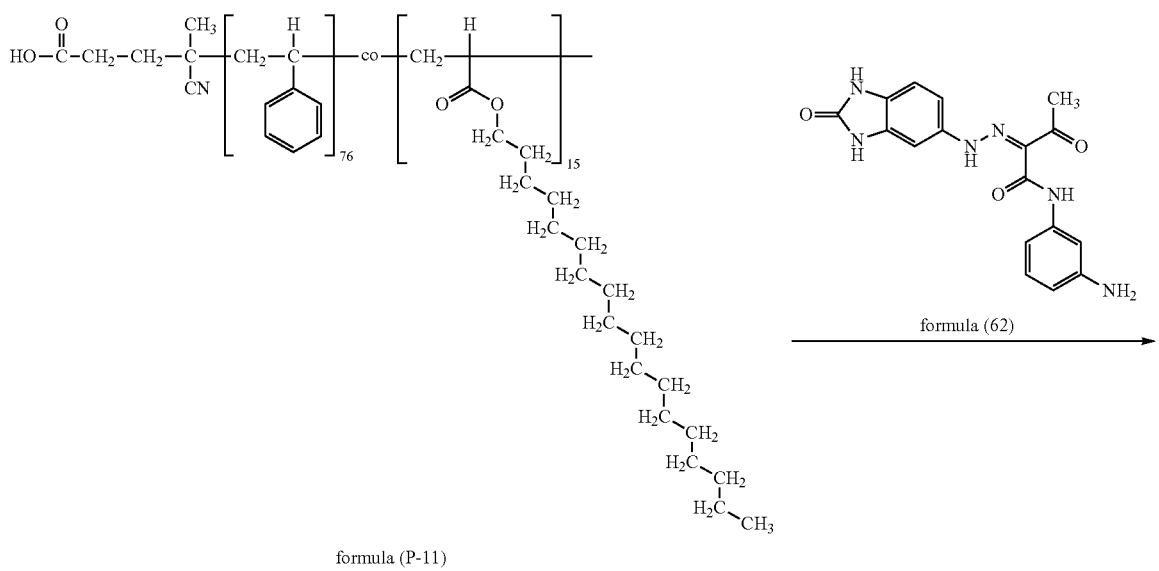

formula (P-11)   formula (62)

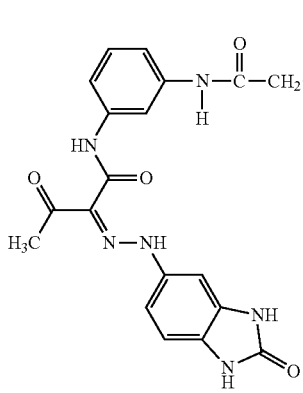

-continued

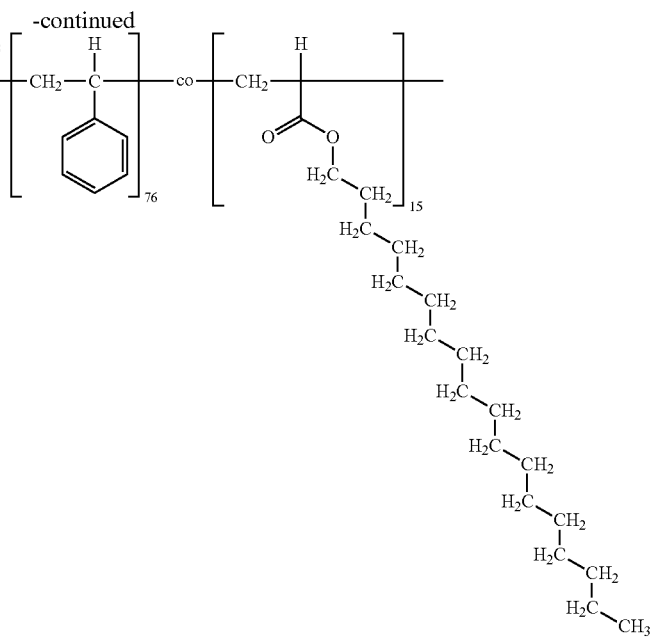

formula (123)

Next, 0.548 parts of compound (62) was added to 100 parts of tetrahydrofuran, and heated to 65° C. to be dissolved therein. After dissolution, the temperature was decreased to 50° C., 20 parts of compound (P-11) was added and dissolved, 0.895 parts of 1-ethyl-3-(3-dimethylaminopropyl) carbodiimide.hydrochloride (EDC.HCl) was added and stirred at 50° C. for 5 hours, and thereafter 5 parts of methanol was added thereto and stirred at 65° C. for hour. The liquid temperature was gradually turned to room temperature, and the resultant was stirred overnight to complete the reaction. After completion of the reaction, the solution was filtrated and concentrated, and subjected to re-precipitation in methanol for purification, to provide 18.7 parts of colorant compound (123).

Figure 3:
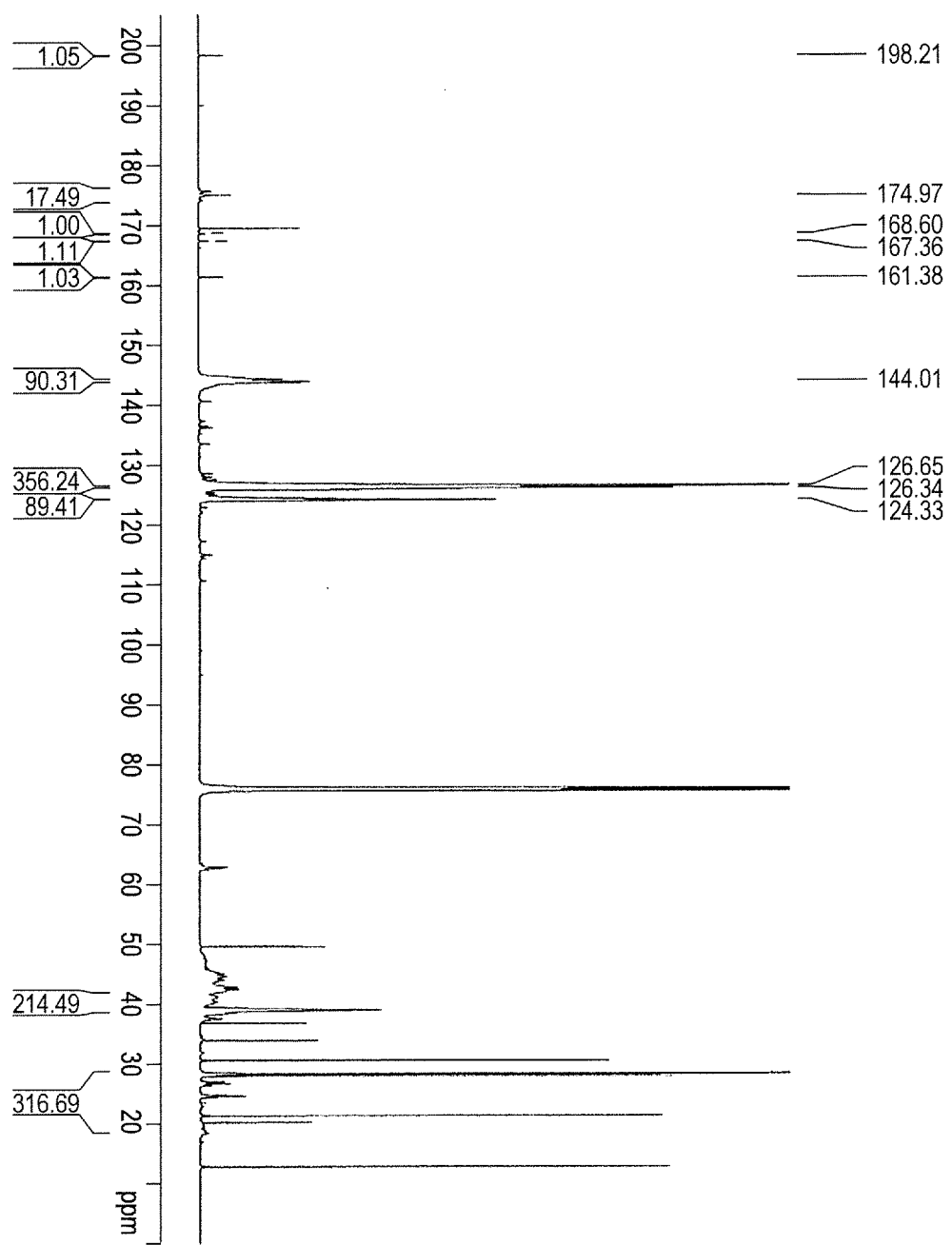
FIG. 3 is a chart illustrating a $^{13}$C NMR spectrum of compound (123) of the present invention in CDCl$_3$ at room temperature and at 150 MHz.

(Analysis Results of Colorant Compound (123))
(1) Result of molecular weight measurement (GPC): number average molecular weight (Mn)=13082
(2) Result of acid value measurement: 0.0 mgKOH/g
(3) Results of $^{13}$C NMR (150 MHz, CDCl$_3$, room temperature), (see FIG. 3): δ [ppm]=198.2 (1C), 176.1-174.0 (17C), 168.6 (1C), 167.4 (1C), 161.4 (1C), 145.7-142.5 (90C), 128.0-126.3 (356C), 125.2-123.8 (89C), 48.9-36.8 (214C), 29.2-17.8 (317C)

The number of carbon atoms forming the copolymer, due to respective peaks, was quantitatively determined by the data analysis results of $^{13}$C NMR. The number of monomer units forming colorant compound (123) was calculated from such measurement results, and the number of styrene units was 76, the number of stearyl acrylate units was 15, the number of colorant structure units was 0.85 and the rate of introduction of a colorant structure was 85%.

Example 4

A compound having a colorant structure portion was obtained by the following method.
<Production Example of Compound (153)>
Colorant compound (153) represented by the following structure was produced according to the following scheme.

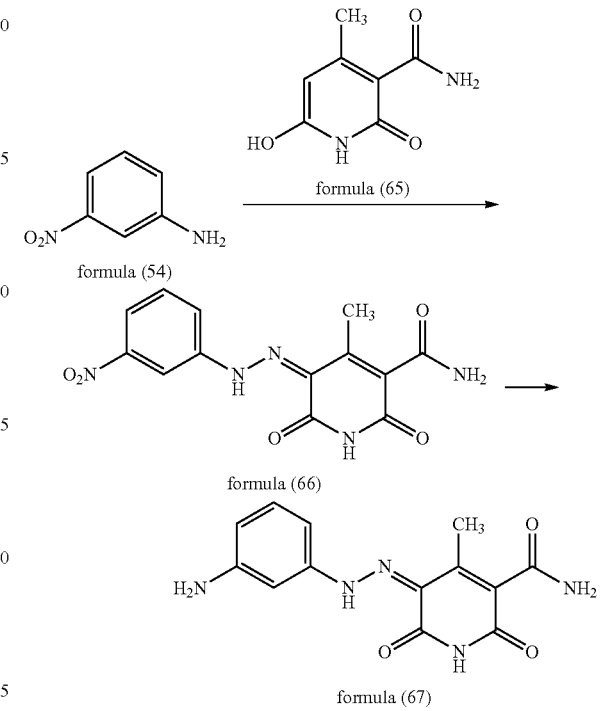

Methanol (73 parts) and 5.28 parts of concentrated hydrochloric acid were added to 5.00 parts of compound (54), and cooled in ice to 5° C. or lower. A solution of 2.75 parts of sodium nitrite in 10.0 parts of water was added to the resulting solution, and stirred at the same temperature for 1 hour (diazonium salt solution). A solution of 6.09 parts of compound (65) and 14.8 parts of sodium acetate in 30.0 parts of water was added to 150 parts of N,N-dimethylformamide and cooled in ice to 5° C. or lower, and the diazonium salt solution was added thereto for reaction at 5°

C. or lower for 3 hours. After completion of the reaction, the reaction liquid was filtrated, and the solvent was distilled off under reduced pressure. A precipitate obtained was washed with dilute hydrochloric acid, water and methanol to provide 10.5 parts of compound (66) (yield: 91.0%).

Compound (66) (10.0 parts) obtained was added to 200 parts of 1,4-dioxane, and a solution of 8.84 parts of sodium hydrosulfide in 50 parts of water was dropped thereinto at room temperature. After dropping, the solution was warmed and stirred at 50° C. for 26 hours. After completion of the reaction, the reaction liquid was poured into water, and a precipitate obtained was separated by filtration and washed with dilute hydrochloric acid, water and methanol to provide 6.43 parts of compound (67) (yield: 71.0%).

data analysis results of $^{13}$C NMR. The number of monomer units forming colorant compound (153) was calculated from such measurement results, and the number of styrene units was 70, the number of colorant structure units was 0.89 and the rate of introduction of a colorant structure was 89%.

Example 5

A compound having a colorant structure portion was obtained by the following method.

<Production Example Compound (154)>

Colorant compound (154) represented by the following structure was produced according to the following scheme.

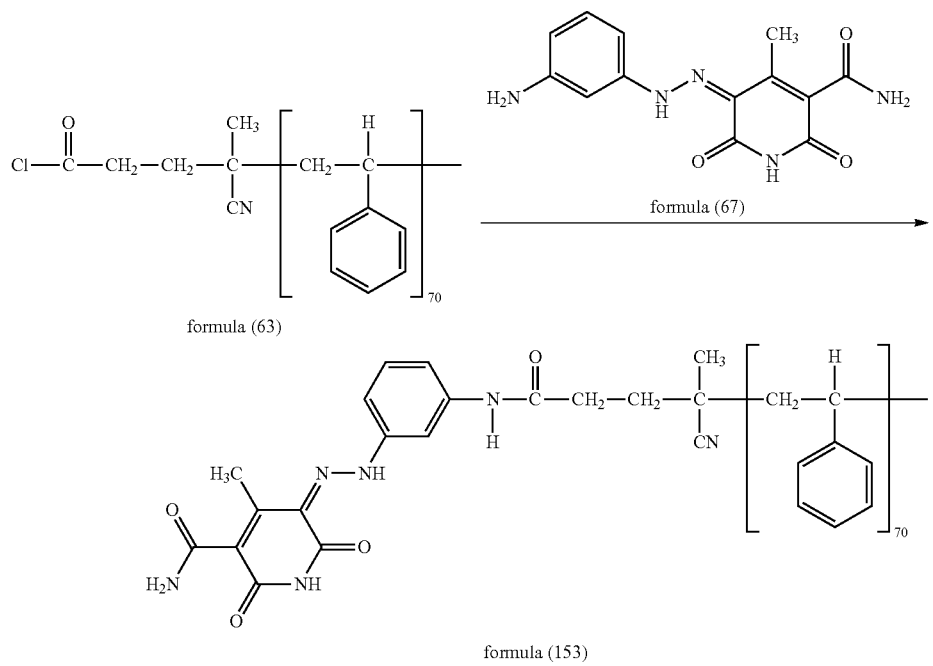

Next, compound (63) was synthesized by the same method as in Example 2 and thereafter dissolved in 100 parts of N,N-dimethylacetamide again, and 0.590 parts of compound (67) was added thereto and stirred under a nitrogen atmosphere at 65° C. for 8 hours. After completion of the reaction, the reaction liquid was concentrated and thereafter subjected to re-precipitation in methanol, a precipitate obtained was separated by filtration, and the precipitate was dispersed in and washed with methanol to provide 14.9 parts of colorant compound (153).

Figure 4:
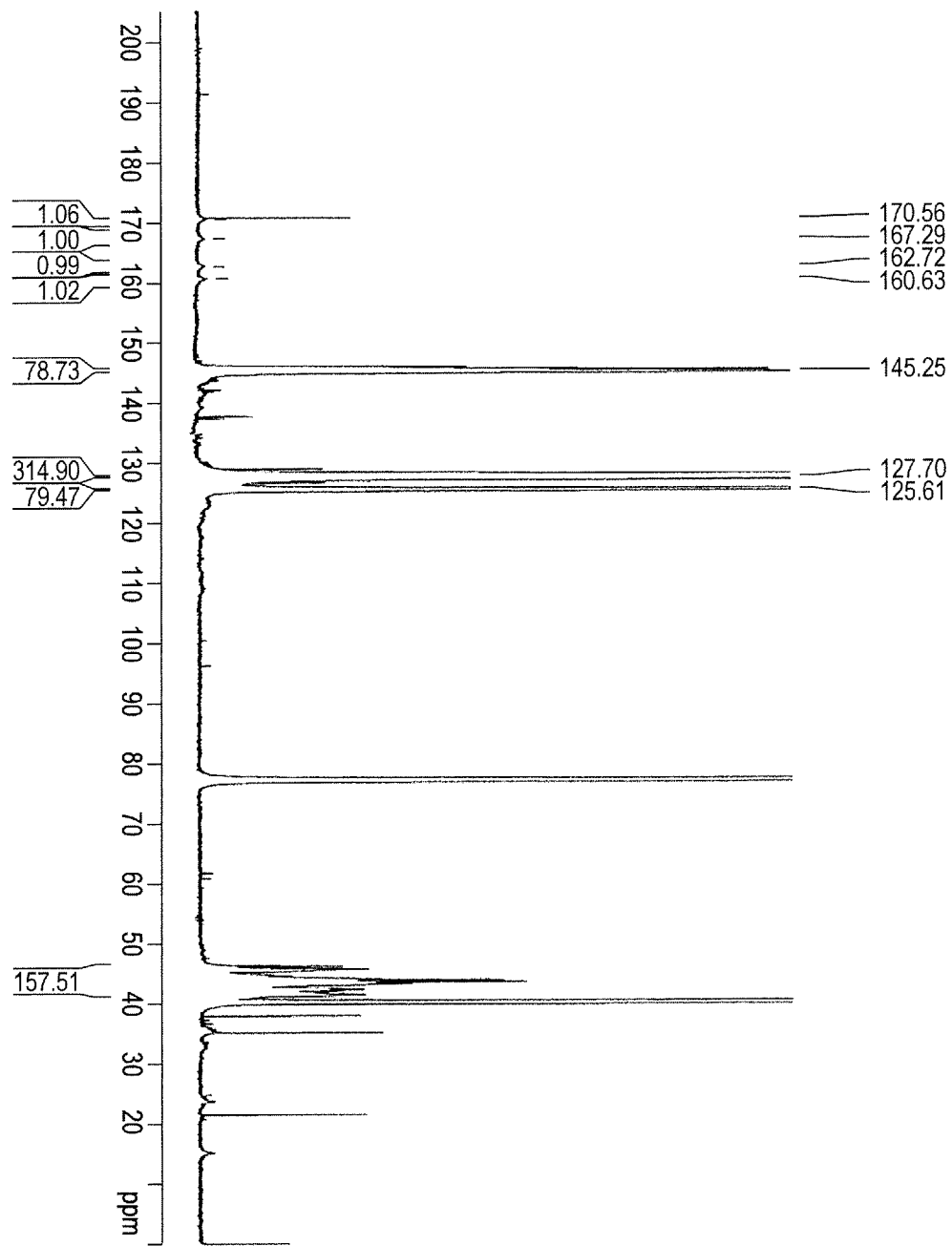
FIG. 4 is a chart illustrating a $^{13}$C NMR spectrum of compound (153) of the present invention in CDCl$_3$ at room temperature and at 150 MHz.

(Analysis Results of Colorant Compound (153))
(1) Result of molecular weight measurement (GPC): number average molecular weight (Mn)=7546
(2) Result of acid value measurement: 0.0 mgKOH/g
(3) Results of $^{13}$C NMR (150 MHz, CDCl$_3$, room temperature), (see FIG. 4): δ [ppm]=170.6 (1C), 167.3 (1C), 162.7 (1C), 160.6 (1C), 146.4-144.4 (79C), 129.0-127.0 (315C), 126.5-124.5 (79C), 47.0-40.0 (158C)

The number of carbon atoms forming the copolymer, due to respective peaks, was quantitatively determined by the

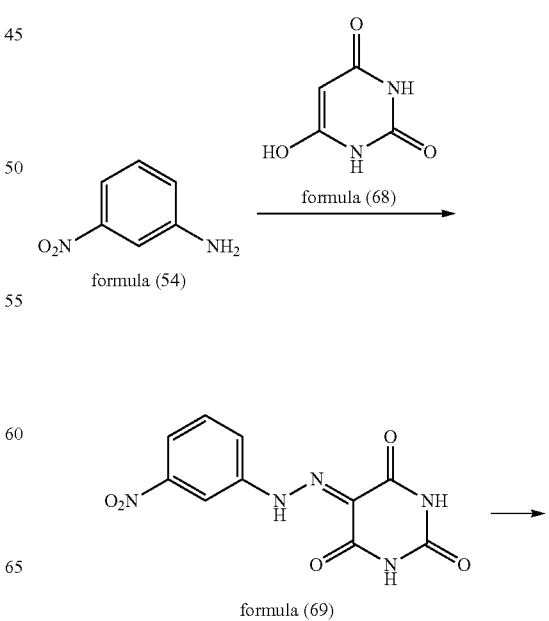

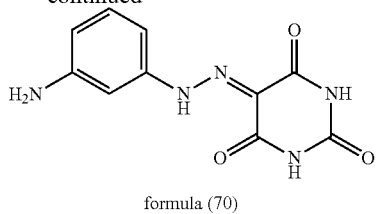

formula (70)

Methanol (73 parts) and 5.28 parts of concentrated hydrochloric acid were added to 5.00 parts of compound (54), and cooled in ice to 5° C. or lower. A solution of 2.75 parts of sodium nitrite in 10.0 parts of water was added to the resulting solution and stirred at the same temperature for 1 hour (diazonium salt solution). A solution of 4.64 parts of compound (68) and 14.8 parts of sodium acetate in 30.0 parts of water was added to 150 parts of N,N-dimethylformamide and cooled in ice to 5° C. or lower, and the diazonium salt solution was added thereto for reaction at 5° C. or lower for 3 hours. After completion of the reaction, the reaction liquid was filtrated and the solvent was distilled off under reduced pressure. A precipitate obtained was washed with dilute hydrochloric acid, water and methanol to provide 8.63 parts of compound (69) (yield: 86.0%).

Compound (69) (8.00 parts) obtained was added to 160 parts of 1,4-dioxane, and a solution of 8.09 parts of sodium hydrosulfide in 50 parts of water was dropped thereinto at room temperature. After dropping, the solution was warmed and stirred at 50° C. for 26 hours. After completion of the reaction, the reaction liquid was poured into water, and a precipitate obtained was separated by filtration and washed with dilute hydrochloric acid, water and methanol to provide 5.28 parts of compound (70) (yield: 74.1%).

Next, compound (63) was synthesized by the same method as in Example 2 and thereafter dissolved in 100 parts of N,N-dimethylacetamide again, and 0.510 parts of compound (70) was added thereto and stirred under a nitrogen atmosphere at 65° C. for 8 hours. After completion of the reaction, the reaction liquid was concentrated and thereafter re-precipitation in methanol, a precipitate obtained was separated by filtration, and the precipitate was dispersed in and washed with methanol to provide 14.2 parts of colorant compound (154).

Figure 5:
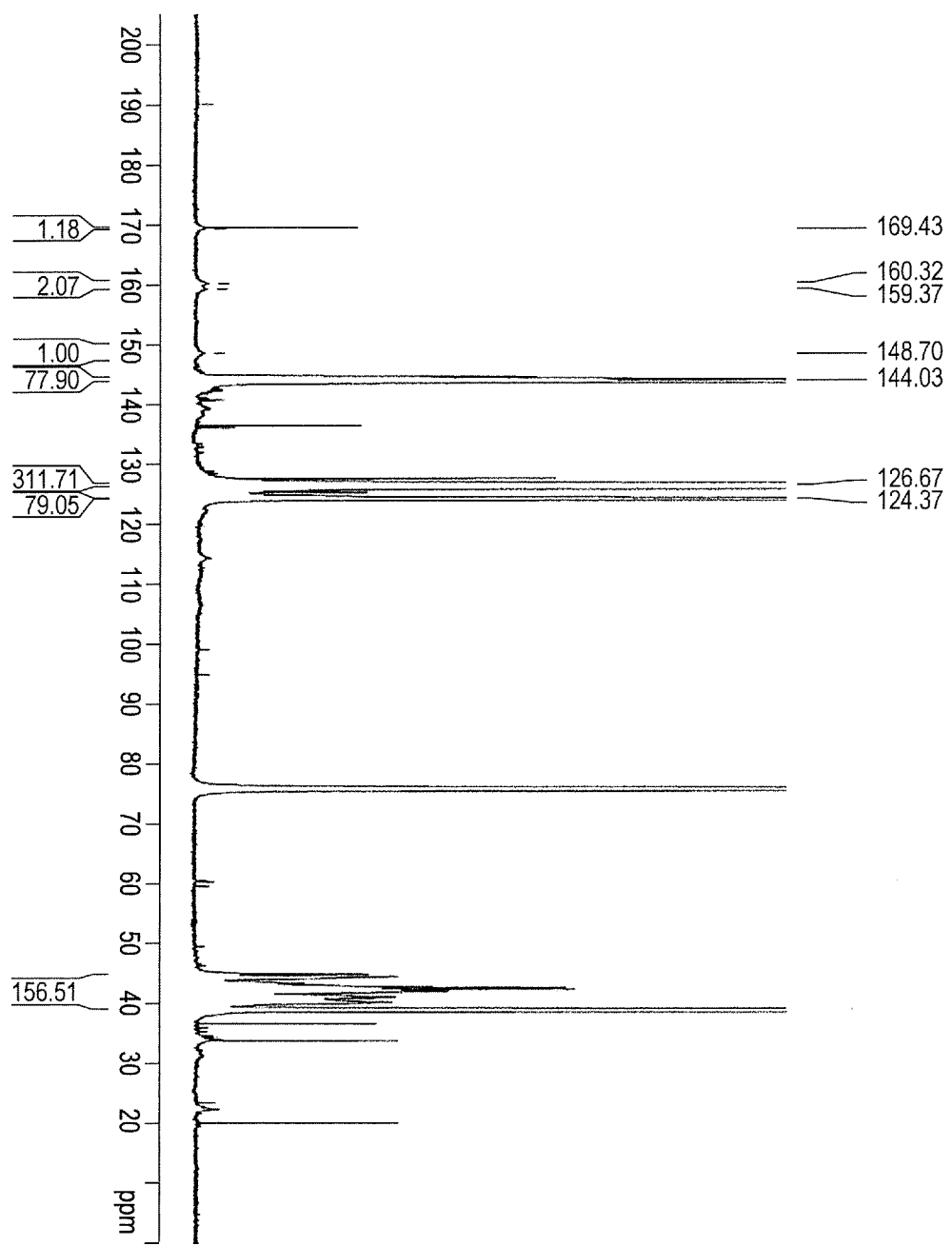
FIG. 5 is a chart illustrating a $^{13}$C NMR spectrum of compound (154) of the present invention in CDCl$_3$ at room temperature and at 150 MHz.

(Analysis Results of Colorant Compound (153))
(1) Result of molecular weight measurement (GPC): number average molecular weight (Mn)=7344
(2) Result of acid value measurement: 0.0 mgKOH/g
(3) Results of $^{13}$C NMR (150 MHz, CDCl$_3$, room temperature), (see FIG. 5): δ [ppm]=169.4 (1C), 161.3-158.3 (2C), 148.7 (1C), 145.8-143.5 (78C), 128.0-125.2 (312C), 125.5-123.1 (79C), 46.0-39.7 (157C)

The number of carbon atoms forming the copolymer, due to respective peaks, was quantitatively determined by the data analysis results of $^{13}$C NMR. The number of monomer units forming colorant compound (154) was calculated from such measurement results, and the number of styrene units was 71, the number of colorant structure units was 0.90 and the rate of introduction of a colorant structure was 90%.

<Production Examples of Compounds (102) to (110), (112) to (122) and (124) to (150)>

Each of colorant compounds (102) to (110), (112) to (122) and (124) to (150) shown in Table 2 was produced using the same operation as in Production Examples of compounds (101), (111), (123), (153) and (154) except that the raw materials were changed.

The structure of each of the linking group-containing polymer moieties was shown in Table 1 below, and the

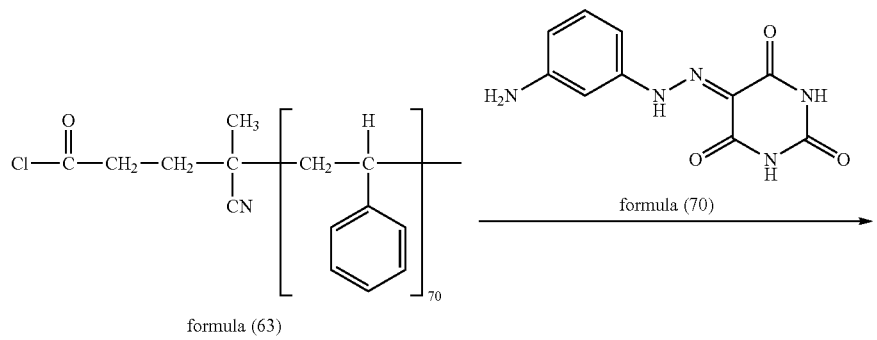

formula (63)

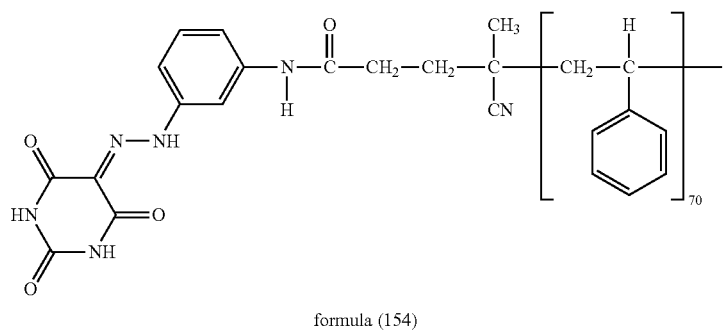

formula (154)

structure of each of the compounds having a colorant structure portion was shown in Table 2 below.

TABLE 1

Polymer moiety produced

| Polymer moiety No. | Chain sequence of monomer | Linking group | Number of X | Number of Y | $R_{51}$ | $R_{52}$ | $R_{53}$ |
|---|---|---|---|---|---|---|---|
| P-1 | α-polyX-ω | $L_1$ | 152 | — | H | — | — |
| P-2 | α-polyX | $L_1$ | 94 | — | H | — | — |
| P-3 | α-polyX | $L_1$ | 70 | — | H | — | — |
| P-4 | α-polyX | $L_2$ | 95 | — | H | — | — |
| P-5 | α-polyX | $L_3$ | 92 | — | H | — | — |
| P-6 | α-polyX | $L_4$ | 97 | — | H | — | — |
| P-7 | α-polyX | $L_5$ | 95 | — | H | — | — |
| P-8 | α-polyX | $L_1$ | 96 | — | $CH_3$ | — | — |
| P-9 | α-poly(X-co-Y) | $L_1$ | 76 | 19 | H | $CH_3$ | $CH_3$ |
| P-10 | α-poly(X-co-Y) | $L_1$ | 74 | 19 | H | H | (n)-$C_4H_9$ |
| P-11 | α-poly(X-co-Y) | $L_1$ | 76 | 15 | H | H | (n)-$C_{18}H_{37}$ |
| P-12 | α-poly(Y-bl-X) | $L_1$ | 43 | 52 | H | H | $CH_3$ |

In Table 1, prefix α indicates that each linking group is bound to the α-terminal of the main chain of each polymer moiety, ω indicates that each linking group is bound to the ω-terminal of the main chain of each polymer moiety, each of X and Y represents the following monomer unit, each of $L_1$ to $L_5$ represents the following linking group, (n) indicates that each alkyl group is linear, co is a designation indicating that the sequences of respective monomer units forming each copolymer are random, and b1 is a designation indicating that the sequences of respective monomer units forming each copolymer are block.

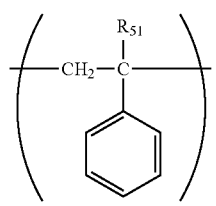

formula (X)

wherein $R_{51}$ represents a hydrogen atom or an alkyl group;

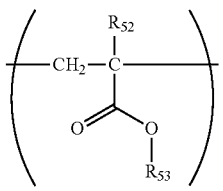

formula (Y)

wherein $R_{52}$ and $R_{53}$ each represent a hydrogen atom or an alkyl group;

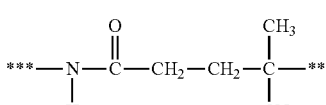

formula ($L_1$)

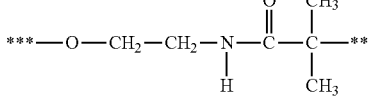

formula ($L_2$)

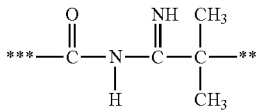

formula ($L_3$)

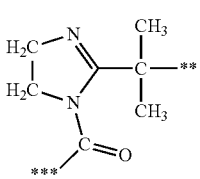

formula ($L_4$)

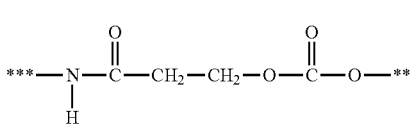

formula ($L_5$)

wherein "" represents a binding position to each polymer moiety, and "*" represents a binding position to each colorant structure.

TABLE 2

Compound having a colorant structure portion

| Compound No. | $R_3$ | $R_4$ | $R_5$ | $R_6$ | $R_7$ | $R_8$ | $R_9$ | $R_{10}$ | $R_{11}$ | $R_{12}$ | $R_{13}$ |
|---|---|---|---|---|---|---|---|---|---|---|---|
| 101 | $CH_3$ | H | P-3 | H | H | H | H | $CONH_2$ | H | H | H |
| 102 | $CH_3$ | H | P-3 | H | H | H | $CO_2CH_3$ | H | H | $CO_2CH_3$ | H |
| 103 | $CH_3$ | H | P-3 | H | H | H | H | H | $CONH_2$ | H | H |
| 104 | $CH_3$ | H | P-3 | H | H | H | H | $SO_2NH_2$ | H | H | H |
| 105 | $CH_3$ | H | P-3 | H | H | H | H | H | $SO_2NH_2$ | H | H |
| 106 | $CH_3$ | H | P-3 | H | H | H | H | $SO_3CH_3$ | H | H | H |
| 107 | $CH_3$ | H | P-3 | H | H | H | H | H | $SO_3CH_3$ | H | H |
| 108 | $CH_3$ | H | P-3 | H | H | H | $SO_3^-Na^+$ | H | H | H | H |
| 109 | $CH_3$ | H | P-3 | H | H | H | H | $NHCONH_2$ | H | H | H |
| 110 | $CH_3$ | H | P-3 | H | H | H | H | H | $NHCSNH_2$ | H | H |
| 111 | $CH_3$ | H | P-3 | H | H | H | H | —NHCONH— | | H | H |
| 112 | $CH_3$ | H | H | P-3 | H | H | $CO_2CH_3$ | H | H | $CO_2CH_3$ | H |
| 113 | $CH_3$ | H | H | P-3 | H | H | H | $CONH_2$ | H | H | H |
| 114 | $CH_3$ | H | H | P-3 | H | H | H | $SO_2NH_2$ | H | H | H |
| 115 | $CH_3$ | H | H | P-3 | H | H | H | $SO_3CH_3$ | H | H | H |
| 116 | $CH_3$ | H | H | P-3 | H | H | $SO_3^-(N(C_4H_9)_4)^+$ | H | H | H | H |

TABLE 2-continued

Compound having a colorant structure portion

| Compound No. | $R_3$ | $R_4$ | $R_5$ | $R_6$ | $R_7$ | $R_8$ | $R_9$ | $R_{10}$ | $R_{11}$ | $R_{12}$ | $R_{13}$ |
|---|---|---|---|---|---|---|---|---|---|---|---|
| 117 | $CH_3$ | H | H | P-3 | H | H | H | $NHCONH_2$ | H | H | H |
| 118 | $CH_3$ | H | H | P-3 | H | H | H | H | $NHCSNH_2$ | H | H |
| 119 | $CH_3$ | H | H | P-1 | H | H | H | —NHCONH— | | H | H |
| 120 | $CH_3$ | H | H | P-2 | H | H | H | —NHCONH— | | H | H |
| 121 | $CH_3$ | H | H | P-4 | H | H | H | —NHCONH— | | H | H |
| 122 | $CH_3$ | H | H | P-8 | H | H | H | —NHCONH— | | H | H |
| 123 | $CH_3$ | H | H | P-11 | H | H | H | —NHCONH— | | H | H |
| 124 | $CH_3$ | $CO_2CH_3$ | H | H | $CO_2CH_3$ | H | H | P-3 | H | H | H |
| 125 | $CH_3$ | H | $CONH_2$ | H | H | H | H | P-3 | H | H | H |
| 126 | $CH_3$ | H | $SO_2NH_2$ | H | H | H | H | P-3 | H | H | H |
| 127 | $CH_3$ | H | $SO_3CH_3$ | H | H | H | H | P-3 | H | H | H |
| 128 | $CH_3$ | $SO_3Na$ | H | H | H | H | H | H | P-3 | H | H |
| 129 | $CH_3$ | H | $NHCONH_2$ | H | H | H | H | H | P-3 | H | H |
| 130 | $CH_3$ | H | H | $NHCSNH_2$ | H | H | H | H | P-3 | H | H |
| 131 | $CH_3$ | H | —NHCONH— | | H | H | H | H | P-3 | H | H |
| 132 | $CH_3$ | H | formula (5) | H | P-3 | H | $CO_2CH_3$ | H | H | $CO_2CH_3$ | H |
| 133 | $CH_3$ | H | formula (5) | H | P-3 | H | H | $CONH_2$ | H | H | H |
| 134 | $CH_3$ | H | formula (5) | H | P-3 | H | H | $SO_2NH_2$ | H | H | H |
| 135 | $CH_3$ | H | formula (5) | H | P-3 | H | H | $SO_3CH_3$ | H | H | H |
| 136 | $CH_3$ | H | formula (5) | H | P-3 | H | $SO_3Na$ | H | H | H | H |
| 137 | $CH_3$ | H | formula (5) | H | P-3 | H | H | $NHCONH_2$ | H | H | H |
| 138 | $CH_3$ | H | formula (5) | H | P-3 | H | H | H | $NHCSNH_2$ | H | H |
| 139 | $CH_3$ | H | formula (5) | H | P-3 | H | H | —NHCONH— | | H | H |
| 140 | $CH_3$ | H | formula (5) | H | H | H | H | $CONH_2$ | H | P-3 | H |
| 141 | Ph | H | P-5 | H | H | H | H | H | H | H | H |
| 142 | $OCH_3$ | H | P-6 | H | H | H | H | H | H | H | H |
| 143 | $NH_2$ | H | P-7 | H | H | H | H | H | H | H | H |
| 144 | $CH_3$ | H | P-9 | H | H | H | $CH_3$ | H | H | H | H |
| 145 | $CH_3$ | H | P-10 | H | H | H | H | $OCH_3$ | H | H | H |
| 146 | $CH_3$ | H | P-12 | H | H | H | H | H | OH | H | H |
| 147 | $CH_3$ | H | P-3 | H | H | H | CN | H | H | H | H |
| 148 | $CH_3$ | H | P-3 | H | H | H | H | Cl | H | H | H |
| 149 | $CH_3$ | H | P-3 | H | H | H | H | $CF_3$ | H | $CF_3$ | H |
| 150 | P-3 | H | H | H | H | H | H | H | H | H | H |

153

(P-3)-$L_1$—[phenyl ring]—N=N—[pyridine ring with CH₃, C(=O)NH₂, and two C=O, NH groups]

154

(P-3)-$L_1$—[phenyl ring]—N=N—[barbituric acid / pyrimidinetrione ring]

In Table 2, P-1 to P-12 each represent a linking group-containing polymer moiety recited in Table 1.

Comparative Example 1

Comparative azo compound (151) below was synthesized based on the method disclosed in Example 1 of Japanese Patent Application Laid-Open No. 2012-077297.

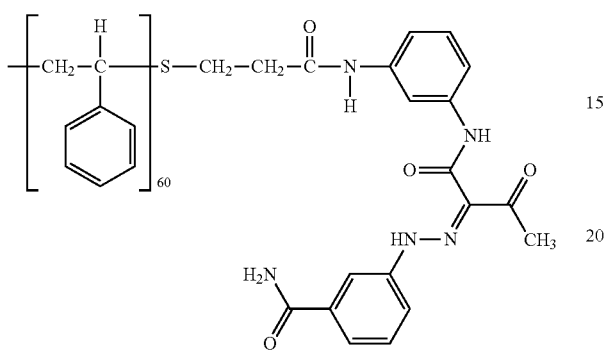

formula (151)

Comparative Example 2

Comparative azo compound (152) below was synthesized based on the method disclosed in Example 1 of Japanese Patent Application Laid-Open No. 2012-067285.

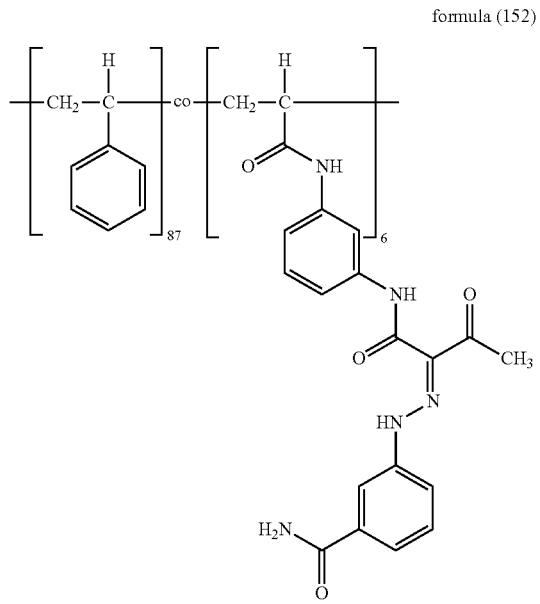

formula (152)

Example 6

A value calculated by multiplying the number of colorant structure units per one molecule by 100 was defined as the rate of introduction (%). The rate of introduction of a colorant structure of each of the compounds having a colorant structure portion represented by formulae (101) to (150), and comparative azo compound (151) are shown in Table 3.

TABLE 3

| Rate of introduction of colorant structure | |
|---|---|
| Compound No. | Rate of introduction |
| 101 | 95% |
| 102 | 86% |
| 103 | 83% |
| 104 | 85% |
| 105 | 93% |
| 106 | 91% |
| 107 | 90% |
| 108 | 94% |
| 109 | 94% |
| 110 | 97% |
| 111 | 92% |
| 112 | 88% |
| 113 | 92% |
| 114 | 98% |
| 115 | 87% |
| 116 | 96% |
| 117 | 85% |
| 118 | 89% |
| 119 | 97% |
| 120 | 96% |
| 121 | 86% |
| 122 | 84% |
| 123 | 85% |
| 124 | 84% |
| 125 | 91% |
| 126 | 85% |
| 127 | 97% |
| 128 | 94% |
| 129 | 95% |
| 130 | 95% |
| 131 | 89% |
| 132 | 88% |
| 133 | 86% |
| 134 | 94% |
| 135 | 98% |
| 136 | 94% |
| 137 | 97% |
| 138 | 97% |
| 139 | 90% |
| 140 | 94% |
| 141 | 84% |
| 142 | 96% |
| 143 | 87% |
| 144 | 84% |
| 145 | 91% |
| 146 | 85% |
| 147 | 91% |
| 148 | 84% |
| 149 | 94% |
| 150 | 98% |
| 151 | 61% |
| 153 | 89% |
| 154 | 90% |

As can be seen from Table 3, the compound having a colorant structure portion obtained by the production method of the present invention has been confirmed to be high in rate of introduction of a colorant structure.

Example 7

A yellow pigment dispersion was prepared by the following method.

<Preparation Example 1 of Yellow Pigment Dispersion>

C.I. Pigment Yellow 155 (18.0 parts) represented by the following formula (Pig-A) as a yellow pigment, 1.80 parts of colorant compound (101), 180 parts of styrene as a water-insoluble solvent and 130 parts of glass beads (diameter: 1 mm) were mixed, dispersed by an attritor (manufactured by Nippon Coke & Engineering. Co., Ltd.) for 3 hours, and filtrated by a mesh to provide yellow pigment dispersion (Dis-Y101).

(Pig-A)

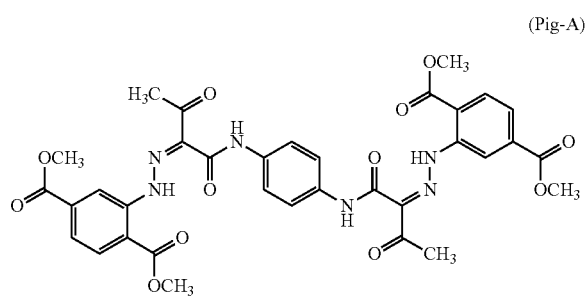 [SMILES: COC(=O)c1ccc(C(=O)OC)c(N/N=C(/C(C)=O)C(=O)Nc2ccc(NC(=O)/C(=N\Nc3cc(C(=O)OC)ccc3C(=O)OC)C(C)=O)cc2)c1]

<Preparation Example 2 of Yellow Pigment Dispersion>

Each of yellow pigment dispersions (Dis-Y102) to (Dis-Y150) and (Dis-Y163) to (Dis-Y164) was obtained by the same operation as in Preparation Example 1 of yellow pigment dispersion above except that colorant compound (101) was changed to each of colorant compound (102) to (150) and (153) to (154).

<Preparation Example 3 of Yellow Pigment Dispersion>

Each of yellow pigment dispersions (Dis-Y151) and (Dis-Y152) was obtained by the same operation as in Preparation Example 1 of yellow pigment dispersion above except that C.I. Pigment Yellow 155 represented by the formula (Pig-A) was changed to each of C.I. Pigment Yellow 180 represented by the following formula (Pig-B) and C.I. Pigment Yellow 185 represented by the following formula (Pig-C).

Comparative Example 4

Reference yellow pigment dispersions each providing the reference value for evaluation, and a comparative yellow pigment dispersion were prepared by the following methods.

<Preparation Example 1 of Reference Yellow Pigment Dispersion>

Reference yellow pigment dispersion (Dis-Y154) was obtained by the same operation as in Preparation Example 1 of yellow pigment dispersion above except that colorant compound (101) was not added.

<Preparation Example 2 of Reference Yellow Pigment Dispersion>

Each of reference yellow pigment dispersions (Dis-Y155) and (Dis-Y156) was obtained by the same operation as in Preparation Example 3 of yellow pigment dispersion above except that colorant compound (101) was not added.

<Preparation Example 3 of Reference Yellow Pigment Dispersion>

Reference yellow pigment dispersion (Dis-Y157) was obtained by the same operation as in Preparation Example 4 of yellow pigment dispersion above except that colorant compound (101) was not added.

<Preparation Example 1 of Comparative Yellow Pigment Dispersion>

Each of comparative yellow pigment dispersions (Dis-Y158) to (Dis-Y162) was obtained by the same operation in Preparation Example 1 of yellow pigment dispersion above

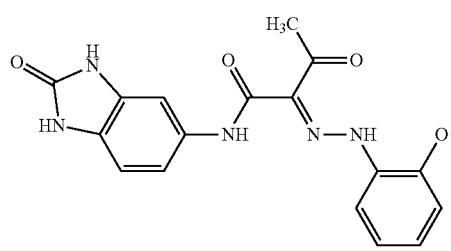 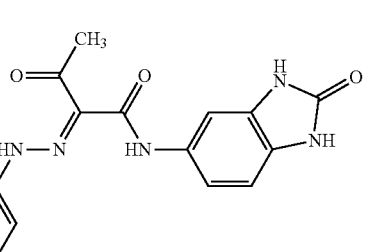

(Pig-B)

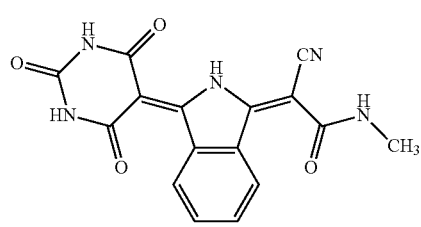

(Pig-C)

<Preparation Example 4 of Yellow Pigment Dispersion>

C.I. Pigment Yellow 155 (42.0 parts) represented by the formula (Pig-A) as a yellow pigment and 4.2 parts of colorant compound (101) as a pigment dispersant were mixed by a hybridization system NHS-0 (manufactured by Nara Machinery Co., Ltd.) in a dry manner to prepare a pigment composition. The resulting pigment composition (19.8 parts) was mixed with 180 parts of styrene and 130 parts of glass beads (diameter: 1 mm), and the mixture was dispersed by a paint shaker (manufactured by Toyo Seiki Seisaku-Sho Ltd.) for 1 hour and filtrated by a mesh to provide yellow pigment dispersion (Dis-Y153).

except that colorant compound (101) was changed to each of comparative azo compound (151) (comparative compound 1), comparative azo compound (152) (comparative compound 2), Disparlon DA-703-50 described in Japanese Patent Application Laid-Open No. 2006-030760 (produced by Kusumoto Chemicals, Ltd., acid value: 15 mgKOH/g, amine value: 40 mgKOH/g) (comparative compound 3), a methyl methacrylate/sodium styrene sulfonate copolymer (comparative compound 4) described in Japanese Patent Application Laid-Open No. H03-113462 and a styrene/butylacrylate (copolymerization ratio (mass ratio)=95/5) block copolymer (Mw=9,718) (comparative compound 5) described in Japanese Patent Application Laid-Open No. H06-148927.

Example 8

A magenta pigment dispersion was prepared by the following method.

<Preparation Example 1 of Magenta Pigment Dispersion>

C.I. Pigment Red 122 (18.0 parts) represented by formula (Pig-D) as a magenta pigment, 1.80 parts of colorant compound (101), 180 parts of styrene as a water-insoluble solvent and 130 parts of glass beads (diameter: 1 mm) were mixed, dispersed by an attritor (manufactured by Nippon Coke & Engineering. Co., Ltd.) for 3 hours and filtrated by a mesh to provide magenta pigment dispersion (Dis-M101).

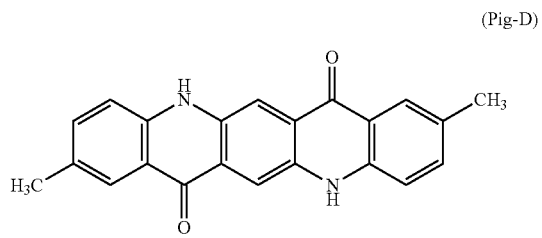

(Pig-D)

<Preparation Example 2 of Magenta Pigment Dispersion>

Each of magenta pigment dispersions (Dis-M102) to (Dis-M150) and (Dis-M163) to (Dis-M164) was obtained by the same operation as in Preparation Example 1 of magenta pigment dispersion above except that colorant compound (101) was changed to each of colorant compounds (102) to (150) and (153) to (154).

<Preparation Example 3 of Magenta Pigment Dispersion>

Each of magenta pigment dispersions (Dis-M151) and (Dis-M152) was obtained by the same operation as in Preparation Example 1 of magenta pigment dispersion above except that C.I. Pigment Red 122 represented by formula (Pig-D) was changed to C.I. Pigment Red 255 represented by formula (Pig-E) or C.I. Pigment Red 150 represented by formula (Pig-F).

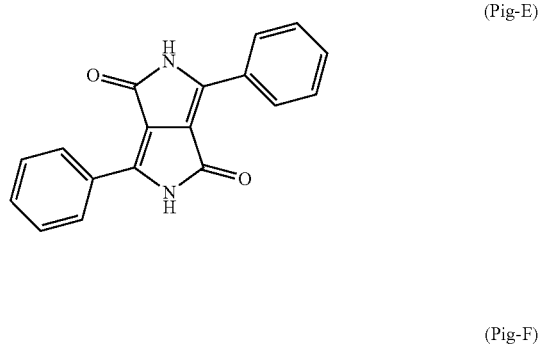

(Pig-E)

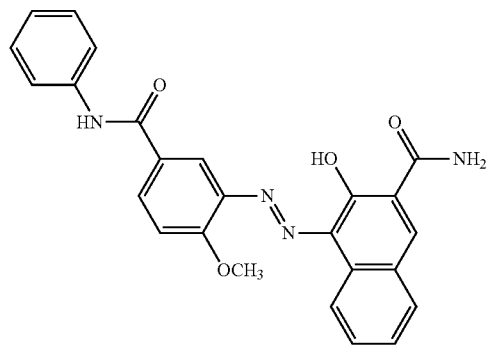

(Pig-F)

<Preparation Example 4 of Magenta Pigment Dispersion>

C.I. Pigment Red 122 (42.0 parts) represented by formula (Pig-D) as a magenta pigment and 4.2 parts of colorant compound (101) as a pigment dispersant were mixed by a hybridization system NHS-0 (manufactured by Nara Machinery Co., Ltd.) in a dry manner to prepare a pigment composition. The resulting pigment composition (19.8 parts) was mixed with 180 parts of styrene and 130 parts of glass beads (diameter: 1 mm), and the mixture was dispersed by a paint shaker (manufactured by Toyo Seiki Seisaku-Sho Ltd.) for 1 hour and filtrated by a mesh to provide magenta pigment dispersion (Dis-M153).

Comparative Example 5

Reference magenta pigment dispersions each providing the reference value for evaluation, and a comparative magenta pigment dispersion were prepared by the following methods.

<Preparation Example 1 of Reference Magenta Pigment Dispersion>

Reference magenta pigment dispersion (Dis-M154) was obtained by the same operation as in Preparation Example 1 of magenta pigment dispersion above except that colorant compound (101) was not added.

<Preparation Example 2 of Reference Magenta Pigment Dispersion>

Each of reference magenta pigment dispersions (Dis-M155) and (Dis-M156) was obtained by the same operation as in Preparation Example 3 of magenta pigment dispersion above except that colorant compound (101) was not added.

<Preparation Example 3 of Reference Magenta Pigment Dispersion>

Reference magenta pigment dispersion (Dis-M157) was obtained by the same operation as in Preparation Example 4 of magenta pigment dispersion above except that colorant compound (101) was not added.

<Preparation Example 1 of Comparative Magenta Pigment Dispersion>

Each of comparative magenta pigment dispersions (Dis-M158) to (Dis-M162) was obtained by the same operation as in Preparation Example 1 of magenta pigment dispersion above except that colorant compound (101) was changed to each of comparative azo compound (151) (comparative compound 1), comparative azo compound (152) (comparative compound 2), comparative compound 3, comparative compound 4 and comparative compound 5.

Example 9

A cyan pigment dispersion was prepared by the following method.

<Preparation Example 1 of Cyan Pigment Dispersion>

C.I. Pigment Blue 15:3 (18.0 parts) represented by formula (Pig-G) as a cyan pigment, 1.80 parts of colorant compound (101), 180 parts of styrene as a water-insoluble solvent and 130 parts of glass beads (diameter: 1 mm) were mixed and dispersed by an attritor (manufactured by Nippon Coke & Engineering. Co., Ltd.) for 3 hours, and filtrated by a mesh to provide cyan pigment dispersion (Dis-C101).

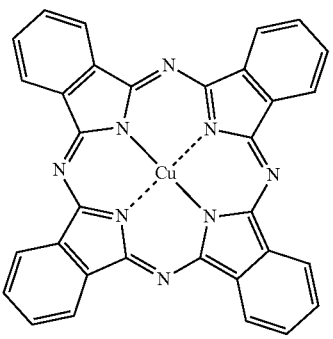

(Pig-G)

<Preparation Example 2 of Cyan Pigment Dispersion>

Each of cyan pigment dispersions (Dis-C102) to (Dis-C150) and (Dis-C163) to (Dis-C164) was obtained by the same operation as in Preparation Example 1 of cyan pigment dispersion above except that colorant compound (101) was changed to each of colorant compounds (102) to (150) and (153) to (154).

<Preparation Example 3 of Cyan Pigment Dispersion>

Each of cyan pigment dispersions (Dis-C151) and (Dis-C152) was obtained by the same operation as in Preparation Example 1 of cyan pigment dispersion above except that C.I. Pigment Blue 15:3 represented by formula (Pig-G) was changed to C.I. Pigment Blue 16 represented by formula (Pig-H) or C.I. Pigment Blue 17:1 represented by formula (Pig-I).

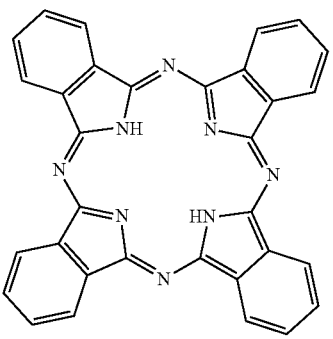

(Pig-H)

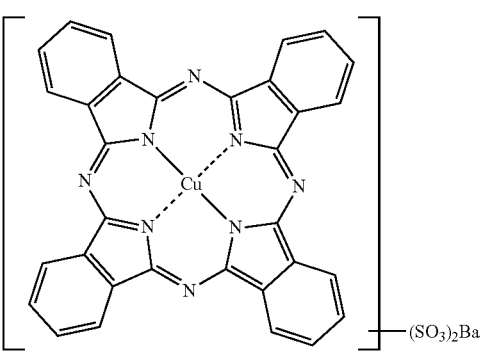

(Pig-I)

<Preparation Example 4 of Cyan Pigment Dispersion>

C.I. Pigment Blue 15:3 (42.0 parts) represented by formula (Pig-G) as a cyan pigment and 4.2 parts of colorant compound (101) as a pigment dispersant were mixed by a hybridization system NHS-0 (manufactured by Nara Machinery Co., Ltd.) in a dry manner to prepare a pigment composition. The resulting pigment composition (19.8 parts) was mixed with 180 parts of styrene and 130 parts of glass beads (diameter: 1 mm), and the mixture was dispersed by a paint shaker (manufactured by Toyo Seiki Seisaku-Sho Ltd.) for 1 hour and filtrated by a mesh to provide cyan pigment dispersion (Dis-C153).

Comparative Example 6

Reference cyan pigment dispersions each providing the reference value for evaluation, and a comparative cyan pigment dispersion were prepared by the following methods.

<Preparation Example 1 of Reference Cyan Pigment Dispersion>

Reference cyan pigment dispersion (Dis-C154) was obtained by the same operation as in Preparation Example 1 of cyan pigment dispersion above except that colorant compound (101) was not added.

<Preparation Example 2 of Reference Cyan Pigment Dispersion>

Each of reference cyan pigment dispersions (Dis-C155) and (Dis-C156) was obtained by the same operation as in Preparation Example 3 of cyan pigment dispersion above except that colorant compound (101) was not added.

<Preparation Example 3 of Reference Cyan Pigment Dispersion>

Reference cyan pigment dispersion (Dis-C157) was obtained by the same operation as Preparation Example 4 of cyan pigment dispersion above except that colorant compound (101) was not added.

<Preparation Example 1 of Comparative Cyan Pigment Dispersion>

Each of comparative cyan pigment dispersions (Dis-C158) to (Dis-C162) was obtained by the same operation as in Preparation Example 1 of cyan pigment dispersion above except that colorant compound (101) was changed to each of comparative azo compound (151) (comparative compound 1), comparative azo compound (152) (comparative compound 2), comparative compound 3, comparative compound 4 and comparative compound 5.

Example 10

A black pigment dispersion was prepared by the following method.

<Preparation Example 1 of Black Pigment Dispersion>

Carbon black (specific surface area=65 $m^2/g$, average particle size=30 nm, pH=9.0) (30.0 parts) as a black pigment, 3.0 parts of colorant compound (101), 150 parts of styrene as a water-insoluble solvent and 130 parts of glass beads (diameter: 1 mm) were mixed and dispersed by an attritor (manufactured by Nippon Coke & Engineering. Co., Ltd.) for 3 hours, and filtrated by a mesh to provide black pigment dispersion (Dis-Bk1).

<Preparation Example 2 of Black Pigment Dispersion>

Each of black pigment dispersions (Dis-Bk102) to (Dis-Bk150) and (Dis-Bk163) to (Dis-Bk164) was obtained by the same operation as in Preparation Example 1 of black pigment dispersion above except that colorant compound (101) was changed to each of colorant compounds (102) to (150) and (153) to (154).

<Preparation Example 3 of Black Pigment Dispersion>

Each of black dispersion liquids (Dis-Bk151) and (Dis-Bk152) was obtained by the same operation as in Preparation Example 1 of black pigment dispersion above except that carbon black (specific surface area=65 $m^2/g$, average particle size=30 nm, pH=9.0) was changed to carbon black (specific surface area=77 m²/g, average particle size=28 nm, pH=7.5) or carbon black (specific surface area=370 m²/g, average particle size=13 nm, pH=3.0).

<Preparation Example 4 of Black Pigment Dispersion>

Carbon black (specific surface area=65 m²/g, average particle size=30 nm, pH=9.0) (42.0 parts) as a black pigment and 4.2 parts of colorant compound (101) as a pigment dispersant were mixed by a hybridization system NHS-0 (manufactured by Nara Machinery Co., Ltd.) in a dry manner to prepare a pigment composition. The resulting pigment composition (33.0 parts) was mixed with 150 parts of styrene and 130 parts of glass beads (diameter: 1 mm), and the mixture was dispersed by a paint shaker (manufactured by Toyo Seiki Seisaku-Sho Ltd.) for 1 hour and filtrated by a mesh to provide black pigment dispersion (Dis-Bk153).

Comparative Example 7

Reference black pigment dispersions each providing the reference value for evaluation, and a comparative black pigment dispersion were prepared by the following methods.

<Preparation Example 1 of Reference Black Pigment Dispersion>

Reference black pigment dispersion (DIS-Bk154) was obtained by the same operation as in Preparation Example 1 of black pigment dispersion above except that colorant compound (101) was not added.

<Preparation Example 2 of Reference Black Pigment Dispersion>

Each of reference black pigment dispersions (Dis-Bk155) and (Dis-Bk156) was obtained by the same operation as in Preparation Example 3 of black pigment dispersion above except that colorant compound (101) was not added.

<Preparation Example 3 of Reference Black Pigment Dispersion>

Reference black pigment dispersion (Dis-Bk157) was obtained by the same operation as Preparation Example 4 of black pigment dispersion above except that colorant compound (101) was not added.

<Preparation Example 1 of Comparative Black Pigment Dispersion>

Each of comparative black pigment dispersions (Dis-Bk158) to (Dis-Bk162) was obtained by the same operation as in Preparation Example 1 of black pigment dispersion above except that colorant compound (101) was changed to each of comparative azo compound (151) (comparative compound 1), comparative azo compound (152) (comparative compound 2), comparative compound 3, comparative compound 4 and comparative compound 5.

Example 11

The pigment dispersions of the respective colors were evaluated by the following methods.

<Evaluation of Pigment Dispersibility>

A gloss test of a coating film was performed using yellow pigment dispersions (Dis-Y101) to (Dis-Y153) and (Dis-Y163) to (Dis-Y164), magenta pigment dispersions (Dis-M101) to (Dis-M153) and (Dis-M163) to (Dis-M164), cyan pigment dispersions (Dis-C101) to (Dis-C153) and (Dis-C163) to (Dis-C164), and black pigment dispersions (Dis-Bk101) to (Dis-Bk153) and (Dis-Bk163) to (Dis-Bk164), to evaluate the pigment dispersibility of the compound having a colorant structure portion of the present invention. A specific evaluation method is as follows.

Each of the pigment dispersions was taken up by a dropper, placed on the upper portion of Super Art paper (SA Kanafuji 180 kg, 80×160, manufactured by Oji Paper Co., Ltd.) in a straight-line manner and uniformly applied onto the Art paper using a wire bar (#10), and the gloss after drying (angle of reflection: 75°) was measured by a gloss meter "Gloss Meter VG2000" (manufactured by Nippon Denshoku Industries Co., Ltd.) and rated according to the following criteria. Herein, as the pigment is more finely dispersed, flatness of a coating film is enhanced to result in an enhancement in gloss value.

The rate of enhancement in the gloss value of each of yellow pigment dispersions (Dis-Y101) to (Dis-Y150) and (Dis-Y163) to (Dis-Y164) was determined using the gloss value of reference yellow pigment dispersion (Dis-Y154) as the reference value. The rate of enhancement in the gloss value of yellow pigment dispersion (Dis-Y151) was determined using the gloss value of reference yellow pigment dispersion (Dis-Y155) as the reference value. The rate of enhancement in the gloss value of yellow pigment dispersion (Dis-Y152) was determined using the gloss value of reference yellow pigment dispersion (Dis-Y156) as the reference value. The rate of enhancement in the gloss value of yellow pigment dispersion (Dis-Y153) was determined using the gloss value of reference yellow pigment dispersion (Dis-Y157) as the reference value.

The rate of enhancement in the gloss value of each of magenta pigment dispersions (Dis-M101) to (Dis-M150) and (Dis-M163) to (Dis-M164) was determined using the gloss value of reference magenta pigment dispersion (Dis-M154) as the reference value. The rate of enhancement in the gloss value of magenta pigment dispersion (Dis-M151) was determined using the gloss value of reference magenta pigment dispersion (Dis-M155) as the reference value. The rate of enhancement in the gloss value of magenta pigment dispersion (Dis-M152) was determined using the gloss value of reference magenta pigment dispersion (Dis-M156) as the reference value. The rate of enhancement in the gloss value of magenta pigment dispersion (Dis-M153) was determined using the gloss value of reference magenta pigment dispersion (Dis-M157) as the reference value.

The rate of enhancement in the gloss value of each of cyan pigment dispersions (Dis-C101) to (Dis-C150) and (Dis-C163) to (Dis-C164) was determined using the gloss value of reference cyan pigment dispersion (Dis-C154) as the reference value. The rate of enhancement in the gloss value of cyan pigment dispersion (Dis-C151) was determined using the gloss value of reference cyan pigment dispersion (Dis-C155) as the reference value. The rate of enhancement in the gloss value of cyan pigment dispersion (Dis-C152) was determined using the gloss value of reference cyan pigment dispersion (Dis-C156) as the reference value. The rate of enhancement in the gloss value of cyan pigment dispersion (Dis-C153) was determined using the gloss value of reference cyan pigment dispersion (Dis-C157) as the reference value.

The rate of enhancement in the gloss value of each of black pigment dispersions (Dis-Bk101) to (Dis-Bk150) and (Dis-Bk163) to (Dis-Bk164) was determined using the gloss value of reference black pigment dispersion (Dis-Bk154) as the reference value. The rate of enhancement in the gloss value of black pigment dispersion (Dis-Bk151) was determined using the gloss value of reference black pigment dispersion (Dis-Bk155) as the reference value. The rate of enhancement in the gloss value of black pigment dispersion (Dis-Bk152) was determined using the gloss value of reference black pigment dispersion (Dis-Bk156) as the reference value. The rate of enhancement in the gloss value of black pigment dispersion (Dis-Bk153) was determined using the gloss value of reference black pigment dispersion (Dis-Bk157) as the reference value.

The evaluation criteria of the pigment dispersions of the respective colors are shown below.

Evaluation Criteria of Yellow Pigment Dispersion
A: the rate of enhancement in the gloss value was 10% or more.
B: the rate of enhancement in the gloss value was 5% or more and less than 10%.
C: the rate of enhancement in the gloss value was 0% or more and less than 5%.
D: the gloss value was reduced.
It was determined that when the rate of enhancement in the gloss value was 5% or more, good pigment dispersibility was achieved.

Evaluation Criteria of Magenta Pigment Dispersion
A: the rate of enhancement in the gloss value was 35% or more.
B: the rate of enhancement in the gloss value was 20% or more and less than 35%.
C: the rate of enhancement in the gloss value was 5% or more and less than 20%.
D: the rate of enhancement in the gloss value was less than 5%.
It was determined that when the rate of enhancement in the gloss value was 20% or more, good pigment dispersibility was achieved.

Evaluation Criteria of Cyan Pigment Dispersion
A: the rate of enhancement in the gloss value was 25% or more.
B: the rate of enhancement in the gloss value was 15% or more and less than 25%.
C: the rate of enhancement in the gloss value was 5% or more and less than 15%.
D: the rate of enhancement in the gloss value was less than 5%.
It was determined that when the rate of enhancement in the gloss value was 15% or more, good pigment dispersibility was achieved.

Evaluation Criteria of Black Pigment Dispersion
A: the gloss value was 80 or more.
B: the gloss value was 50 or more and less than 80.
C: the gloss value was 20 or more and less than 50.
D: the gloss value was less than 20.
It was determined that the gloss value was 50 or more, good pigment dispersibility was achieved.

Comparative Example 8

The gloss of each of comparative yellow pigment dispersions (Dis-Y158) to (Dis-Y162), comparative magenta pigment dispersions (Dis-M158) to (Dis-M162), comparative cyan pigment dispersions (Dis-C158) to (Dis-C162) and comparative black pigment dispersions (Dis-Bk158) to (Dis-Bk162) was evaluation by the same method as in Example 11.

Herein, the rate of enhancement in the gloss value of each of comparative yellow pigment dispersions (Dis-Y158) to (Dis-Y162) was determined using the gloss value of reference yellow pigment dispersion (Dis-Y154) as the reference value. The rate of enhancement in the gloss value of each of comparative magenta pigment dispersions (Dis-M158) to (Dis-M162) was determined using the gloss value of reference magenta pigment dispersion (Dis-M154) as the reference value. The rate of enhancement in the gloss value of each of cyan pigment dispersions (Dis-C158) to (Dis-C162) was determined using the gloss value of reference cyan pigment dispersion (Dis-C154) as the reference value. The rate of enhancement in the gloss value of each of black pigment dispersions (Dis-Bk158) to (Dis-Bk162) was determined using the gloss value of reference black pigment dispersion (Dis-Bk154) as the reference value.

The evaluation results of the yellow pigment dispersions, the magenta pigment dispersions, the cyan pigment dispersions and the black pigment dispersions are shown in Table 4.

TABLE 4

Evaluation results of pigment dispersion of the present invention

| Compound No. | Yellow Pigment Dispersion | Gloss value | Magenta Pigment Dispersion | Gloss value | Cyan Pigment Dispersion | Gloss value | Black Pigment Dispersion | Gloss value |
|---|---|---|---|---|---|---|---|---|
| 101 | Dis-Y101 | A(72) | Dis-M101 | A(74) | Dis-C101 | A(67) | Dis-Bk101 | A(83) |
| 102 | Dis-Y102 | A(64) | Dis-M102 | A(75) | Dis-C102 | A(69) | Dis-Bk102 | A(102) |
| 103 | Dis-Y103 | A(74) | Dis-M103 | A(74) | Dis-C103 | A(63) | Dis-Bk103 | A(88) |
| 104 | Dis-Y104 | A(74) | Dis-M104 | A(74) | Dis-C104 | A(68) | Dis-Bk104 | A(91) |
| 105 | Dis-Y105 | A(69) | Dis-M105 | A(70) | Dis-C105 | A(69) | Dis-Bk105 | A(99) |
| 106 | Dis-Y106 | A(73) | Dis-M106 | A(68) | Dis-C106 | A(65) | Dis-Bk106 | A(95) |
| 107 | Dis-Y107 | A(74) | Dis-M107 | A(65) | Dis-C107 | A(65) | Dis-Bk107 | A(89) |
| 108 | Dis-Y108 | A(74) | Dis-M108 | A(71) | Dis-C108 | A(67) | Dis-Bk108 | A(85) |
| 109 | Dis-Y109 | A(64) | Dis-M109 | A(73) | Dis-C109 | A(59) | Dis-Bk109 | A(98) |
| 110 | Dis-Y110 | A(70) | Dis-M110 | A(69) | Dis-C110 | A(69) | Dis-Bk110 | A(101) |
| 111 | Dis-Y111 | A(66) | Dis-M111 | A(70) | Dis-C111 | A(68) | Dis-Bk111 | A(99) |
| 112 | Dis-Y112 | A(67) | Dis-M112 | A(73) | Dis-C112 | A(65) | Dis-Bk112 | A(95) |
| 113 | Dis-Y113 | A(67) | Dis-M113 | A(68) | Dis-C113 | A(65) | Dis-Bk113 | A(103) |
| 114 | Dis-Y114 | A(72) | Dis-M114 | A(70) | Dis-C114 | A(61) | Dis-Bk114 | A(83) |
| 115 | Dis-Y115 | A(68) | Dis-M115 | A(70) | Dis-C115 | A(60) | Dis-Bk115 | A(97) |
| 116 | Dis-Y116 | A(73) | Dis-M116 | A(69) | Dis-C116 | A(67) | Dis-Bk116 | A(92) |
| 117 | Dis-Y117 | A(70) | Dis-M117 | A(67) | Dis-C117 | A(60) | Dis-Bk117 | A(102) |
| 118 | Dis-Y118 | A(71) | Dis-M118 | A(67) | Dis-C118 | A(67) | Dis-Bk118 | A(82) |
| 119 | Dis-Y119 | A(74) | Dis-M119 | A(71) | Dis-C119 | A(66) | Dis-Bk119 | A(85) |
| 120 | Dis-Y120 | A(74) | Dis-M120 | A(73) | Dis-C120 | A(62) | Dis-Bk120 | A(92) |
| 121 | Dis-Y121 | A(66) | Dis-M121 | A(75) | Dis-C121 | A(62) | Dis-Bk121 | A(101) |
| 122 | Dis-Y122 | A(65) | Dis-M122 | A(64) | Dis-C122 | A(67) | Dis-Bk122 | A(81) |
| 123 | Dis-Y123 | A(72) | Dis-M123 | A(72) | Dis-C123 | A(65) | Dis-Bk123 | A(99) |

TABLE 4-continued

Evaluation results of pigment dispersion of the present invention

| Compound No. | Yellow Pigment Dispersion | Gloss value | Magenta Pigment Dispersion | Gloss value | Cyan Pigment Dispersion | Gloss value | Black Pigment Dispersion | Gloss value |
|---|---|---|---|---|---|---|---|---|
| 124 | Dis-Y124 | A(71) | Dis-M124 | A(72) | Dis-C124 | A(64) | Dis-Bk124 | A(99) |
| 125 | Dis-Y125 | A(69) | Dis-M125 | A(70) | Dis-C125 | A(69) | Dis-Bk125 | A(102) |
| 126 | Dis-Y126 | A(75) | Dis-M126 | A(73) | Dis-C126 | A(59) | Dis-Bk126 | A(92) |
| 127 | Dis-Y127 | A(67) | Dis-M127 | A(68) | Dis-C127 | A(69) | Dis-Bk127 | A(96) |
| 128 | Dis-Y128 | A(76) | Dis-M128 | A(67) | Dis-C128 | A(62) | Dis-Bk128 | A(95) |
| 129 | Dis-Y129 | A(66) | Dis-M129 | A(67) | Dis-C129 | A(62) | Dis-Bk129 | A(93) |
| 130 | Dis-Y130 | A(67) | Dis-M130 | A(68) | Dis-C130 | A(65) | Dis-Bk130 | A(94) |
| 131 | Dis-Y131 | A(68) | Dis-M131 | A(72) | Dis-C131 | A(66) | Dis-Bk131 | A(101) |
| 132 | Dis-Y132 | A(67) | Dis-M132 | A(76) | Dis-C132 | A(59) | Dis-Bk132 | A(98) |
| 133 | Dis-Y133 | A(65) | Dis-M133 | A(66) | Dis-C133 | A(62) | Dis-Bk133 | A(100) |
| 134 | Dis-Y134 | A(68) | Dis-M134 | A(76) | Dis-C134 | A(68) | Dis-Bk134 | A(89) |
| 135 | Dis-Y135 | A(67) | Dis-M135 | A(76) | Dis-C135 | A(62) | Dis-Bk135 | A(99) |
| 136 | Dis-Y136 | A(68) | Dis-M136 | A(72) | Dis-C136 | A(65) | Dis-Bk136 | A(81) |
| 137 | Dis-Y137 | A(72) | Dis-M137 | A(75) | Dis-C137 | A(65) | Dis-Bk137 | A(83) |
| 138 | Dis-Y138 | A(73) | Dis-M138 | A(68) | Dis-C138 | A(65) | Dis-Bk138 | A(90) |
| 139 | Dis-Y139 | A(65) | Dis-M139 | A(68) | Dis-C139 | A(59) | Dis-Bk139 | A(85) |
| 140 | Dis-Y140 | A(67) | Dis-M140 | A(68) | Dis-C140 | A(66) | Dis-Bk140 | A(98) |
| 141 | Dis-Y141 | A(65) | Dis-M141 | A(73) | Dis-C141 | A(67) | Dis-Bk141 | A(89) |
| 142 | Dis-Y142 | A(70) | Dis-M142 | A(75) | Dis-C142 | A(59) | Dis-Bk142 | A(99) |
| 143 | Dis-Y143 | A(74) | Dis-M143 | A(74) | Dis-C143 | A(69) | Dis-Bk143 | A(104) |
| 144 | Dis-Y144 | A(75) | Dis-M144 | A(68) | Dis-C144 | A(65) | Dis-Bk144 | A(81) |
| 145 | Dis-Y145 | A(68) | Dis-M145 | A(65) | Dis-C145 | A(66) | Dis-Bk145 | A(97) |
| 146 | Dis-Y146 | A(66) | Dis-M146 | A(73) | Dis-C146 | A(63) | Dis-Bk146 | A(92) |
| 147 | Dis-Y147 | A(72) | Dis-M147 | A(70) | Dis-C147 | A(70) | Dis-Bk147 | A(100) |
| 148 | Dis-Y148 | A(70) | Dis-M148 | A(64) | Dis-C148 | A(65) | Dis-Bk148 | A(82) |
| 149 | Dis-Y149 | A(68) | Dis-M149 | A(68) | Dis-C149 | A(61) | Dis-Bk149 | A(93) |
| 150 | Dis-Y150 | A(66) | Dis-M150 | A(64) | Dis-C150 | A(68) | Dis-Bk150 | A(102) |
| 101 | Dis-Y151 | A(68) | Dis-M151 | A(67) | Dis-C151 | A(85) | Dis-Bk151 | A(100) |
| 101 | Dis-Y152 | A(65) | Dis-M152 | A(86) | Dis-C152 | A(89) | Dis-Bk152 | A(98) |
| 101 | Dis-Y153 | A(66) | Dis-M153 | A(73) | Dis-C153 | A(72) | Dis-Bk153 | A(95) |
| None | Dis-Y154 | (57) | Dis-M154 | (47) | Dis-C154 | (46) | Dis-Bk154 | (7) |
| None | Dis-Y155 | (60) | Dis-M155 | (42) | Dis-C155 | (63) | Dis-Bk155 | (12) |
| None | Dis-Y156 | (53) | Dis-M156 | (56) | Dis-C156 | (63) | Dis-Bk156 | (2) |
| None | Dis-Y157 | (55) | Dis-M157 | (48) | Dis-C157 | (49) | Dis-Bk157 | (5) |
| Comparative compound (1) | Dis-Y158 | A(74) | Dis-M158 | A(66) | Dis-C158 | A(60) | Dis-Bk158 | A(104) |
| Comparative compound (2) | Dis-Y159 | A(71) | Dis-M159 | A(74) | Dis-C159 | A(61) | Dis-Bk159 | A(101) |
| Comparative compound (3) | Dis-Y160 | B(60) | Dis-M160 | B(60) | Dis-C160 | B(54) | Dis-Bk160 | B(60) |
| Comparative compound (4) | Dis-Y161 | B(59) | Dis-M161 | B(56) | Dis-C161 | B(57) | Dis-Bk161 | B(64) |
| Comparative compound (5) | Dis-Y162 | C(58) | Dis-M162 | C(50) | Dis-C162 | C(51) | Dis-Bk162 | C(32) |
| 153 | Dis-Y163 | A(71) | Dis-M163 | A(68) | Dis-C163 | A(67) | Dis-Bk163 | A(95) |
| 154 | Dis-Y164 | A(71) | Dis-M164 | A(67) | Dis-C164 | A(66) | Dis-Bk164 | A(91) |

As can be seen from Table 4, it has been confirmed that the compound having a colorant structure portion of the present invention is used to thereby provide a pigment composition and a pigment dispersion that are good in pigment dispersibility.

Example 12

Next, a yellow toner by a suspension polymerization method was produced according to the following method.
<Production Example 1 of Yellow Toner>
(Preparation of Aqueous Medium)
Ion exchange water (710 parts) and 450 parts of an aqueous 0.1 mol/l-Na $PO_4$ solution were added to a four-neck flask equipped with a high-speed stirring apparatus T.K. homomixer (manufactured by Primix Corporation), the number of revolutions was adjusted to 12000 rpm, and the temperature was raised to 60° C. An aqueous 1.0 mol/l-$CaCl_2$ solution (68 parts) was gradually added thereto to prepare an aqueous medium containing a fine, hardly water-soluble dispersion stabilizer $Ca_3$ $(PO_4)_2$.

(Suspension Polymerization Step)
Next, the following composition was warmed to 60° C., and uniformly dissolved and dispersed at 5000 rpm using a high-speed stirring apparatus T.K. homomixer (manufactured by Primix Corporation).
Yellow pigment dispersion (Dis-Y101): 132 parts
Styrene monomer: 46 parts
n-Butylacrylate monomer: 34 parts
Polar resin (saturated polyester resin (terephthalic acid-propylene oxide-modified bisphenol A, acid value: 15, peak molecular weight: 6000)): 10 parts
Ester wax (maximum exothermic peak in DSC measurement=70° C., Mn=704): 25 parts
Aluminum salicylate compound (produced by Orient Chemical Industries Co., Ltd., product name: Bontron E-108): 2 parts
Divinyl benzene monomer: 0.1 parts
2,2'-Azobis(2,4-dimethylvaleronitrile) (10 parts) as a polymerization initiator was added thereto, the resultant was loaded into the aqueous medium, and granulation was conducted for 15 minutes while the number of revolutions was maintained at 12000 rpm. Thereafter, the high-speed stirring apparatus was changed to a stirring apparatus equipped with a propeller stirring blade, polymerization was continued at a liquid temperature of 60° C. for 5 hours, and thereafter the liquid temperature was raised to 80° C. and polymerization was continued for 8 hours. After completion of the polymerization reaction, the remaining monomer was distilled off at 80° C. under reduced pressure, and thereafter the resultant was cooled to 30° C. to provide a fine polymer particle dispersion liquid.

(Washing/Dewatering Step)

The resulting fine polymer particle dispersion liquid was transferred to a washing vessel, dilute hydrochloric acid was added thereto with stirring, the resultant was stirred at a pH of 1.5 for 2 hours, and a compound of phosphoric acid and calcium, containing $Ca_3(PO_4)_2$, was dissolved and then subjected to solid-liquid separation by a filter to provide a fine polymer particle. The fine polymer particle was loaded into water and stirred to provide a dispersion liquid again, and thereafter the dispersion liquid was subjected to solid-liquid separation by a filter. Re-dispersing of the fine polymer particle in water and solid-liquid separation of the dispersion liquid were repeated until the compound of phosphoric acid and calcium, containing $Ca_3(PO_4)_2$, was sufficiently removed. Thereafter, the fine polymer particle finally subjected to solid-liquid separation was sufficiently dried by a dryer to provide a toner particle.

Hydrophilic fine silica powder (1.0 part) (number average primary particle size: 7 nm) surface-treated with hexamethyl disilazane, 0.15 parts of a rutile type fine titanium oxide powder (number average primary particle size: 45 nm) and 0.5 parts of a rutile type fine titanium oxide powder (number average primary particle size: 200 nm) based on 100 parts of the resulting toner particle were mixed by a Henschel mixer (manufactured by Nippon Coke & Engineering Co., Ltd.) in a dry manner for 5 minutes to provide yellow toner (Tnr-Y101).

<Production Example 2 of Yellow Toner>

Each of yellow toners (Tnr-Y102) to (Tnr-Y150) and (Tnr-Y161) to (Tnr-Y162) according to the present invention was obtained by the same operation as in Production Example 1 of yellow toner above except that yellow pigment dispersion (Dis-Y101) was changed to each of yellow pigment dispersions (Dis-Y102) to (Dis-Y150) and (Dis-Y163) to (Dis-Y164).

<Production Example 3 of Yellow Toner>

Each of yellow toners (Tnr-Y151) and (Tnr-Y152) was obtained by the same operation as in Production Example of yellow toner above except that yellow pigment dispersion (Dis-Y101) was changed to each of yellow pigment dispersions (Dis-Y151) and (Dis-Y152).

Comparative Example 9

Reference yellow toners each providing the reference value for evaluation, and a comparative yellow toner were produced by the following methods.

<Production Example 1 of Reference Yellow Toner>

Each of reference yellow toners (Tnr-Y153) to (Tnr-Y155) was obtained by the same operation as in Production Example 1 of yellow toner above except that yellow pigment dispersion (Dis-Y101) was changed to each of yellow pigment dispersions (Dis-Y154) to (Dis-Y156).

<Production Example 1 of Comparative Yellow Toner>

Each of comparative yellow toners (Tnr-Y156) to (Tnr-Y160) was obtained by the same operation as in Production Example 1 of yellow toner above except that yellow pigment dispersion (Dis-Y101) was changed to each of yellow pigment dispersions (Dis-Y158) to (Dis-Y162).

Example 13

Next, a magenta toner by a suspension polymerization method was produced by the following method.

<Production Example 1 of Magenta Toner>

Magenta toner (Tnr-M101) was obtained by the same operation as in Production Example 1 of yellow toner above except that yellow pigment dispersion (Dis-Y101) was changed to magenta pigment dispersion (Dis-M101).

<Production Example 2 of Magenta Toner>

Each of magenta toners (Tnr-M102) to (Tnr-M150) and (Tnr-M161) to (Tnr-M162) according to the present invention was obtained by the same operation as in Production Example 1 of magenta toner above except that magenta pigment dispersion (Dis-M101) was changed to each of magenta pigment dispersions (Dis-M102) to (Dis-M150) and (Dis-M163) to (Dis-M164).

<Production Example 3 of Magenta Toner>

Each of magenta toners (Tnr-M151) and (Tnr-M152) was obtained by the same operation as in Production Example of magenta toner above except that magenta pigment dispersion (Dis-M101) was changed to each of magenta pigment dispersions (Dis-M151) and (Dis-M152).

Comparative Example 10

Reference magenta toners each providing the reference value for evaluation, and a comparative magenta toner were produced by the following methods.

<Production Example 1 of Reference Magenta Toner>

Each of reference magenta toners (Tnr-M153) to (Tnr-M155) was obtained by the same operation as in Production Example 1 of magenta toner above except that magenta pigment dispersion (Dis-M101) was changed to each of magenta pigment dispersions (Dis-M154) to (Dis-M156).

<Production Example 1 of Comparative Magenta Toner>

Each of comparative magenta toners (Tnr-M156) to (Tnr-M160) was obtained by the same operation as in Production Example 1 of magenta toner above except that magenta pigment dispersion (Dis-M101) was changed to each of magenta pigment dispersions (Dis-M158) to (Dis-M162).

Example 14

Next, a cyan toner by a suspension polymerization method was produced by the following method.

<Production Example 1 of Cyan Toner>

Cyan toner (Tnr-C101) was obtained by the same operation as in Production Example 1 of yellow toner above except that yellow pigment dispersion (Dis-Y101) was changed to cyan pigment dispersion (Dis-C101).

<Production Example 2 of Cyan Toner>

Each of cyan toners (Tnr-C102) to (Tnr-C150) and (Tnr-C161) to (Tnr-C162) according to the present invention was obtained by the same operation as in Production Example 1 of cyan toner above except that cyan pigment dispersion (Dis-C101) was changed to each of cyan pigment dispersions (Dis-C102) to (Dis-C150) and (Dis-C163) to (Dis-C164).

<Production Example 3 of Cyan Toner>

Each of cyan toners (Tnr-C151) and (Tnr-C152) was obtained by the same operation as in Production Example 1 of cyan toner above except that cyan pigment dispersion (Dis-C101) was changed to each of cyan pigment dispersions (Dis-C151) and (Dis-C152).

Comparative Example 11

Reference cyan toners each providing the reference value for evaluation, and a comparative cyan toner were produced by the following methods.
<Production Example 1 of Reference Cyan Toner>
Each of reference cyan toners (Tnr-C153) to (Tnr-C155) was obtained by the same operation as in Production Example 1 of cyan toner above except that cyan pigment dispersion (Dis-C101) was changed to each of cyan pigment dispersions (Dis-C154) to (Dis-C156).
<Production Example 1 of Comparative Cyan Toner>
Each of comparative cyan toners (Tnr-C156) to (Tnr-C160) was obtained by the same operation as in Production Example 1 of cyan toner above except that cyan pigment dispersion (Dis-C101) was changed to each of cyan pigment dispersions (Dis-C158) to (Dis-C162).

Example 15

Next, a black toner by a suspension polymerization method was produced by the following method.
<Production Example 1 of Black Toner>
Black toner (Tnr-Bk101) was obtained by the same operation as in Production Example 1 of yellow toner above except that yellow pigment dispersion (Dis-Y101) was changed to black pigment dispersion (Dis-Bk101).
<Production Example 2 of Black Toner>
Each of black toners (Tnr-Bk102) to (Tnr-Bk150) and (Tnr-Bk161) to (Tnr-Bk162) according to the present invention was obtained by the same operation as in Production Example 1 of black toner above except that black pigment dispersion (Dis-Bk101) was changed to each of black pigment dispersions (Dis-Bk102) to (Dis-Bk150) and (Dis-Bk163) to (Dis-Bk164).
<Production Example 3 of Black Toner>
Each of black toners (Tnr-Bk151) and (Tnr-Bk152) was obtained by the same operation as in Production Example 1 of black toner above except that black pigment dispersion (Dis-Bk101) was changed to each of black pigment dispersions (Dis-Bk151) and (Dis-Bk152).

Comparative Example 12

Reference black toners each providing the reference value for evaluation, and a comparative black toner were produced by the following methods.
<Production Example 1 of Reference Black Toner>
Each of reference black toners (Tnr-Bk153) to (Tnr-Bk155) was obtained by the same operation as in Production Example 1 of black toner above except that black pigment dispersion (Dis-Bk101) was changed to each of black pigment dispersions (Dis-Bk154) to (Dis-Bk156).
<Production Example 1 of Comparative Black Toner>
Each of comparative black toners (Tnr-Bk156) to (Tnr-Bk160) was obtained by the same operation as in Production Example 1 of black toner above except that black pigment dispersion (Dis-Bk101) was changed to each of black pigment dispersions (Dis-Bk158) to (Dis-Bk162).

Example 16

Next, a yellow toner by a suspension polymerization method was produced by the following method.

<Production Example 4 of Yellow Toner>
(Preparation of Yellow Pigment Dispersion)
Ethyl acetate (180 parts), 12 parts of C.I. Pigment Yellow 155, 1.2 parts of colorant compound (101) and 130 parts of glass beads (diameter: 1 mm) are mixed and dispersed by an attritor (manufactured by Nippon Coke & Engineering. Co., Ltd.) for 3 hours, and filtrated by a mesh to prepare a yellow pigment dispersion.
(Mixing Step)
The following ingredients were dispersed by a ball mill for 24 hours to provide 200 parts of a toner composition mixed liquid.
Yellow pigment dispersion: 96.0 parts
Polar resin (saturated polyester resin (polycondensate of propylene oxide-modified bisphenol A and phthalic acid, Tg=75.9° C., Mw=11000, Mn=4200, acid value: 11)): 85.0 parts
Hydrocarbon wax (Fischer-Tropsch wax, maximum exothermic peak in DSC measurement=80° C., Mw=750): 9.0 parts
Aluminum salicylate compound (produced by Orient Chemical Industries Co., Ltd., product name: Bontron E-108): 2 parts
Ethyl acetate (solvent): 10.0 parts
(Dispersing/Suspending Step)
The following ingredients were dispersed by a ball mill for 24 hours to dissolve carboxymethyl cellulose, providing an aqueous medium.
Calcium carbonate (covered with acrylic copolymer): 20.0 parts
Carboxymethyl cellulose (Celogen BS-H, produced by Dai-Ichi Kogyo Seiyaku Co., Ltd.): 0.5 parts
Ion exchange water: 99.5 parts
The aqueous medium (1200 parts) was placed in a high-speed stirring apparatus T.K. homomixer (manufactured by Primix Corporation), and 1000 parts of the toner composition mixed liquid was loaded thereto with stirring by a stirring blade at a peripheral velocity of 20 m/sec and stirred for 1 minute with the temperature being constantly kept at 25° C., to provide a suspension.
(Solvent Removal Step)
While 2200 parts of the suspension was stirred by a Fullzone blade (manufactured by Kobelco Eco-Solutions Co., Ltd.) at a peripheral velocity of 45 m/min, the liquid temperature was constantly kept at 40° C. and the gas phase on the surface of the suspension was forced to be evacuated using a blower, starting removal of the solvent. Here, 75 parts of ammonia water diluted to 1% was added as an ionic substance at 15 minutes after removal of the solvent was started. Subsequently, 25 parts of the ammonia water was added at 1 hour after removal of the solvent was started. Subsequently, 25 parts of the ammonia water was added at 2 hours after removal of the solvent was started. Finally, 25 parts of the ammonia water was added at 3 hours after removal of the solvent was started, and the total amount added reached 150 parts. While the liquid temperature was kept at 40° C., the resultant was further retained for 17 hours after removal of the solvent was started, to provide a toner dispersion liquid in which the solvent (ethyl acetate) was removed from a suspension particle.
(Washing/Dewatering Step)
After 80 parts of 10 mol/l hydrochloric acid was added to 300 parts of the toner dispersion liquid obtained in the solvent removal step and further subjected to a neutralization treatment with an aqueous 0.1 mol/l sodium hydroxide solution, the resultant was repeatedly subjected to washing with ion exchange water by suction filtration four times to provide a toner cake. The resulting toner cake was dried by a vacuum dryer and passed through a sieve having an opening of 45 μm to provide a toner particle. The subsequent operations were conducted in the same manner as in Production Example 1 of yellow toner in Example 12 to provide yellow toner (Tnr-Y201) according to the present invention.

<Production Example 5 of Yellow Toner>

Each of yellow toners (Tnr-Y202) to (Tnr-Y250) and (Tnr-Y261) to (Tnr-Y262) according to the present invention was obtained by the same operation as in Production Example 4 of yellow toner above except that colorant compound (101) was changed to each of (102) to (150) and (153) to (154).

<Production Example 6 of Yellow Toner>

Each of yellow toners (Tnr-Y251) and (Tnr-Y252) was obtained by the same operation as in Production Example 4 of yellow toner above except that C.I. Pigment Yellow 155 represented by formula (Pig-A) was changed to each of C.I. Pigment Yellow 180 represented by formula (Pig-B) and C.I. Pigment Yellow 185 represented by formula (Pig-C).

Comparative Example 13

Reference yellow toners each providing the reference value for evaluation, and a comparative yellow toner were prepared by the following methods.

<Production Example 2 of Reference Yellow Toner>

Reference yellow toner (Tnr-Y253) was obtained by the same operation as in Preparation Example 4 of yellow toner above except that colorant compound (101) was not added.

<Production Example 3 of Reference Yellow Toner>

Each of reference yellow toners (Tnr-Y254) and (Tnr-Y255) was obtained by the same operation as in Preparation Example 6 of yellow toner above except that colorant compound (101) was not added.

<Production Example 2 of Comparative Yellow Toner>

Each of comparative yellow toners (Tnr-Y256) to (Tnr-Y260) was obtained by the same operation as in Preparation Example 4 of yellow toner above except that colorant compound (101) was changed to each of comparative azo compound (151) (comparative compound 1), comparative azo compound (152) (comparative compound 2), comparative compound 3, comparative compound 4 and comparative compound 5.

Example 17

Next, a magenta toner by a suspension granulation method was produced by the following method.

<Production Example 4 of Magenta Toner>

Magenta toner (Tnr-M201) according to the present invention was obtained by the same operation as in Preparation Example 4 of yellow toner above except that C.I. Pigment Yellow 155 (yellow pigment) represented by formula (Pig-A) was changed to C.I. Pigment Red 122 represented by formula (Pig-D).

<Production Example 5 of Magenta Toner>

Each of magenta toners (Tnr-M202) to (Tnr-M250) and (Tnr-M261) to (Tnr-M262) according to the present invention was obtained by the same operation as in Preparation Example 4 of magenta toner above except that colorant compound (101) was changed to each of (102) to (150) and (153) to (154).

<Production Example 6 of Magenta Toner>

Each of magenta toners (Tnr-M251) and (Tnr-M252) according to the present invention was obtained by the same operation as in Preparation Example 4 of magenta toner above except that C.I. Pigment Red 122 represented by formula (Pig-D) was changed to C.I. Pigment Red 255 represented by formula (Pig-E) or C.I. Pigment Red 150 represented by formula (Pig-F).

Comparative Example 14

Reference magenta toners each providing the reference value for evaluation, and a comparative magenta toner were prepared by the following methods.

<Production Example 2 of Reference Magenta Toner>

Reference magenta toner (Tnr-M253) was obtained by the same operation as in Preparation Example 4 of magenta toner above except that colorant compound (101) was not added.

<Production Example 3 of Reference Magenta Toner>

Each of reference magenta toners (Tnr-M254) and (Tnr-M255) was obtained by the same operation as in Preparation Example 6 of magenta toner above except that colorant compound (101) was not added.

<Production Example 2 of Comparative Magenta Toner>

Each of comparative magenta toners (Tnr-M256) to (Tnr-M260) was obtained by the same operation as in Preparation Example 4 of magenta toner above except that colorant compound (101) was changed to each of comparative azo compound (151) (comparative compound 1), comparative azo compound (152) (comparative compound 2), comparative compound 3, comparative compound 4 and comparative compound 5.

Example 18

Next, a cyan toner by a suspension granulation method was produced by the following method.

<Production Example 4 of Cyan Toner>

Cyan toner (Tnr-C201) according to the present invention was obtained by the same operation as in Production Example 4 of yellow toner above except that C.I. Pigment Yellow 155 represented by formula (Pig-A) was changed to C.I. Pigment Blue 15:3 represented by formula (Pig-G).

<Production Example 5 of Cyan Toner>

Each of cyan toners (Tnr-C202) to (Tnr-C250) and (Tnr-C261) to (Tnr-C262) according to the present invention was obtained by the same operation as in Production Example 4 of cyan toner above except that colorant compound (101) was changed to each of (102) to (150) and (163) to (164).

<Production Example 6 of Cyan Toner>

Each of cyan toners (Tnr-C251) and (Tnr-C252) according to the present invention was obtained by the same operation as in Production Example 4 of cyan toner above except that C.I. Pigment Blue 15:3 represented by formula (Pig-G) was changed to C.I. Pigment Blue 16 represented by formula (Pig-H) or C.I. Pigment Blue 17:1 represented by formula (Pig-I).

Comparative Example 15

Reference cyan toners each providing the reference value for evaluation, and a comparative cyan toner were prepared by the following methods.

<Production Example 2 of Reference Cyan Toner>

Reference cyan toner (Tnr-C253) was obtained by the same operation as in Preparation Example 4 of cyan toner above except that colorant compound (101) was not added.

<Production Example 3 of Reference Cyan Toner>

Each of reference cyan toners (Tnr-C254) and (Tnr-C255) was obtained by the same operation as in Preparation Example 6 of cyan toner above except that colorant compound (101) was not added.

<Production Example 2 of Comparative Cyan Toner>

Each of comparative cyan toners (Tnr-C256) to (Tnr-C260) was obtained by the same operation as in Preparation Example 4 of cyan toner above except that colorant compound (101) was changed to each of comparative azo compound (151) (comparative compound 1), comparative azo compound (152) (comparative compound 2), comparative compound 3, comparative compound 4 and comparative compound 5.

Example 19

Next, a black toner by a suspension granulation method was produced by the following method.

<Production Example 4 of Black Toner>

Black toner (Tnr-Bk201) according to the present invention was obtained by the same operation as in Preparation Example 4 of yellow toner above except that 12 parts of C.I. Pigment Yellow 155 represented by formula (Pig-A) and 1.2 parts of colorant compound (101) were changed to 30 parts of carbon black (specific surface area=65 m²/g, average particle size=30 nm, pH=9.0) and 3.0 parts of colorant compound (101), respectively.

<Production Example 5 of Black Toner>

Each of black toners (Tnr-Bk202) to (Tnr-Bk250) and (Tnr-Bk261) to (Tnr-Bk262) according to the present invention was obtained by the same operation as in Preparation Example 4 of black toner above except that colorant compound (101) was changed to each of (102) to (150) and (163) to (164).

<Production Example 6 of Black Toner>

Each of black toners (Tnr-Bk251) and (Tnr-Bk252) according to the present invention was obtained by the same operation as in Preparation Example 4 of black toner above except that carbon black (specific surface area=65 m²/g, average particle size=30 nm, pH=9.0) was changed to carbon black (specific surface area=77 m²/g, average particle size=28 nm, pH=7.5) or carbon black (specific surface area=370 m²/g, average particle size=13 nm, pH=3.0).

Comparative Example 16

Reference black toners each providing the reference value for evaluation, and a comparative black toner were prepared by the following methods.

<Production Example 2 of Reference Black Toner>

Reference black toner (Tnr-Bk253) was obtained by the same operation as in Preparation Example 4 of black toner above except that colorant compound (101) was not added.

<Production Example 3 of Reference Black Toner>

Each of reference black toners (Tnr-Bk254) and (Tnr-Bk255) was obtained by the same operation as in Preparation Example 6 of black toner above except that colorant compound (101) was not added.

<Production Example 2 of Comparative Black Toner>

Each of comparative black toners (Tnr-Bk256) to (Tnr-Bk260) was obtained by the same operation as in Preparation Example 4 of black toner above except that colorant compound (101) was changed to each of comparative azo compound (151) (comparative compound 1), comparative azo compound (152) (comparative compound 2), comparative compound 3, comparative compound 4 and comparative compound 5.

Example 20

Each of the yellow toners, the magenta toners, the cyan toners and the black toners obtained in Examples 12 to 19 was evaluated by the following methods.

<Tinting Power Evaluation of Toner>

Yellow toners (Tnr-Y101) to (Tnr-Y162) and (Tnr-Y201) to (Tnr-Y262), magenta toners (Tnr-M101) to (Tnr-M162) and (Tnr-M201) to (Tnr-M262), cyan toners (Tnr-C101) to (Tnr-C162) and (Tnr-C201) to (Tnr-C262), and black toners (Tnr-Bk101) to (Tnr-Bk162) and (Tnr-Bk201) to (Tnr-Bk262) were used to output respective image samples, and the image samples were compared and evaluated with respect to image characteristics described later. Herein, sheet passing duration was conducted using LBP-5300 (manufactured by Canon Inc.) altered, as an image forming apparatus (hereinafter, also referred to as LBP), in comparison of image characteristics. LBP was altered so that a development blade in a process cartridge (hereinafter, also referred to as CRG) was exchanged to a SUS blade having a thickness of 8 μm and furthermore a blade bias of −200 (V) could be applied against the development bias to be applied to a development roller as a toner carrier.

A solid image having an amount of a toner placed of 0.5 mg/cm² was formed on a transfer paper sheet (75 g/m² paper) under an ordinary temperature and ordinary humidity environment (N/N (23.5° C., 60% RH)). The density of the solid image was measured using a reflection densitometer Spectrolino (manufactured by GretagMacbeth). The tinting power of each of the toners was evaluated by the rate of enhancement in the solid image density.

The rate of enhancement in the solid image density of each of yellow toners (Tnr-Y101) to (Tnr-Y150) and (Tnr-Y161) to (Tnr-Y162) was determined using the solid image density of reference yellow toner (Tnr-Y153) as the reference value. The rate of enhancement in the solid image density of yellow toner (Tnr-Y151) was determined using the solid image density of reference yellow toner (Tnr-Y154) as the reference value. The rate of enhancement in the solid image density of yellow toner (Tnr-Y152) was determined using the solid image density of reference yellow toner (Tnr-Y155) as the reference value.

The rate of enhancement in the solid image density of each of yellow toners (Tnr-Y201) to (Tnr-Y250) and (Tnr-Y261) to (Tnr-Y262) was determined using the solid image density of reference yellow toner (Tnr-Y253) as the reference value. The rate of enhancement in the solid image density of yellow toner (Tnr-Y251) was determined using the solid image density of reference yellow toner (Tnr-Y254) as the reference value. The rate of enhancement in the solid image density of yellow toner (Tnr-Y253) was determined using the solid image density of reference yellow toner (Tnr-Y255) as the reference value.

The rate of enhancement in the solid image density of each of magenta toners (Tnr-M101) to (Tnr-M150) and (Tnr-M161) to (Tnr-M162) was determined using the solid image density of reference magenta toner (Tnr-M153) as the reference value. The rate of enhancement in the solid image density of magenta toner (Tnr-M151) was determined using the solid image density of reference magenta toner (Tnr-M154) as the reference value. The rate of enhancement in the solid image density of magenta toner (Tnr-M152) was determined using the solid image density of reference magenta toner (Tnr-M155) as the reference value.

The rate of enhancement in the solid image density of each of magenta toners (Tnr-M201) to (Tnr-M250) and (Tnr-M261) to (Tnr-M262) was determined using the solid image density of reference magenta toner (Tnr-M253) as the reference value. The rate of enhancement in the solid image density of magenta toner (Tnr-M251) was determined using the solid image density of reference magenta toner (Tnr-M254) as the reference value. The rate of enhancement in the solid image density of magenta toner (Tnr-M253) was determined using the solid image density of reference magenta toner (Tnr-M255) as the reference value.

The rate of enhancement in the solid image density of each of cyan toners (Tnr-C101) to (Tnr-C150) and (Tnr-C161) to (Tnr-C162) was determined using the solid image density of reference cyan toner (Tnr-C153) as the reference value. The rate of enhancement in the solid image density of cyan toner (Tnr-C151) was determined using the solid image density of reference cyan toner (Tnr-C154) as the reference value. The rate of enhancement in the solid image density of cyan toner (Tnr-C152) was determined using the solid image density of reference cyan toner (Tnr-C155) as the reference value.

The rate of enhancement in the solid image density of each of cyan toners (Tnr-C201) to (Tnr-C250) and (Tnr-C261) to (Tnr-C262) was determined using the solid image density of reference cyan toner (Tnr-C253) as the reference value. The rate of enhancement in the solid image density of cyan toner (Tnr-C251) was determined using the solid image density of reference cyan toner (Tnr-C254) as the reference value. The rate of enhancement in the solid image density of cyan toner (Tnr-C253) was determined using the solid image density of reference cyan toner (Tnr-C255) as the reference value.

The rate of enhancement in the solid image density of each of black toners (Tnr-BK101) to (Tnr-BK150) and (Tnr-BK161) to (Tnr-BK162) was determined using the solid image density of reference black toner (Tnr-BK153) as the reference value. The rate of enhancement in the solid image density of black toner (Tnr-BK151) was determined using the solid image density of reference black toner (Tnr-BK154) as the reference value. The rate of enhancement in the solid image density of black toner (Tnr-BK152) was determined using the solid image density of reference black toner (Tnr-BK155) as the reference value.

The rate of enhancement in the solid image density of each of black toners (Tnr-BK201) to (Tnr-BK250) and (Tnr-BK261) to (Tnr-BK262) was determined using the solid image density of reference black toner (Tnr-BK253) as the reference value. The rate of enhancement in the solid image density of black toner (Tnr-BK251) was determined using the solid image density of reference black toner (Tnr-BK254) as the reference value. The rate of enhancement in the solid image density of black toner (Tnr-BK253) was determined using the solid image density of reference black toner (Tnr-BK255) as the reference value.

Hereinafter, the evaluation criteria of the rates of enhancement of the solid image density of the respective colors are shown below.

Evaluation criteria of the rate of enhancement in the solid image density of yellow toner
A: the rate of enhancement in the solid image density was 5% or more.
B: the rate of enhancement in the solid image density was 1% or more and less than 5%.
C: the rate of enhancement in the solid image density was 0% or more and less than 1%.
D: the solid image density was reduced.
It was determined that when the rate of enhancement in the solid image density was 1% or more, good color tone was achieved.

Evaluation criteria of the rate of enhancement in the solid image density of magenta toner
A: the rate of enhancement in the solid image density was 20% or more.
B: the rate of enhancement in the solid image density was 10% or more and less than 20%.
C: the rate of enhancement in the solid image density was 5% or more and less than 10%.
D: solid image density was less than 5%.
It was determined that when the rate of enhancement in the solid image density was 10% or more, good color tone was achieved.

Evaluation criteria of the rate of enhancement in the solid image density of cyan toner
A: the rate of enhancement in the solid image density was 30% or more.
B: the rate of enhancement in the solid image density was 20% or more and less than 30%.
C: the rate of enhancement in the solid image density was 10% or more and less than 20%.
D: solid image density was less than 10%.
It was determined that when the rate of enhancement in the solid image density was 20% or more, good color tone was achieved.

Evaluation criteria of the rate of enhancement in the solid image density of black toner
A: the rate of enhancement in the solid image density was 60% or more.
B: the rate of enhancement in the solid image density was 40% or more and less than 60%.
C: the rate of enhancement in the solid image density was 20% or more and less than 40%.
D: the rate of enhancement in the solid image density was less than 20%.
It was determined that when the rate of enhancement in the solid image density was 40% or more, good color tone was achieved.

Comparative Example 17

The tinting power of each of comparative yellow toners (Tnr-Y156) to (Tnr-Y160) and (Tnr-Y256) to (Tnr-Y260), comparative magenta toners (Tnr-M156) to (Tnr-M160) and (Tnr-M256) to (Tnr-M260), comparative cyan toners (Tnr-C156) to (Tnr-C160) and (Tnr-C256) to (Tnr-C260), and comparative black toners (Tnr-Bk156) to (Tnr-B160) and (Tnr-B256) to (Tnr-B260) was evaluated by the same method as in Example 20.

The rate of enhancement in the solid image density of each of comparative yellow toners (Tnr-Y156) to (Tnr-Y160) was determined using the solid image density of reference yellow toner (Tnr-Y153) as the reference value.

The rate of enhancement in the solid image density of each of comparative yellow toners (Tnr-Y256) to (Tnr-Y260) was determined using the solid image density of reference yellow toner (Tnr-Y253) as the reference value.

The rate of enhancement in the solid image density each of comparative magenta toners (Tnr-M156) to (Tnr-M160) was determined using the solid image density of reference magenta toner (Tnr-M153) as the reference value.

The rate of enhancement in the solid image density of each of comparative magenta toners (Tnr-M256) to (Tnr-M260) was determined using the solid image density of reference magenta toner (Tnr-M253) as the reference value.

The rate of enhancement in the solid image density of each of comparative cyan toners (Tnr-C156) to (Tnr-C160) was determined using the solid image density of reference cyan toner (Tnr-C153) as the reference value.

The rate of enhancement in the solid image density of each of comparative cyan toners (Tnr-C256) to (Tnr-C260) was determined using the solid image density of reference cyan toner (Tnr-C253) as the reference value.

The rate of enhancement in the solid image density of each of comparative black toners (Tnr-BK156) to (Tnr-BK160) was determined using the solid image density of reference black toner (Tnr-BK153) as the reference value.

The rate of enhancement in the solid image density of each of comparative black toners (Tnr-BK256) to (Tnr-BK260) was determined using the solid image density of reference black toner (Tnr-BK253) as the reference value.

The tinting power evaluation results of the toners of the respective colors by a suspension polymerization method are shown in Table 5, and the tinting power evaluation results of the toners of the respective colors by a suspension granulation method are shown in Table 6.

TABLE 5

Evaluation results of toner by suspension polymerization method

| Compound | Yellow Toner | Tinting power | Magenta Toner | Tinting power | Cyan Toner | Tinting power | Black Toner | Tinting power |
|---|---|---|---|---|---|---|---|---|
| 101 | Tnr-Y101 | A | Tnr-M101 | A | Tnr-C101 | A | Tnr-Bk101 | A |
| 102 | Tnr-Y102 | A | Tnr-M102 | A | Tnr-C102 | A | Tnr-Bk102 | A |
| 103 | Tnr-Y103 | A | Tnr-M103 | A | Tnr-C103 | A | Tnr-Bk103 | A |
| 104 | Tnr-Y104 | A | Tnr-M104 | A | Tnr-C104 | A | Tnr-Bk104 | A |
| 105 | Tnr-Y105 | A | Tnr-M105 | A | Tnr-C105 | A | Tnr-Bk105 | A |
| 106 | Tnr-Y106 | A | Tnr-M106 | A | Tnr-C106 | A | Tnr-Bk106 | A |
| 107 | Tnr-Y107 | A | Tnr-M107 | A | Tnr-C107 | A | Tnr-Bk107 | A |
| 108 | Tnr-Y108 | A | Tnr-M108 | A | Tnr-C108 | A | Tnr-Bk108 | A |
| 109 | Tnr-Y109 | A | Tnr-M109 | A | Tnr-C109 | A | Tnr-Bk109 | A |
| 110 | Tnr-Y110 | A | Tnr-M110 | A | Tnr-C110 | A | Tnr-Bk110 | A |
| 111 | Tnr-Y111 | A | Tnr-M111 | A | Tnr-C111 | A | Tnr-Bk111 | A |
| 112 | Tnr-Y112 | A | Tnr-M112 | A | Tnr-C112 | A | Tnr-Bk112 | A |
| 113 | Tnr-Y113 | A | Tnr-M113 | A | Tnr-C113 | A | Tnr-Bk113 | A |
| 114 | Tnr-Y114 | A | Tnr-M114 | A | Tnr-C114 | A | Tnr-Bk114 | A |
| 115 | Tnr-Y115 | A | Tnr-M115 | A | Tnr-C115 | A | Tnr-Bk115 | A |
| 116 | Tnr-Y116 | A | Tnr-M116 | A | Tnr-C116 | A | Tnr-Bk116 | A |
| 117 | Tnr-Y117 | A | Tnr-M117 | A | Tnr-C117 | A | Tnr-Bk117 | A |
| 118 | Tnr-Y118 | A | Tnr-M118 | A | Tnr-C118 | A | Tnr-Bk118 | A |
| 119 | Tnr-Y119 | A | Tnr-M119 | A | Tnr-C119 | A | Tnr-Bk119 | A |
| 120 | Tnr-Y120 | A | Tnr-M120 | A | Tnr-C120 | A | Tnr-Bk120 | A |
| 121 | Tnr-Y121 | A | Tnr-M121 | A | Tnr-C121 | A | Tnr-Bk121 | A |
| 122 | Tnr-Y122 | A | Tnr-M122 | A | Tnr-C122 | A | Tnr-Bk122 | A |
| 123 | Tnr-Y123 | A | Tnr-M123 | A | Tnr-C123 | A | Tnr-Bk123 | A |
| 124 | Tnr-Y124 | A | Tnr-M124 | A | Tnr-C124 | A | Tnr-Bk124 | A |
| 125 | Tnr-Y125 | A | Tnr-M125 | A | Tnr-C125 | A | Tnr-Bk125 | A |
| 126 | Tnr-Y126 | A | Tnr-M126 | A | Tnr-C126 | A | Tnr-Bk126 | A |
| 127 | Tnr-Y127 | A | Tnr-M127 | A | Tnr-C127 | A | Tnr-Bk127 | A |
| 128 | Tnr-Y128 | A | Tnr-M128 | A | Tnr-C128 | A | Tnr-Bk128 | A |
| 129 | Tnr-Y129 | A | Tnr-M129 | A | Tnr-C129 | A | Tnr-Bk129 | A |
| 130 | Tnr-Y130 | A | Tnr-M130 | A | Tnr-C130 | A | Tnr-Bk130 | A |
| 131 | Tnr-Y131 | A | Tnr-M131 | A | Tnr-C131 | A | Tnr-Bk131 | A |
| 132 | Tnr-Y132 | A | Tnr-M132 | A | Tnr-C132 | A | Tnr-Bk132 | A |
| 133 | Tnr-Y133 | A | Tnr-M133 | A | Tnr-C133 | A | Tnr-Bk133 | A |
| 134 | Tnr-Y134 | A | Tnr-M134 | A | Tnr-C134 | A | Tnr-Bk134 | A |
| 135 | Tnr-Y135 | A | Tnr-M135 | A | Tnr-C135 | A | Tnr-Bk135 | A |
| 136 | Tnr-Y136 | A | Tnr-M136 | A | Tnr-C136 | A | Tnr-Bk136 | A |
| 137 | Tnr-Y137 | A | Tnr-M137 | A | Tnr-C137 | A | Tnr-Bk137 | A |
| 138 | Tnr-Y138 | A | Tnr-M138 | A | Tnr-C138 | A | Tnr-Bk138 | A |
| 139 | Tnr-Y139 | A | Tnr-M139 | A | Tnr-C139 | A | Tnr-Bk139 | A |
| 140 | Tnr-Y140 | A | Tnr-M140 | A | Tnr-C140 | A | Tnr-Bk140 | A |
| 141 | Tnr-Y141 | A | Tnr-M141 | A | Tnr-C141 | A | Tnr-Bk141 | A |
| 142 | Tnr-Y142 | A | Tnr-M142 | A | Tnr-C142 | A | Tnr-Bk142 | A |
| 143 | Tnr-Y143 | A | Tnr-M143 | A | Tnr-C143 | A | Tnr-Bk143 | A |
| 144 | Tnr-Y144 | A | Tnr-M144 | A | Tnr-C144 | A | Tnr-Bk144 | A |
| 145 | Tnr-Y145 | A | Tnr-M145 | A | Tnr-C145 | A | Tnr-Bk145 | A |
| 146 | Tnr-Y146 | A | Tnr-M146 | A | Tnr-C146 | A | Tnr-Bk146 | A |
| 147 | Tnr-Y147 | A | Tnr-M147 | A | Tnr-C147 | A | Tnr-Bk147 | A |
| 148 | Tnr-Y148 | A | Tnr-M148 | A | Tnr-C148 | A | Tnr-Bk148 | A |
| 149 | Tnr-Y149 | A | Tnr-M149 | A | Tnr-C149 | A | Tnr-Bk149 | A |
| 150 | Tnr-Y150 | A | Tnr-M150 | A | Tnr-C150 | A | Tnr-Bk150 | A |
| 101 | Tnr-Y151 | A | Tnr-M151 | A | Tnr-C151 | A | Tnr-Bk151 | A |
| 101 | Tnr-Y152 | A | Tnr-M152 | A | Tnr-C152 | A | Tnr-Bk152 | A |
| None | Tnr-Y153 | | Tnr-M153 | | Tnr-C153 | | Tnr-Bk153 | |
| None | Tnr-Y154 | | Tnr-M154 | | Tnr-C154 | | Tnr-Bk154 | |
| None | Tnr-Y155 | | Tnr-M155 | | Tnr-C155 | | Tnr-Bk155 | |

TABLE 5-continued

Evaluation results of toner by suspension polymerization method

| Compound | Yellow Toner | Tinting power | Magenta Toner | Tinting power | Cyan Toner | Tinting power | Black Toner | Tinting power |
|---|---|---|---|---|---|---|---|---|
| Comparative compound (1) | Tnr-Y156 | B | Tnr-M156 | A | Tnr-C156 | B | Tnr-Bk156 | A |
| Comparative compound (2) | Tnr-Y157 | B | Tnr-M157 | A | Tnr-C157 | B | Tnr-Bk157 | A |
| Comparative compound (3) | Tnr-Y158 | D | Tnr-M158 | D | Tnr-C158 | D | Tnr-Bk158 | D |
| Comparative compound (4) | Tnr-Y159 | C | Tnr-M159 | C | Tnr-C159 | C | Tnr-Bk159 | C |
| Comparative compound (5) | Tnr-Y160 | D | Tnr-M160 | D | Tnr-C160 | D | Tnr-Bk160 | D |
| 153 | Tnr-Y161 | A | Tnr-M161 | A | Tnr-C161 | A | Tnr-Bk161 | A |
| 154 | Tnr-Y162 | A | Tnr-M162 | A | Tnr-C162 | A | Tnr-Bk162 | A |

TABLE 6

Evaluation results of toner by suspension granulation method

| Compound No. | Yellow Toner | Tinting power | Magenta Toner | Tinting power | Cyan Toner | Tinting power | Black Toner | Tinting power |
|---|---|---|---|---|---|---|---|---|
| 101 | Tnr-Y201 | A | Tnr-M201 | A | Tnr-C201 | A | Tnr-Bk201 | A |
| 102 | Tnr-Y202 | A | Tnr-M202 | A | Tnr-C202 | A | Tnr-Bk202 | A |
| 103 | Tnr-Y203 | A | Tnr-M203 | A | Tnr-C203 | A | Tnr-Bk203 | A |
| 104 | Tnr-Y204 | A | Tnr-M204 | A | Tnr-C204 | A | Tnr-Bk204 | A |
| 105 | Tnr-Y205 | A | Tnr-M205 | A | Tnr-C205 | A | Tnr-Bk205 | A |
| 106 | Tnr-Y206 | A | Tnr-M206 | A | Tnr-C206 | A | Tnr-Bk206 | A |
| 107 | Tnr-Y207 | A | Tnr-M207 | A | Tnr-C207 | A | Tnr-Bk207 | A |
| 108 | Tnr-Y208 | A | Tnr-M208 | A | Tnr-C208 | A | Tnr-Bk208 | A |
| 109 | Tnr-Y209 | A | Tnr-M209 | A | Tnr-C209 | A | Tnr-Bk209 | A |
| 110 | Tnr-Y210 | A | Tnr-M210 | A | Tnr-C210 | A | Tnr-Bk210 | A |
| 111 | Tnr-Y211 | A | Tnr-M211 | A | Tnr-C211 | A | Tnr-Bk211 | A |
| 112 | Tnr-Y212 | A | Tnr-M212 | A | Tnr-C212 | A | Tnr-Bk212 | A |
| 113 | Tnr-Y213 | A | Tnr-M213 | A | Tnr-C213 | A | Tnr-Bk213 | A |
| 114 | Tnr-Y214 | A | Tnr-M214 | A | Tnr-C214 | A | Tnr-Bk214 | A |
| 115 | Tnr-Y215 | A | Tnr-M215 | A | Tnr-C215 | A | Tnr-Bk215 | A |
| 116 | Tnr-Y216 | A | Tnr-M216 | A | Tnr-C216 | A | Tnr-Bk216 | A |
| 117 | Tnr-Y217 | A | Tnr-M217 | A | Tnr-C217 | A | Tnr-Bk217 | A |
| 118 | Tnr-Y218 | A | Tnr-M218 | A | Tnr-C218 | A | Tnr-Bk218 | A |
| 119 | Tnr-Y219 | A | Tnr-M219 | A | Tnr-C219 | A | Tnr-Bk219 | A |
| 120 | Tnr-Y220 | A | Tnr-M220 | A | Tnr-C220 | A | Tnr-Bk220 | A |
| 121 | Tnr-Y221 | A | Tnr-M221 | A | Tnr-C221 | A | Tnr-Bk221 | A |
| 122 | Tnr-Y222 | A | Tnr-M222 | A | Tnr-C222 | A | Tnr-Bk222 | A |
| 123 | Tnr-Y223 | A | Tnr-M223 | A | Tnr-C223 | A | Tnr-Bk223 | A |
| 124 | Tnr-Y224 | A | Tnr-M224 | A | Tnr-C224 | A | Tnr-Bk224 | A |
| 125 | Tnr-Y225 | A | Tnr-M225 | A | Tnr-C225 | A | Tnr-Bk225 | A |
| 126 | Tnr-Y226 | A | Tnr-M226 | A | Tnr-C226 | A | Tnr-Bk226 | A |
| 127 | Tnr-Y227 | A | Tnr-M227 | A | Tnr-C227 | A | Tnr-Bk227 | A |
| 128 | Tnr-Y228 | A | Tnr-M228 | A | Tnr-C228 | A | Tnr-Bk228 | A |
| 129 | Tnr-Y229 | A | Tnr-M229 | A | Tnr-C229 | A | Tnr-Bk229 | A |
| 130 | Tnr-Y230 | A | Tnr-M230 | A | Tnr-C230 | A | Tnr-Bk230 | A |
| 131 | Tnr-Y231 | A | Tnr-M231 | A | Tnr-C231 | A | Tnr-Bk231 | A |
| 132 | Tnr-Y232 | A | Tnr-M232 | A | Tnr-C232 | A | Tnr-Bk232 | A |
| 133 | Tnr-Y233 | A | Tnr-M233 | A | Tnr-C233 | A | Tnr-Bk233 | A |
| 134 | Tnr-Y234 | A | Tnr-M234 | A | Tnr-C234 | A | Tnr-Bk234 | A |
| 135 | Tnr-Y235 | A | Tnr-M235 | A | Tnr-C235 | A | Tnr-Bk235 | A |
| 136 | Tnr-Y236 | A | Tnr-M236 | A | Tnr-C236 | A | Tnr-Bk236 | A |
| 137 | Tnr-Y237 | A | Tnr-M237 | A | Tnr-C237 | A | Tnr-Bk237 | A |
| 138 | Tnr-Y238 | A | Tnr-M238 | A | Tnr-C238 | A | Tnr-Bk238 | A |
| 139 | Tnr-Y239 | A | Tnr-M239 | A | Tnr-C239 | A | Tnr-Bk239 | A |
| 140 | Tnr-Y240 | A | Tnr-M240 | A | Tnr-C240 | A | Tnr-Bk240 | A |
| 141 | Tnr-Y241 | A | Tnr-M241 | A | Tnr-C241 | A | Tnr-Bk241 | A |
| 142 | Tnr-Y242 | A | Tnr-M242 | A | Tnr-C242 | A | Tnr-Bk242 | A |
| 143 | Tnr-Y243 | A | Tnr-M243 | A | Tnr-C243 | A | Tnr-Bk243 | A |
| 144 | Tnr-Y244 | A | Tnr-M244 | A | Tnr-C244 | A | Tnr-Bk244 | A |
| 145 | Tnr-Y245 | A | Tnr-M245 | A | Tnr-C245 | A | Tnr-Bk245 | A |
| 146 | Tnr-Y246 | A | Tnr-M246 | A | Tnr-C246 | A | Tnr-Bk246 | A |
| 147 | Tnr-Y247 | A | Tnr-M247 | A | Tnr-C247 | A | Tnr-Bk247 | A |
| 148 | Tnr-Y248 | A | Tnr-M248 | A | Tnr-C248 | A | Tnr-Bk248 | A |

TABLE 6-continued

Evaluation results of toner by suspension granulation method

| Compound No. | Yellow Toner | Tinting power | Magenta Toner | Tinting power | Cyan Toner | Tinting power | Black Toner | Tinting power |
|---|---|---|---|---|---|---|---|---|
| 149 | Tnr-Y249 | A | Tnr-M249 | A | Tnr-C249 | A | Tnr-Bk249 | A |
| 150 | Tnr-Y250 | A | Tnr-M250 | A | Tnr-C250 | A | Tnr-Bk250 | A |
| 101 | Tnr-Y251 | A | Tnr-M251 | A | Tnr-C251 | A | Tnr-Bk251 | A |
| 101 | Tnr-Y252 | A | Tnr-M252 | A | Tnr-C252 | A | Tnr-Bk252 | A |
| None | Tnr-Y253 | | Tnr-M253 | | Tnr-C253 | | Tnr-Bk253 | |
| None | Tnr-Y254 | | Tnr-M254 | | Tnr-C254 | | Tnr-Bk254 | |
| None | Tnr-Y255 | | Tnr-M255 | | Tnr-C255 | | Tnr-Bk255 | |
| Comparative compound (1) | Tnr-Y256 | B | Tnr-M256 | B | Tnr-C256 | B | Tnr-Bk256 | B |
| Comparative compound (2) | Tnr-Y257 | B | Tnr-M257 | A | Tnr-C257 | B | Tnr-Bk257 | A |
| Comparative compound (3) | Tnr-Y258 | D | Tnr-M258 | D | Tnr-C258 | D | Tnr-Bk258 | D |
| Comparative compound (4) | Tnr-Y259 | C | Tnr-M259 | C | Tnr-C259 | C | Tnr-Bk259 | C |
| Comparative compound (5) | Tnr-Y260 | D | Tnr-M260 | D | Tnr-C260 | D | Tnr-Bk260 | D |
| 153 | Tnr-Y261 | A | Tnr-M261 | A | Tnr-C261 | A | Tnr-Bk261 | A |
| 154 | Tnr-Y262 | A | Tnr-M262 | A | Tnr-C262 | A | Tnr-Bk262 | A |

As can be seen from Table 5 and Table 6, it has been confirmed that the compound having a colorant structure portion of the present invention is used to thereby result in an improvement in the dispersibility of each of the pigments in the binder resin, providing a yellow toner, a magenta toner, a cyan toner and a black toner that are high in tinting power.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-075125, filed Apr. 1, 2014, which is hereby incorporated by reference herein in its entirety.

What is claimed is:

1. A method for producing a compound, comprising the following (i) to (ii):
   (i): subjecting a polymerizable monomer represented by formula (A) to radical polymerization in the presence of a radical polymerization initiator and an iodine molecule to provide a polymer; and
   (ii): binding a colorant to a terminal of a main chain of the polymer:

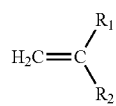

formula (A)

wherein
$R_1$ represents a hydrogen atom or an alkyl group, and
$R_2$ represents a phenyl group, a phenyl group having a substituent, a carboxy group, an alkoxycarbonyl group or a carboxamide group.

2. The method for producing a compound according to claim 1, wherein the colorant is an azo compound.

3. The method for producing a compound according to claim 1, wherein the colorant is bound to the terminal of the main chain of the polymer via an amide bond.

4. The method for producing a compound according to claim 1, wherein the compound is represented by the following formula (2):

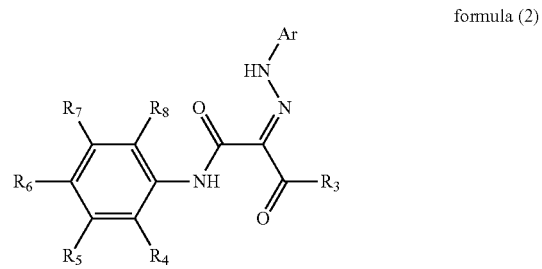

formula (2)

wherein
at least one of Ar and $R_3$ to $R_8$ is bound to the polymer via a linking group,
Ar, when not bound to the polymer, represents an aryl group, or an aryl group having a substituent,
the substituent of the aryl group having a substituent is a functional group selected from the group consisting of an alkyl group, an alkoxy group, a hydroxyl group, a cyano group, a halogen atom, a trifluoromethyl group, an alkoxycarbonyl group, a carboxamide group, a sulfonamide group, an alkoxysulfonyl group, a sulfonic acid group, a urea group and a thiourea group, and the urea group optionally forms a 5-membered heterocyclic ring together with two adjacent carbon atoms of Ar that can be substituted,
$R_3$, when not bound to the polymer, represents an alkyl group, an alkyl group having a substituent, a phenyl group, a phenyl group having a substituent, an alkoxy group or an amino group,
$R_4$ to $R_8$, when not bound to the polymer, each independently represent a hydrogen atom, an alkyl group, an alkoxy group, a hydroxyl group, a cyano group, a halogen atom, a trifluoromethyl group, an alkoxycarbonyl group, a carboxamide group, a sulfonamide group, an alkoxysulfonyl group, a sulfonic acid group, a urea group, a thiourea group or the following formula (3), and the urea group optionally forms a 5-membered heterocyclic ring together with two adjacent carbon atoms of $R_4$ to $R_8$, Ar, when bound to the polymer, represents a group formed by leaving of a hydrogen atom from the functional group that can be represented by Ar not bound to the polymer, any of $R_3$ to $R_8$, when bound to the polymer, represents a group formed by leaving of a hydrogen atom from the functional group that can be represented by $R_3$ to $R_8$ not bound to the polymer;

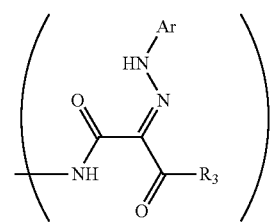

formula (3)

wherein

Ar and $R_3$ have the same meanings as Ar and $R_3$ in the formula (2).

5. The method for producing a compound according to claim 4, wherein the compound is represented by the following formula (4):

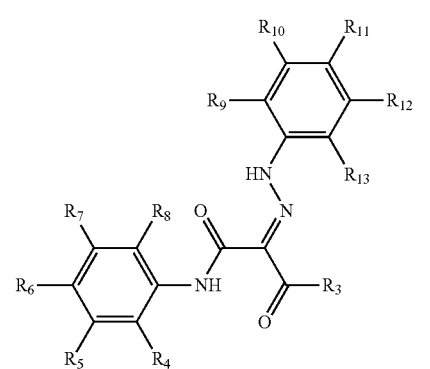

formula (4)

wherein at least one $R_3$ to $R_{13}$ is bound to the polymer via a linking group, $R_3$ to $R_8$ have the same meanings as $R_3$ to $R_8$ in the formula (2), $R_9$ to $R_{13}$, when not bound to the polymer, represent a hydrogen atom, an alkyl group, an alkoxy group, a hydroxyl group, a cyano group, a halogen atom, a trifluoromethyl group, an alkoxycarbonyl group, a carboxamide group, a sulfonamide group, an alkoxysulfonyl group, a sulfonic acid group, a urea group, a thiourea group and the following formula (5), and the urea group optionally forms a 5-membered heterocyclic ring together with two adjacent carbon atoms of $R_9$ to $R_{13}$, and any of $R_9$ to $R_{13}$, when bound to the polymer, represents a group formed by leaving of a hydrogen atom from the functional group that can be represented by $R_9$ to $R_{13}$ not bound to the polymer;

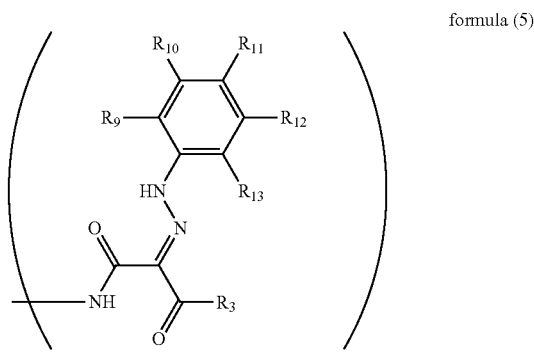

formula (5)

wherein $R_3$ has the same meanings as $R_3$ in the formula (2), and $R_9$ to $R_{13}$ have the same meanings as $R_9$ to $R_{13}$ in the formula (4).

6. The method for producing a compound according to claim 1, wherein the polymerizable monomer represented by the formula (A) is styrene or acrylic acid ester.

7. The method for producing a compound according to claim 1, wherein the radical polymerization initiator has a carboxy group or an alkoxycarbonyl group.

8. The method for producing a compound according to claim 4, wherein the linking group is represented by any of the following formulae (6) to (10):

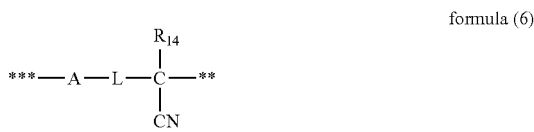

formula (6)

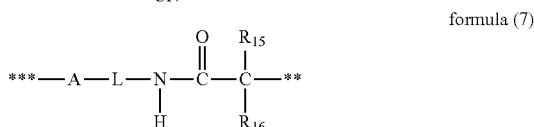

formula (7)

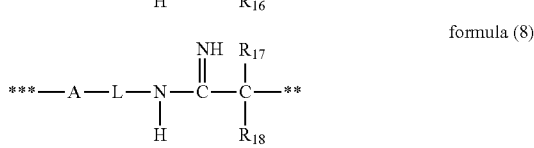

formula (8)

formula (9)

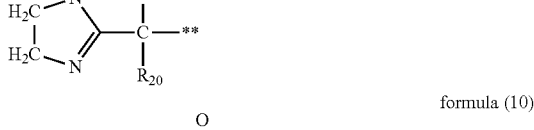

formula (10)

wherein

"**" represents a binding position to the polymer,

"***" represents a binding position to the colorant,

A represents a carboxylic acid amide bond, a carboxylic acid ester bond, a sulfonic acid amide bond, a sulfonic acid ester bond or an ether bond, L represents a single bond or an alkylene group, and $R_{14}$ to $R_{20}$ represent a hydrogen atom or an alkyl group.

9. The method for producing a compound according to claim 8, wherein A in the formulae (6) to (10) is a carboxylic acid amide bond.

10. The method for producing a compound according to claim 8, wherein the linking group is represented by the formula (6).

\* \* \* \* \*